(12) United States Patent

Lew et al.

(10) Patent No.: US 12,597,444 B2

(45) Date of Patent: Apr. 7, 2026

(54) SYSTEMS AND METHODS FOR AUTOMATED DIGITAL EDITING

(71) Applicant: Meta Platforms, Inc., Menlo Park, CA (US)

(72) Inventors: Alicia Fujun Lew, La Honda, CA (US); Zachary Ian Howard, San Francisco, CA (US); Sara Mousavicheshmehkaboodi, Santa Clara, CA (US); Bina Thakkar, Cary, NC (US); Anish Doshi, San Francisco, CA (US); Bo Shuang, Missouri City, TX (US); Wen Wang, Bellevue, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 18/957,276

(22) Filed: Nov. 22, 2024

(65) Prior Publication Data

US 2025/0166665 A1 May 22, 2025

Related U.S. Application Data

(60) Provisional application No. 63/601,838, filed on Nov. 22, 2023.

(51) Int. Cl.
| | |
|---|---|
| *G11B 27/031* | (2006.01) |
| *G06F 3/0482* | (2013.01) |
| *G06F 3/0484* | (2022.01) |
| *G06T 11/60* | (2026.01) |

(52) U.S. Cl.
CPC .......... *G11B 27/031* (2013.01); *G06F 3/0482* (2013.01); *G06F 3/0484* (2013.01); *G06T 11/60* (2013.01)

(58) Field of Classification Search
CPC ... G11B 27/031; G06F 3/0482; G06F 3/0484; G06T 11/60
See application file for complete search history.

(56) References Cited

U.S. PATENT DOCUMENTS

| | | | |
|---|---|---|---|
| 7,894,637 B2 | 2/2011 | Noguchi et al. | |
| 9,456,174 B2 | 9/2016 | Boyle et al. | |
| 10,257,436 B1 | 4/2019 | Zhang et al. | |
| 2006/0251382 A1 | 11/2006 | Vronay et al. | |
| 2010/0045879 A1* | 2/2010 | Chen ...................... | G09B 5/02 |
| | | | 348/744 |

(Continued)

*Primary Examiner* — Thai Q Tran
*Assistant Examiner* — Jose M Mesa
(74) *Attorney, Agent, or Firm* — EVERSHEDS SUTHERLAND (US) LLP

(57) ABSTRACT

A disclosed computer-implemented method may include presenting, within a video creation interface, a list of video styles, each video style within the list of video styles representative of a trained model, the trained model trained to apply different aesthetic attributes to video content in accordance with a different video style. The method may also include receiving, via user input to the video creation interface, a selection of a particular video style from the list of video styles and, in response to receiving the selection, applying, to video content received via the video creation interface, a video editing technique corresponding to the particular video style. Various other methods, systems, and devices are also disclosed.

20 Claims, 19 Drawing Sheets

Method 300

(56)  References Cited

U.S. PATENT DOCUMENTS

| | | | |
|---|---|---|---|
| 2015/0194185 A1* | 7/2015 | Eronen | H04N 21/2665 |
| | | | 386/279 |
| 2021/0272599 A1* | 9/2021 | Patterson | G06N 3/091 |
| 2022/0092312 A1 | 3/2022 | Migdal et al. | |
| 2022/0301593 A1 | 9/2022 | Huang | |

* cited by examiner

Method
300

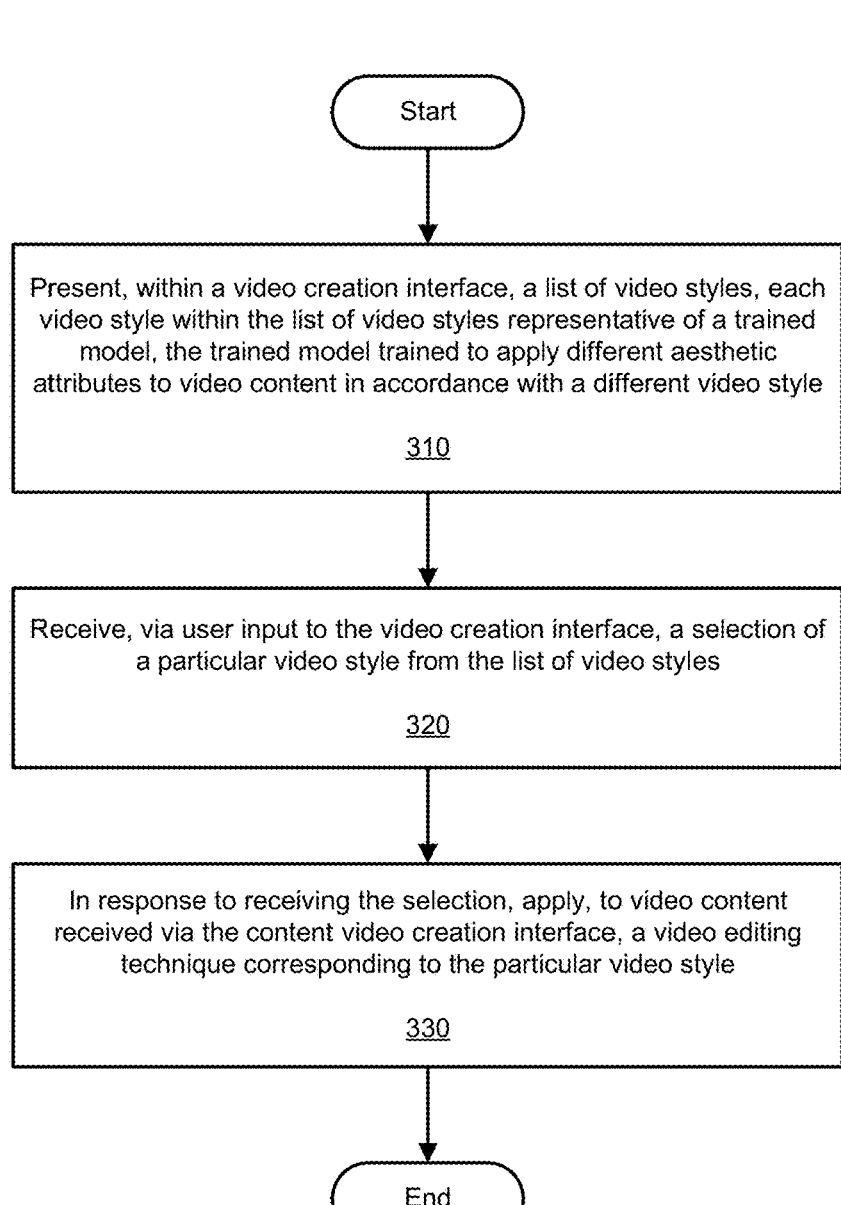

Start

Present, within a video creation interface, a list of video styles, each video style within the list of video styles representative of a trained model, the trained model trained to apply different aesthetic attributes to video content in accordance with a different video style

310

Receive, via user input to the video creation interface, a selection of a particular video style from the list of video styles

320

In response to receiving the selection, apply, to video content received via the content video creation interface, a video editing technique corresponding to the particular video style

330

End

| | When | |
|---|---|---|
| 1 | When there are more than 32 people in the reels: | Use the entire room camera stream as the main stream.<br>• Smart frame the group of people in the room<br>• If there's no camera stream captures the entire room, stitch streams from cameras that can cover the entire room.<br>• Switch to the active speak if there's any |
| 2 | When there are 32 or fewer people in the reel | • Option 1: Brady bunch every single person<br>• Option 2: show multiple camera streams with NO duplications. |
| 3 | Always | Wait for 2s to switch<br>• Avoid switching too frequently or false signals. E.g., when we detect a person is speaking, wait for 2s before switch to that person's stream |
| 4 | Always | Use dissolve animation and smooth the transition |

*FIG. 9*

| | If someone… | …then do x,y,z with the camera |
|---|---|---|
| 1 | If someone is talking, and others nod | Show the frame of the nodding participants |
| 2 | If two people are having a conversation | 1. And if they sit beside each other, smartly frame them in one stream. 2. And if they sit separately, Brady bunch each of them. |
| 4 | If someone is raising their hands | Zoom into that person |
| 5 | Looks at the camera directly | Cut to this camera view as main |
| 6 | If someone stands up and their head leaves the frame | Cut to the camera where their head has re-entered |
| 7 | If someone's head moves across another person's field of view | Switch the camera to the view to one where the person's face is not occluded by another person only if the person is actively talking when they move around |
| 8 | If someone extends their hand to gesture to a person | Switch to a cut between both actors which shows both of them. |

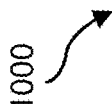

VR System
1800

VR System
1800

SYSTEMS AND METHODS FOR AUTOMATED DIGITAL EDITING

CROSS-REFERENCE TO RELATED APPLICATION

This application claims the benefit of U.S. Provisional Patent Application No. 63/601,838, filed Nov. 22, 2023, the disclosure of which is incorporated, in its entirety, by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 3 is a flow diagram of an example method for automated digital editing.

FIG. 9 includes a table that outlines example rules that embodiments of the systems and methods described herein may employ to facilitate automated digital video editing.

FIG. 10 includes a table that illustrates a set of heuristics that may be employed by embodiments of the systems and methods described herein to manage dynamic camera movements in a video editing or streaming context.

Figure 1:
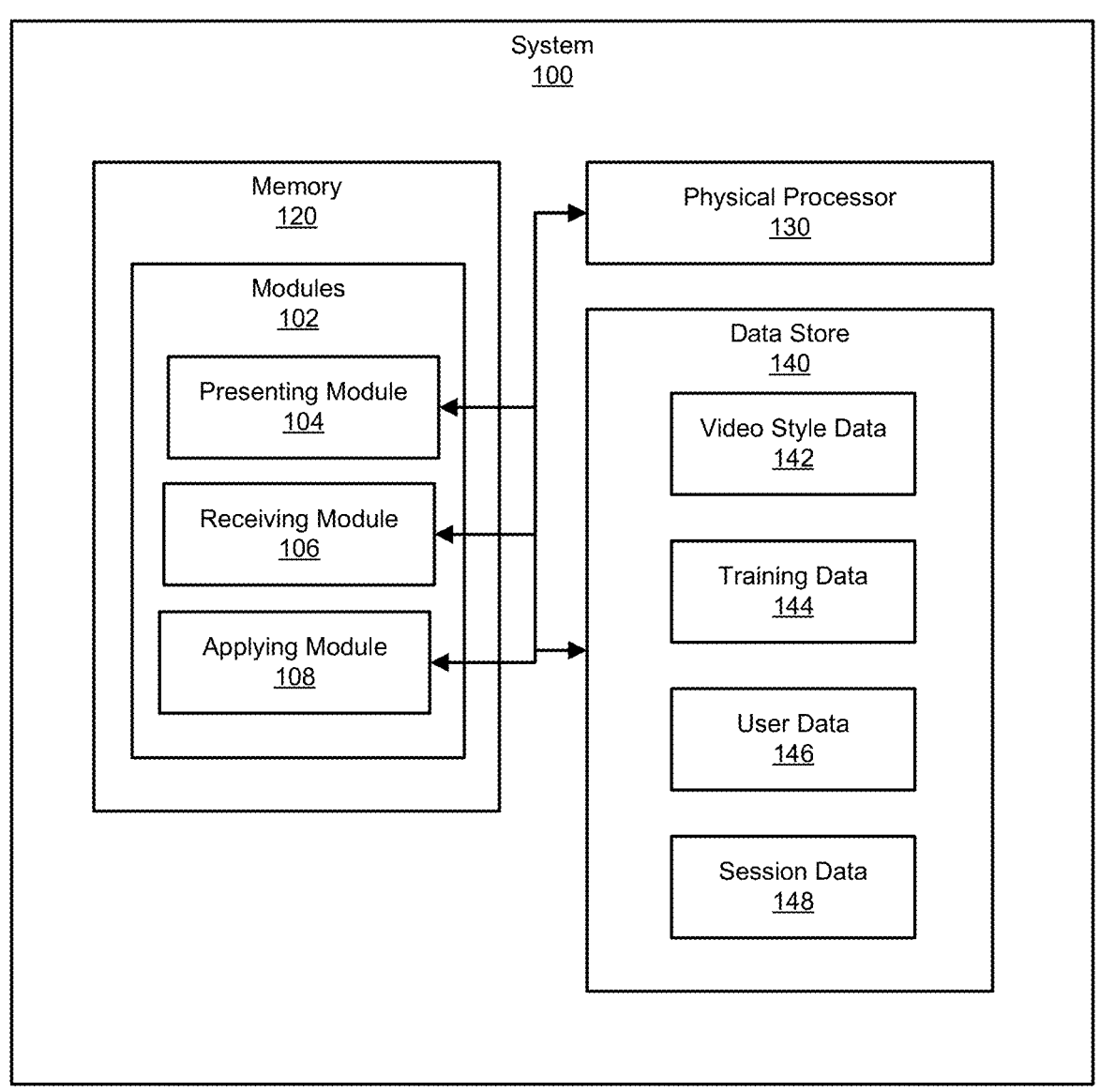
FIG. 1 is a block diagram of an example system for automated digital editing.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to an automated digital editing framework (e.g., a smart video editor). In some examples, the disclosed editing framework may receive, from a user via a video creation interface, a selection of a particular video style. In some examples, the video creation interface may include a list of different video styles and the selection may select the video style from the list. The video style may be delineated in any way. In one example, a video style may be characterized by a director (e.g., the list may include and/or represent a list of different film directors). Additionally, or alternatively, a video style may correspond to a film genre (e.g., comedy, western, thriller, etc.), a type of video (e.g., music video, documentary, etc.), and/or a description of a film editing technique (e.g., rapidly changing cuts, dramatic zooming, face-focused editing, object-focused editing, etc.).

In response to receiving the user's selection, the editing framework may automatically apply (e.g., to video content received via the video creation interface) a video editing technique that corresponds to the selected video style. In some examples, the video editing technique may have been determined for the selected video style using a trained model. In such examples, the editing framework may have applied training video content corresponding to the selected video style to the trained model and received the video editing technique as an output from the trained model.

The video editing technique may represent any type or form of automatable technique. In some examples, the video editing technique may represent a zooming effect (e.g., zooming applied to a particular type of computer-detectable object such as a speaker's hands, a speed of zooming, a frequency of zooming, a change and/or pattern of change in an amount of zooming, etc.). In one example, the video editing technique may represent an object or type of object focused on in a frame (e.g., a face, an object being manipulated by a speaker, a type of object, etc.). In some examples, the video editing technique may represent a type of cut applied to the video content (e.g., a standard cut, an L cut, a J cut, a match cut, a jump cut, a cutting-on-action cut, etc.) and/or a combination and/or pattern of types of cuts applied to video content. The cuts may be taken from different portions of video content captured via one camera and/or from video content captured via multiple cameras (e.g., via multiple devices logged into a group video creation session and/or a front and back camera of a single device). In one example, the video editing technique may represent a type of transition and/or a combination or pattern of types of transitions between shots (e.g., a fade transition, a dissolve transition, etc.).

In some embodiments, in addition to the video editing technique, the video style may correspond to an adjustment to the visual appearance of one or more frames of the video content. These adjustments may be pre-configured based on predefined aesthetic parameters associated with the selected video style (e.g., brightness, contrast, vibrancy, saturation, etc.) or dynamically determined based on real-time content analysis (e.g., adjusting brightness based on detected lighting conditions or enhancing contrast to emphasize specific objects in the frame). In such embodiments, the adjustment may have been determined for the selected video style using a trained model (e.g., received as an output from the trained model in response to applying training video content corresponding to the selected video style). For example, a trained model may learn to identify and adjust specific features (e.g., skin tones, background textures) to align with the selected video style's aesthetic. These adjustments may be automatically applied, either independently or in combination with the video editing technique, in response to the selection of the video style. This ensures that the final output not only reflects the stylistic and technical attributes of the selected video style but also adapts to the unique characteristics of the video content, providing a consistent and professional appearance.

In some examples, the video editing technique may be applied to the video content post-process (e.g., after the video content has already been captured). In other examples, the video editing technique may be applied to the video content dynamically (e.g., in real-time as the video content is captured). In some such examples, the video content may represent a live stream (e.g., being broadcast to one or more endpoints via a social media channel). In these examples, the video content may be edited using the video editing technique as the video content is captured, prior to being transmitted to the one or more endpoints in real-time.

The video creation interface may be presented to the user in any context. In one embodiment, the video creation interface may be presented as part of a social media creation process. In some examples, the video creation interface may be presented as part of a group video creation session (e.g., the video creation interface may enable the user to initiate or join the group video creation session). In these examples, the editing framework may receive video streams from multiple cameras (e.g., simultaneously) and may use the editing technique to select content from the multiple video streams and create a single coherent video.

In certain examples, video edits (e.g., using the video editing techniques and/or adjustments described above) may be automatically selected and applied to video content without requiring explicit user input to select a specific video style. In such examples, the disclosed editing framework may function as an automated video capture and editing tool, dynamically applying edits based on predefined or adaptive rules derived from trained models. For instance, the trained models may analyze real-time input video content to detect elements such as speaking individuals, objects of interest, or lighting changes and apply contextually appropriate edits. Rules for applying these edits may include conditions for when to switch focus to a detected object, dynamically adjust visual parameters (e.g., brightness or zoom levels), or emphasize a particular element in the frame. These rules may adapt in real-time based on changes in the scene, ensuring the output aligns with the stylistic and narrative goals of the video. For example, the framework may detect a speaker during a live broadcast and automatically enhance contrast or zoom to draw attention to the speaker without manual intervention.

In some examples, the disclosed editing framework may be used for digital video conferences, where the video content is automatically edited based on real-time analysis of participants' actions and predefined rules. For instance, if the framework detects that multiple users are speaking simultaneously, it may prioritize the loudest speaker or the participant gesturing the most prominently, dynamically applying edits such as zooming or framing adjustments to enhance viewer focus. In another example, if a group of users is captured in a physical or virtual room, the framework may select different editing modes based on the number of participants. For instance, exceeding a threshold number of participants may trigger a wide-angle view (e.g., a room-wide shot) or a stitched panoramic view created from multiple cameras, whereas fewer participants may prompt the framework to feature individual close-ups. These editing adjustments can include smooth transitions, such as dissolves or fades, to maintain a cohesive visual narrative.

In some embodiments, the disclosed editing framework may also be used for three-dimensional or mixed-dimensionality video conferences, dynamically adapting edits to the medium. For example, in a mixed-dimensionality scenario, where one set of users participates via two-dimensional devices (e.g., laptops, smartphones) and another set via three-dimensional artificial reality devices (e.g., AR glasses or VR headsets), the framework may generate representations tailored to each group. For 3D users, the framework may present a virtual room with a virtual table and avatars seated around the table, while simultaneously displaying 2D users' live video streams on a virtual wall or screen within the 3D environment. Conversely, for 2D users, the framework may present a grid layout of video tiles, including 3D users' avatars rendered as video streams. Editing adjustments in such scenarios may include dynamic transitions between individual tiles, highlighting active speakers, or enhancing visual coherence across formats. Additionally, real-time edits, such as delayed switching (e.g., waiting two seconds after detecting a new speaker before switching views) or context-sensitive animations (e.g., zooming in on avatars or real-world participants), may be applied to create a polished and engaging experience across both 2D and 3D dimensions.

In some examples, a three-dimensional representation of a video conference may include a virtual room with a virtual table and a virtual representation (e.g., an avatar) of each user, within the second set of users, virtually sitting around the table. In mixed-dimensionality embodiments, the three-dimensional representation may present, above the virtual table (e.g., along a virtual wall and/or floating above the virtual table), a virtual screen that includes a grid of user tiles. Each user tile may include a two-dimensional video stream of a different user from the first set of users. Then, the two-dimensional representation may include a grid of user tiles, which can (in some embodiments) include a tile with a main stream (e.g., that covers the entire room) and/or individual tiles (e.g., each of which includes a video stream of an individual user). In some embodiments, the individual tiles may include, for each user in the first set of users, a live (e.g., real-world) video stream of the user, and, for each user in the second set of users, a video stream of the user's avatar.

In some embodiments, the various methods and systems described herein may be performed wholly or in part by a hardware processor executing software instructions stored in a memory. Such operations may be performed within a server or other cloud-accessible device, a desktop or laptop computer, a tablet computer, a smartphone, an artificial reality device (e.g., artificial reality glasses and/or an artificial reality headset), etc.

A video creation interface may include and/or refer to a user-accessible platform or software application that facilitates the process of creating, editing, and managing video content. This interface may enable users to interact with various tools and functionalities designed to streamline video production and editing processes. It may include, in some examples, a graphical user interface (GUI) that presents a list of selectable video styles, enabling users to choose specific aesthetic and technical attributes to be applied to their video projects. The video creation interface may serve as a primary point of interaction between a user and an underlying video editing framework, allowing for the input of raw video content and the application of automated editing techniques. It may be integrated with additional features such as real-time editing capabilities, options for collaboration in group video creation sessions, and seamless integration with social media platforms for content sharing and distribution. The interface is designed to be intuitive and user-friendly, providing a cohesive environment where users can efficiently execute video creation tasks across various devices and platforms.

In some examples, a video style may refer to a predefined set of characteristics and parameters that define the aesthetic and/or technical attributes to be applied to video content within a video creation interface. A video style may encompass various elements, including, without limitation, attributes that mimic unique filmmaking techniques and/or signature styles of particular directors, potentially influencing shot composition, pacing, and/or visual motifs. It may also include characteristics associated with specific film genres such as comedy, western, or thriller, which dictate the mood, tone, and narrative structure applied to the video content. Additionally or alternatively, video style can refer to attributes associated with specific types of videos, such as music videos or documentaries, influencing editing techniques and storytelling methods suitable for the format. Specific editing methods and effects, such as rapidly changing cuts, dramatic zooming, face-focused editing, or object-focused editing, may be applied to enhance and/or stylize the video content according to the selected style. Video style may also involve specific types of transitions, like fade or dissolve, and cuts, such as standard or match cuts, that contribute to the visual flow and coherence of the video content. Furthermore, it may include alterations to the visual appearance of the video, including adjustments to contrast, brightness, vibrancy, saturation, and so forth that may align with the selected video style. The term "video style" is intended to provide users with a versatile and customizable framework for automatically applying a cohesive and professionally curated set of video editing effects and adjustments to their video content.

A video editing technique may include and/or refer to a set of automated processes and effects applied to video content to enhance its visual presentation and narrative structure. These techniques may encompass a wide range of editing actions, including but not limited to, application of specific cuts, such as jump cuts, match cuts, or L cuts, which may dictate one or more transitions between one or more video segments. Video editing techniques may also involve the use of transitions, such as fades or dissolves, to create smooth visual continuity between scenes. Additionally or alternatively, these techniques may include the application of zooming effects, focusing on particular objects or subjects within the frame, such as a speaker's face or hands, to draw attention and emphasize key elements in the video. The techniques can be determined through the use of trained models that analyze style-specific attributes from training video content, thereby producing a tailored editing approach that aligns with the selected video style. Video editing techniques can be applied during post-processing or dynamically in real-time, such as during live streaming or video conferencing, to produce a polished and professional-quality video output that meets the user's stylistic and narrative objectives.

A trained model may include or refer to a computational model that has undergone a process of training, during which it has been exposed to a set of input data and has adjusted its parameters or learned patterns in a way that enables it to perform specific tasks or make predictions on new, unseen data. This process generally involves the optimization of the model's parameters based on a predefined criterion or cost function, often using techniques such as supervised, unsupervised, or reinforcement learning. The training process aims to minimize errors or improve the model's accuracy in performing designated tasks, leveraging algorithms that iteratively refine the model's capabilities by learning from data features and structures. Success in training is typically measured by the model's ability to generalize from the training data to apply knowledge effectively in practical applications outside the original dataset, achieving high accuracy and performance in line with the objectives of the application for which the model was developed.

A model trained to apply different aesthetic attributes to video content in accordance with a different video style may include or represent a type of computational tool that has been specifically developed to transform or enhance video content by altering its appearance to match a desired aesthetic style. This model undergoes a training process. In some examples, the training process may involve exposure to pairs or sets of videos, where each pair includes an original video along with a version or versions reflecting various target styles. In additional or alternative examples, the training process may involve exposure to original videos that exhibit a target video style without exposure to a paired target version. By learning from these examples, the model adjusts its internal parameters to recognize patterns and aesthetic attributes characteristic of different styles, such as color schemes, textures, and movements typical of a particular visual genre or artistic trend.

During training, techniques such as neural style transfer, convolutional neural networks (CNNs), or generative adversarial networks (GANs) may be employed to capture and replicate aesthetic nuances. The model's objective is to minimize any discrepancies between the style-transformed output and the target aesthetic attributes, thereby enabling it to generalize from the training data and apply learned features to new content with high fidelity. As a result, the trained model can take input video content and intelligently modify its visual attributes—such as tone, hue, saturation, or even dynamic elements like scene transitions and pacing—to create a final output that aesthetically aligns with the aimed style, enhancing the viewer's experience through stylistic consistency and visual appeal.

A type of object may include or refer to a specific category or classification of visual elements within video content that can be identified and targeted for particular video editing techniques. This term may encompass a range of discernible entities or features within a video frame, such as animate objects (e.g., human faces, hands, or bodies) and inanimate objects (e.g., vehicles, furniture, text on a screen, or specific items of interest). The identification of a type of object may be facilitated by computational methods employing machine learning algorithms or computer vision techniques, such as YOLO (You Only Look Once), SSD (Single Shot MultiBox Detector), or other neural network-based object detection frameworks. These algorithms can process video frames to detect and classify objects in real time or during post-processing, enabling highly responsive and accurate editing adjustments.

Once identified, these objects serve as focal points for applying customized editing effects, such as zooming, highlighting, tracking, or adjusting the visual emphasis (e.g., brightness or contrast) to enhance the narrative or aesthetic quality of the video. For example, the framework may detect and track a speaker's hands during a tutorial video to emphasize gestures or highlight an object being manipulated by the speaker to draw the viewer's attention. Advanced capabilities may include distinguishing between overlapping or occluded objects within the same frame and prioritizing editing actions based on context (e.g., focusing on a speaker's face over background objects during a video conference).

In some examples, the detection process may account for edge cases, such as dynamically shifting object boundaries (e.g., a face partially obscured by motion or an object transitioning out of frame). To address these challenges, the editing framework may utilize predictive algorithms, such as Kalman filters or optical flow analysis, to maintain continuity and ensure consistent application of editing effects, even when objects are partially obscured or moving quickly. The ability to detect and classify a wide range of object types, along with context-sensitive adjustments, allows the editing framework to implement dynamic and sophisticated video edits that align with the overall stylistic objectives of the video content, enriching the viewer's engagement and experience.

In some examples, the disclosed editing framework may facilitate multi-camera scenarios, enabling video content captured from multiple sources to be seamlessly edited and integrated into a cohesive output. For instance, in a live event setting such as a concert or theatrical performance, video streams may be received from multiple devices positioned at various vantage points (e.g., wide-angle cameras for audience shots, close-up cameras for performers, or drones capturing aerial views). The editing framework may dynamically apply video editing techniques, such as selecting a primary stream based on detected activity (e.g., identifying a close-up shot of the lead performer during a solo) or switching between streams using a predetermined or learned pattern (e.g., alternating cuts every few seconds or triggered by significant motion detection). Such scenarios may leverage predefined rules or real-time input from trained models to ensure smooth transitions and a cinematic viewing experience.

In group collaboration settings, the editing framework may combine video streams from multiple participants (e.g., participants logged into a group video creation session or attendees in a digital conference). The system may analyze video streams for factors such as participant engagement, speaker activity, or content focus to determine optimal transitions between streams or layouts. For example, the framework may detect the active speaker in a meeting and dynamically highlight their stream using zoom or framing techniques, while maintaining a grid layout for non-speaking participants. Similarly, for a panel discussion, the system may apply a split-screen layout, dividing the screen into equal segments to display multiple participants simultaneously.

The disclosed editing framework is designed to operate efficiently across a range of hardware and network environments, providing scalable solutions tailored to the available computational resources. For low-power devices, such as smartphones or tablets, the framework may utilize optimized lightweight models or cloud-based processing to reduce the computational burden on the client device. For example, the device may capture raw video and transmit it to a server, where computationally intensive tasks, such as object detection, style application, and rendering, are performed. The processed video can then be streamed back to the client device or directly to the intended platform.

In scenarios with limited network bandwidth, the framework may implement adaptive streaming techniques, dynamically adjusting video quality and resolution to ensure smooth performance. For instance, real-time video editing effects (e.g., object-focused transitions or zooming) may prioritize low-latency delivery by applying simpler effects during high-latency periods and gradually enhancing the complexity as bandwidth availability improves. Additionally, prefetching techniques may be employed to preprocess video segments anticipated to require editing, thereby reducing latency during real-time operations. These scalability features ensure that the disclosed editing framework remains versatile and robust, delivering high-quality video output across a wide range of devices, platforms, and environments.

Embodiments of the disclosed editing framework may introduce several technical advancements over existing video editing solutions. Traditional video editing systems often rely on manual processes or basic rule-based automation, requiring significant user input and expertise to achieve a professional-quality result. By contrast, the present framework leverages advanced artificial intelligence (AI) models, including neural style transfer, CNNs, and/or GANs, to dynamically and automatically apply sophisticated video editing techniques that align with user-selected or inferred video styles. This significantly reduces the complexity of video editing, making it accessible to users with minimal technical skills.

One key technical improvement lies in the real-time application of video editing techniques. By utilizing trained models capable of analyzing video content dynamically as it is captured, the framework minimizes latency between content generation and its stylistic transformation. This is particularly beneficial for live streaming scenarios, where real-time edits—such as object-focused zooming, face tracking, and automated transitions—are applied without compromising the broadcast's fluidity or quality. Embodiments of the present disclosure may optimize computational efficiency by performing intensive processing in a cloud environment or on edge devices with hardware-accelerated AI capabilities, thereby reducing the resource demands on client devices.

The framework further addresses scalability challenges in collaborative and multi-camera video editing environments. Traditional editing tools often struggle with synchronizing inputs from multiple sources, especially in real-time. Embodiments of the present disclosure may integrate AI-driven decision-making processes that prioritize and merge video streams from various cameras or users, creating a cohesive output. For example, during a group video session, an example system can dynamically switch between streams based on detected events, such as a user beginning to speak or a significant action occurring in the frame. This automation reduces the reliance on manual camera operation and ensures that the final video is both contextually relevant and visually engaging.

Another technical improvement pertains to the dynamic customization of video styles. Unlike static templates used in conventional editing tools, the disclosed framework employs trained models to adapt video styles based on content-specific characteristics. For instance, the system can adjust pacing, transitions, and visual effects in response to detected objects, motion, or lighting conditions within the video. This context-aware customization enhances the quality and aesthetic coherence of the final output, offering users a professional-grade editing experience without requiring extensive manual adjustments.

Finally, embodiments of the present disclosure may improve the accessibility of high-quality video editing for diverse hardware platforms, including smartphones, tablets, and artificial reality devices. By offloading computationally intensive tasks to cloud-based servers or edge computing frameworks, the system ensures that users can create polished, cinematic-quality videos even on devices with limited processing power. This democratization of video editing represents a significant technical advancement, enabling broader adoption of professional-grade editing capabilities across consumer and enterprise markets.

The following will provide, with reference to FIG. 1, FIG. 2, and FIGS. 4-19, detailed descriptions of systems for automated video editing in accordance with the framework disclosed herein. Detailed descriptions of methods for automated video editing in accordance with the disclosed framework will be provided with reference to FIG. 3.

FIG. 1 is a block diagram of an example system 100 for automated digital editing. As illustrated in this figure, example system 100 may include one or more modules 102 for performing one or more tasks. As will be explained in greater detail below, modules 102 may include a presenting module 104 that presents, within a video creation interface, a list of video styles. Each video style may be representative of a trained model, where the trained model is trained (e.g., pre-trained) to apply different aesthetic attributes to video content in accordance with a different video style.

As also shown in FIG. 1, example system 100 may also include a receiving module 106 that receives, via user input to the video creation interface, a selection of a particular video style from the list of video styles. Additionally, example system 100 may also include an applying module 108 that, in response to receiving the selection (i.e., receiving module 106 receiving the selection), apply, to video content received via the video creation interface, a video editing technique corresponding to the particular video style.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate for automated digital editing. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also illustrated in FIG. 1, example system 100 may also include one or more stores of data, such as data store 140. Data store 140 may represent portions of a single data store or computing device or a plurality of data stores or computing devices. In some embodiments, data store 140 may be a logical container for data and may be implemented in various forms (e.g., a database, a file, file system, a data structure, etc.). Examples of data store 140 may include, without limitation, one or more files, file systems, virtual storage devices, data stores, databases, and/or database management systems such as an operational data store (ODS), a relational database, a NoSQL database, a NewSQL database, and/or any other suitable organized collection of data.

As further shown in FIG. 1, data store 140 includes (e.g., stores, maintains, has access to, etc.) various forms of data that may be used in or by one or more of the embodiments described herein. For purposes of illustration and explanation, and not by way of limitation, FIG. 1 shows that data store 140 includes video style data 142, training data 144, user data 146, and session data 148.

Video style data 142 may include or refer to a repository of predefined or dynamically generated attributes that define various aesthetic and technical parameters associated with specific video styles. These styles may encompass attributes influenced by particular directors, film genres, or editing techniques. For example, video style data 142 may include metadata characterizing a director's signature approach to shot composition, pacing, or visual motifs. Additionally, video style data 142 may store attributes such as predefined transitions (e.g., fades or dissolves), specific cuts (e.g., jump cuts or match cuts), or object-focused effects (e.g., zooming on a face or highlighting an object). This data may further include parameters for adjusting visual aspects such as brightness, contrast, vibrancy, and saturation to align with a selected style. Video style data 142 may be updated periodically with new attributes derived from training models or through manual configuration by users or system administrators, ensuring its applicability to evolving aesthetic trends.

Training data 144 may include or refer to a set of video samples or related media used to train machine learning models to apply specific video editing techniques or styles. This data may consist of original video content paired with outputs that exhibit targeted aesthetic transformations, allowing the models to learn patterns associated with each video style. For instance, training data 144 may include example videos that illustrate specific editing patterns, transitions, or object emphasis techniques characteristic of a particular genre or director's style. The data may also contain labeled datasets identifying objects, actions, or scenes to facilitate the training of models for detecting and dynamically editing content. To ensure high accuracy, training data 144 may be curated to include diverse examples spanning multiple contexts, such as lighting conditions, camera angles, and object arrangements. In some embodiments, training data 144 may be augmented through techniques like data synthesis or neural style transfer to enhance model performance.

User data 146 may include or refer to information associated with individual users or user profiles that can be leveraged to customize and enhance the video editing process. This data may include user preferences, such as favored video styles, commonly used editing techniques, or historical editing patterns. Additionally, user data 146 may store behavioral data, such as the frequency of style selections or specific parameters often adjusted by the user, enabling the system to suggest or automatically apply preferred styles. In some implementations, user data 146 may include access credentials or permissions, ensuring that user-specific content and settings are secure and accessible only to authorized individuals. The system may also use user data 146 to personalize recommendations, streamline workflows, and improve user experience by dynamically adapting the editing interface or suggested options to align with individual preferences.

Session data 148 refers to temporary or persistent information collected during an active video creation or editing session. This data may include video content such as video files and/or video streams, the real-time status of video files and/or video streams, metadata for captured content, and parameters currently applied to the editing process. For instance, session data 148 may store details about the video style selected during the session, edits applied to specific portions of the video, and live input from multiple users or devices in collaborative editing scenarios. In multi-camera setups, session data 148 may include details of active streams, switching patterns, and prioritized objects or speakers. For live-streaming scenarios, session data 148 may also track real-time adjustments made to maintain performance under varying network conditions, such as dynamic resolution changes or simplified effects during bandwidth limitations. This data enables seamless continuity during a session and may be used to generate a cohesive final output by integrating edits and decisions made throughout the session. In some embodiments, session data 148 may also be used to provide analytics or summaries to users post-session, offering insights into editing patterns or performance metrics.

Figure 2:
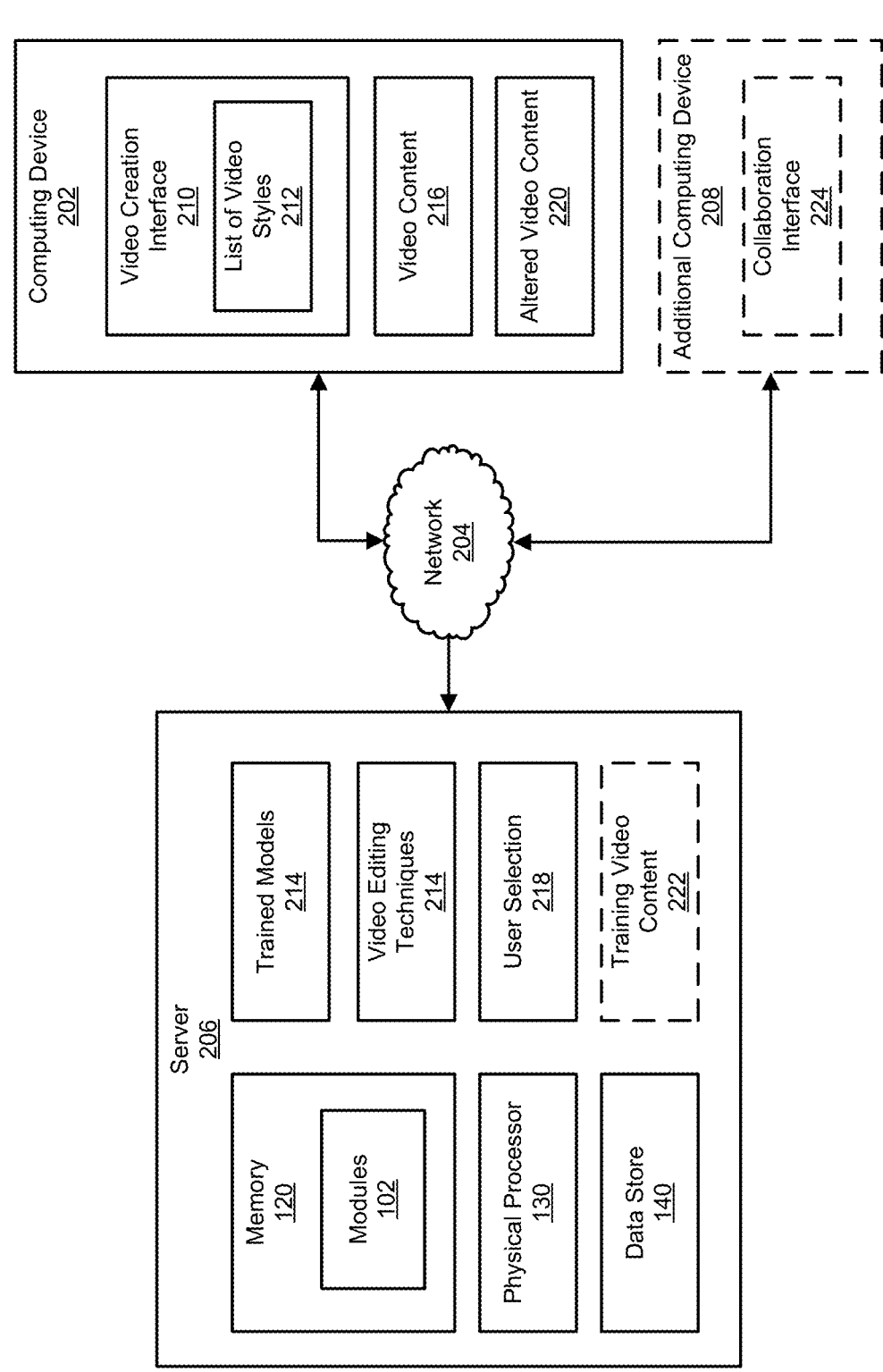
FIG. 2 is a block diagram of an example implementation of a system for automated digital editing.

Example system 100 in FIG. 1 may be implemented in a variety of ways. For example, all or a portion of example system 100 may represent portions of an example system 200 ("system 200") in FIG. 2. As shown in FIG. 2, system 200 may include a computing device 202 in communication with a server 206 and an optional (as indicated by dashed lines) additional computing device 208 via a network 204. In at least one example, computing device 202 may be programmed with one or more of modules 102. Additionally or alternatively, server 206 and/or additional computing device 208 may be programmed with one or more of modules 102.

In at least one embodiment, one or more modules 102 from FIG. 1 may, when executed by computing device 202, server 206, and/or additional computing device 208, enable computing device 202, server 206, and/or additional computing device 208 to perform one or more operations to facilitate automated digital editing. For example, as will be described in greater detail below, presenting module 104 may cause computing device 202, server 206, and/or additional computing device 208 to present, within a video creation interface (e.g., video creation interface 210), a list of video styles (e.g., list of video styles 212). Each video style within the list of video styles may be representative of a trained model (e.g., one of trained models 214). The trained model may be trained to apply different aesthetic attributes to video content (e.g., video content 216) in accordance with a different video style. Additionally, receiving module 106 may cause computing device 202, server 206, and/or additional computing device 208 to receive, via user input to the video creation interface, a selection (e.g., user selection 218) of a particular video style from the list of video styles. Furthermore, applying module 108 may cause, in response to the receiving of the selection, apply, to video content received via the video creation interface (e.g., video content 216), a video editing technique corresponding to the particular video style (e.g., create altered video content 220).

As also shown in FIG. 2, some optional (as indicated by dashed lines) components may be included as part of example system 200. For example, as will be described in greater detail below, example system 200 may include training video content 222 that one or more of modules 102 may use to train one or more models using one or more artificial intelligence training techniques. Additionally, as will be described in greater detail below, in embodiments where multiple devices may be used to capture video content, one or more of computing device 202 and/or additional computing device 208 may include a collaboration interface 224. Collaboration interface 224 may include one or more interfaces to one or more tools that may enable one or more users to collaborate on editing of one or more pieces of video content.

Computing device 202 generally represents any type or form of computing device capable of reading and/or executing computer-executable instructions. In at least one embodiment, computing device 202 may accept one or more directions from server 206 and/or additional computing device 208. Examples of computing device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between computing device 202, server 206, and/or additional computing device 208. Examples of network 204 include, without limitation, an intranet, a WAN, a LAN, a Personal Area Network (PAN), a virtual network, the Internet, Power Line Communications (PLC), a cellular network (e.g., a Global System for Mobile Communications (GSM) network, a code-division multiple access (CDMA) network, a Long-Term Evolution (LTE) network, a fifth-generation (5G) network, etc.), universal serial bus (USB) connections, and the like. Network 204 may facilitate communication or data transfer using wireless or wired connections. In one embodiment, network 204 may facilitate communication between computing device 202, server 206, and additional computing device 208.

Server 206 generally represents any type or form of computing device capable of reading and/or executing computer-executable instructions and/or hosting executables. Examples of server 206 include, without limitation, application servers, storage servers, database servers, web servers, and/or any other suitable computing device configured to run certain software applications and/or provide various application, storage, and/or database services.

Like computing device 202, additional computing device 208 generally represents any type or form of computing device capable of reading and/or executing computer-executable instructions. In at least one embodiment, additional computing device 208 may accept one or more directions from computing device 202 and/or server 206. Examples of additional computing device 208 include, without limitation, servers, laptops, tablets, cellular phones, (e.g., smartphones), PDAs, multimedia players, embedded systems, wearable devices (e.g., smart watches, smart glasses, etc.), gaming consoles, combinations of one or more of the same, or any other suitable mobile computing device.

In at least one example, computing device 202, server 206, and additional computing device 208 may be computing devices programmed with one or more of modules 102. All or a portion of the functionality of modules 102 may be performed by computing device 202, server 206, additional computing device 208, and/or any other suitable computing system. As will be described in greater detail below, one or more of modules 102 from FIG. 1 may, when executed by at least one processor of computing device 202, server 206, and/or additional computing device 208, may enable computing device 202, server 206, and/or additional computing device 208 to enable automated digital editing.

Many other devices or subsystems may be connected to example system 100 in FIG. 1 and/or example system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Example system 100 and example system 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

FIG. 3 is a flow diagram of an example computer-implemented method 300 for automated digital editing. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may present, within a video creation interface, a list of video styles. For example, presenting module 104 may, as part of computing device 202, server 206, and/or additional computing device 208, cause computing device 202, server 206, and/or additional computing device 208 to present, within video creation interface 210, list of video styles 212.

In some embodiments, video creation interface 210 may be implemented as a graphical user interface (GUI) designed to facilitate video editing and creation tasks by providing access to automated editing features. List of video styles 212 may include a variety of predefined or dynamically generated options, each corresponding to a specific aesthetic or technical approach to editing video content.

Each video style within list of video styles 212 may be visually represented in the interface by a distinct icon, thumbnail, or textual label, making it intuitive for the user to browse and select a desired style. For example, the video creation interface may present styles named after genres (e.g., "Comedy," "Horror," "Action"), directors (e.g., "Spielberg," "Kubrick"), or editing techniques (e.g., "Fast Cuts," "Smooth Transitions"). Additionally, each video style may include a short description or preview that provides the user with an understanding of the aesthetic attributes associated with the style.

Each video style within the list is linked to a trained model (e.g., one or more of trained models 214. A trained model, in this context, may include or refer to a computational model that has undergone a training process to learn aesthetic and technical attributes associated with a particular video style. The training process may involve exposing the model to a dataset comprising training video content 222 that exemplifies the aesthetic characteristics of the corresponding video style. For instance, training video content 222 may include examples of color grading, transitions, pacing, object emphasis (e.g., face-focused framing), and other stylistic elements representative of the style.

As described above, during training, the model may utilize one or more machine learning techniques, such as neural style transfer, CNNs, or GANs, to identify patterns and features that define the selected video style. These patterns may include combinations of editing techniques (e.g., rapid cuts with close-ups for "Action" style) and adjustments to visual parameters (e.g., high contrast and desaturation for "Film Noir" style). Once trained, the model is capable of analyzing input video content and dynamically applying the learned attributes to transform the content into a stylistically coherent output.

The video creation interface may retrieve the list of video styles from a data store (e.g., video style data 142 in FIG. 1) and present the list to the user upon initialization or interaction with the interface. In some embodiments, the list of video styles may be customizable or dynamically updated based on user preferences, historical usage patterns, or real-time analysis of the video content. For instance, if the system detects that the user frequently selects dramatic styles, it may prioritize such options within the list.

The video styles presented in the interface may further be associated with metadata that describes their technical attributes. For example, metadata for a specific style may include preferred types of cuts, transitions, and visual adjustments (e.g., brightness, contrast, vibrancy). This metadata enables the system to apply the trained model's outputs efficiently and ensures that the video style's attributes are faithfully reflected in the final video content.

In some embodiments, the interface may include an interactive preview feature, allowing the user to see a side-by-side comparison of their video content before and after applying a specific style. For instance, the interface may display a split-screen view where one side shows the original video content and the other side shows a preview of the content with the selected style applied. This feature enables users to experiment with different styles and make informed decisions about their selections.

The presentation of video styles within the interface may also be context-sensitive. For example, in a collaborative video editing session, the interface may prioritize styles that align with the group's project objectives, as determined by session metadata or user input. Similarly, the interface may tailor the list of styles based on the type of video being created (e.g., emphasizing cinematic styles for a short film or dynamic styles for a music video).

The list of video styles, in combination with the trained models, provides users with a powerful yet user-friendly mechanism for creating professional-quality video content without requiring manual editing expertise. By linking each style to a trained model capable of applying complex aesthetic transformations, the system ensures that the final output aligns with the user's creative vision while minimizing the effort and technical skill required.

Returning to FIG. 3, at step 320, one or more of the systems described herein may receive, via user input to the video creation interface, a selection of a particular video style from the list of video styles. For example, receiving module 106 may, as part of computing device 202, server 206, and/or additional computing device 208, cause computing device 202, server 206, and/or additional computing device 208 to receive, via user input to video creation interface 210, a user selection 218.

In some embodiments, the selection of a particular video style may be received as an explicit input from the user interacting with the video creation interface 210. For instance, the user may select a style by clicking, tapping, or otherwise interacting with a visual representation of the desired video style, such as a button, icon, thumbnail, or drop-down menu item corresponding to the style. This interaction may occur on various devices, including but not limited to a desktop computer, tablet, smartphone, or other input-capable device.

In other embodiments, the user selection 218 may be received via alternative input methods, such as voice commands, gestures, or even gaze tracking, depending on the capabilities of the video creation interface 210. For example, in an augmented reality or virtual reality (AR/VR) environment, the user may gaze at a specific video style option or perform a hand gesture to select it. The receiving module 106 may process this input in real time and translate it into a corresponding selection of a video style.

In some examples, the video creation interface 210 may provide real-time feedback to the user upon receiving the selection of the particular video style. For instance, the interface may display a visual confirmation, such as highlighting or animating the selected option, to inform the user that their input has been successfully registered. Additionally, the interface may dynamically update to display relevant information or options associated with the selected style, such as a detailed description, a list of key attributes, or sample previews.

In collaborative editing scenarios, where multiple users are simultaneously interacting with the video creation interface 210 (e.g., in a group video creation session), the receiving module 106 may process input from multiple sources. For instance, user selection 218 may be received from a specific user's device (e.g., computing device 202) and transmitted to a server 206 or additional computing device 208 for synchronization across all users in the session. In such scenarios, the system may implement rules or permissions to determine how conflicting selections are resolved or prioritized.

Additionally, in some embodiments, the selection of a particular video style may be inferred rather than explicitly provided. For instance, the receiving module 106 may analyze contextual data, such as user preferences stored in user data 146, recent editing history, or metadata associated with the video content, to automatically suggest or pre-select a style for the user. In these examples, the user may confirm the inferred selection or override it with an alternative choice.

In examples where the video creation interface 210 is presented within a live-streaming or real-time editing environment, user selection 218 may trigger immediate application of the selected style to the video content being captured or streamed. For instance, the user may select a cinematic style during a live broadcast, and the system may dynamically apply corresponding aesthetic attributes, such as transitions, color grading, or object-focused framing, to the ongoing stream. The receiving module 106 may ensure low-latency processing of the selection to maintain the seamlessness of the live editing experience.

The user selection 218 may also include additional parameters or preferences that modify the selected video style. For example, the user may adjust the intensity or degree to which the selected style is applied, such as increasing or decreasing the saturation level, contrast, or transition speed. These adjustments may be received as supplemental inputs via sliders, toggles, or other interactive elements within the video creation interface 210. The receiving module 106 may process these parameters and transmit them to the applying module 108 to ensure that the final output aligns with the user's precise creative vision.

In some implementations, the receiving module 106 may log user selection 218 as part of session data 148. This logged data may include the timestamp of the selection, the specific video style chosen, and any associated parameters or adjustments made by the user. This information may be used for various purposes, such as analytics, session recovery, or enhancing the personalization of future editing sessions.

Returning to FIG. 3, at step 330, one or more of the systems described herein may, in response to the receiving of the selection, apply, to video content received via the video creation interface, a video editing technique corresponding to the particular video style. For example, applying module 108 may, as part of computing device 202, server 206, and/or additional computing device 208, cause computing device 202, server 206, and/or additional computing device 208 to, in response to the receiving of user selection 218, apply, to video content 216 received via the video creation interface, a video editing technique corresponding to the particular video style, thereby producing altered video content 220.

In some embodiments, the applying module 108 may access the trained model (e.g., one or more of trained models 214) corresponding to the selected video style and execute the video editing technique as determined by the model. The trained model may analyze the video content 216 and identify areas for applying the specific aesthetic attributes associated with the selected style. For example, the model may detect specific objects, such as faces or hands, within the video content and apply techniques such as zooming, highlighting, or focusing to draw attention to these objects.

The video editing technique applied to the video content may include one or more of several transformations or adjustments. These may encompass alterations to visual appearance, such as changes to brightness, contrast, saturation, or vibrancy, in accordance with the selected video style. For instance, for a cinematic style, the applying module 108 may enhance contrast and apply a subtle vignette effect, while for a vibrant documentary style, it may increase saturation and sharpen the image to highlight details.

In addition to visual adjustments, the video editing technique may also involve applying specific editing patterns to the video content. These patterns may include cuts (e.g., match cuts, jump cuts, or L cuts), transitions (e.g., fades, dissolves, or wipes), and other temporal effects. For example, if the selected style corresponds to an action movie genre, the applying module 108 may introduce rapid cuts between scenes to create a sense of energy and urgency.

In some examples, the applying module 108 may dynamically adjust the video editing technique based on real-time analysis of the video content. For instance, in a live-streaming scenario, the module may detect a speaker's face in the frame and apply a zoom effect to center the face while maintaining smooth transitions to other objects or areas of interest. Similarly, for a music video style, the module may synchronize cuts or transitions with the beat of an audio track associated with the video content.

The applying module 108 may also integrate object detection and tracking capabilities to refine the application of the video editing technique. For example, the module may identify specific objects in the video content, such as a product being demonstrated in a tutorial or a performer in a live event, and apply effects such as framing adjustments, highlighting, or motion tracking to ensure the object remains the focal point throughout the video.

In collaborative editing scenarios, the applying module 108 may coordinate the application of the video editing technique across multiple video streams. For instance, during a group video creation session, the module may receive video content from multiple devices and switch between streams based on predefined or dynamically generated rules. These rules may include detecting the active speaker, prioritizing a specific camera angle, or following a pattern of switching between participants to maintain visual balance.

In some embodiments, the applying module 108 may incorporate advanced machine learning techniques to enhance the application of the video editing technique. For example, GANs may be used to refine transitions or simulate lighting adjustments that mimic professional-grade effects. Similarly, neural style transfer algorithms may apply aesthetic attributes derived from the selected video style to transform the overall visual tone of the video content.

The applying module 108 may store the altered video content 220 as part of session data 148 or output it directly to a specified destination. For instance, the altered video content may be saved to local storage on computing device 202, transmitted to a cloud-based server 206 for further processing, or streamed in real-time to a social media platform or other endpoint.

In some embodiments, the application of the video editing technique may be performed iteratively, allowing the user to preview and refine the results. For example, the user may apply a video editing technique, review the altered video content 220, and make additional adjustments (e.g., modifying parameters such as intensity or transition speed). The applying module 108 may process these iterative changes in real time, providing immediate feedback to the user.

To ensure efficient processing, the applying module 108 may optimize the application of video editing techniques based on available computational resources. For example, on resource-constrained devices, the module may use light-weight models or simplify effects to maintain performance, while on high-power systems, it may enable more complex transformations for enhanced visual quality.

The altered video content 220 produced by the applying module 108 may reflect the full range of attributes associated with the selected video style, ensuring a cohesive and professionally curated output. This capability enables users to achieve high-quality video editing results without requiring manual intervention or specialized technical skills.

Figure 4:
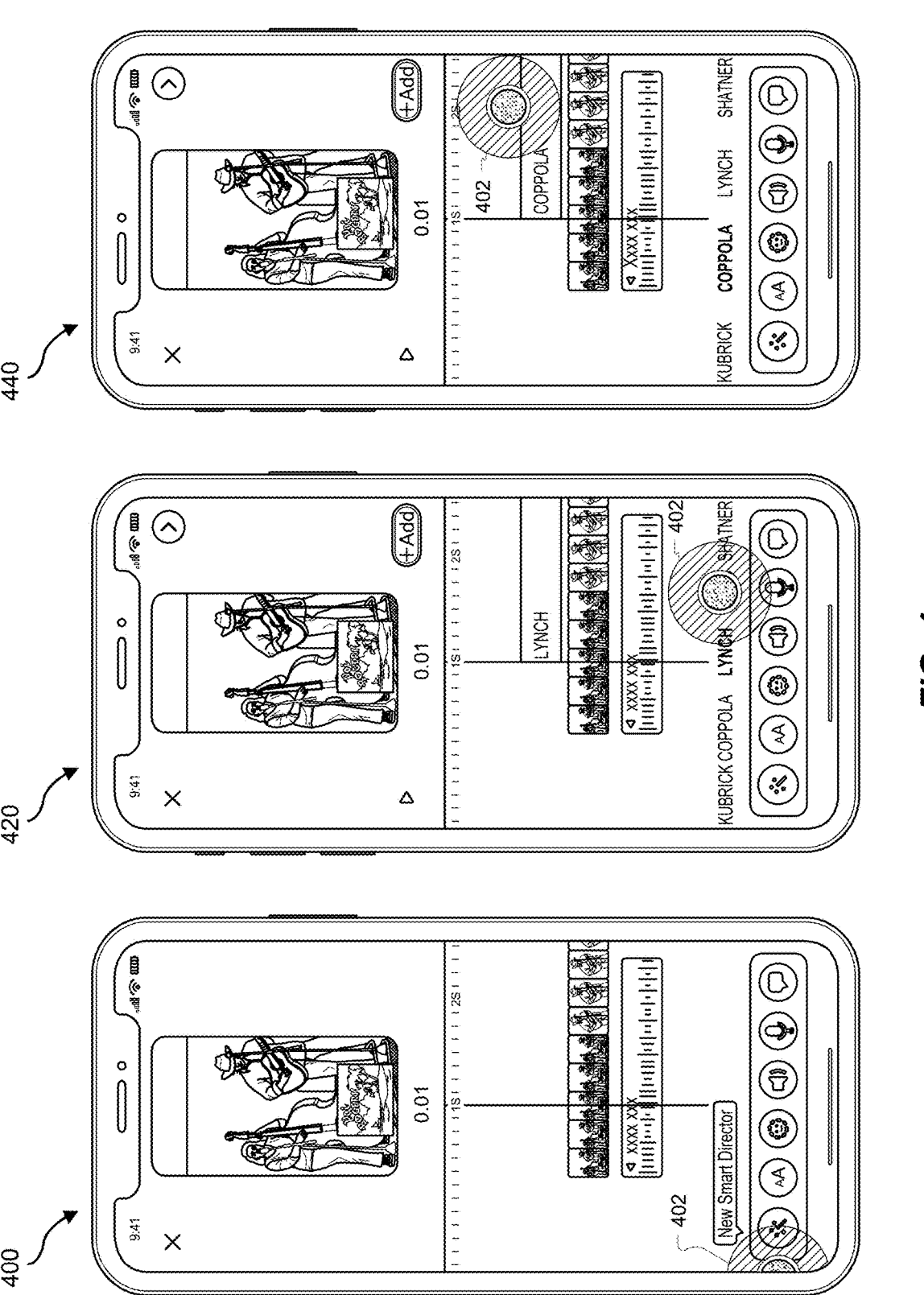
FIG. 4 and FIG. 5 include views of user interfaces that may illustrate, implement, and/or execute some example embodiments of the present disclosure.
Figure 5:
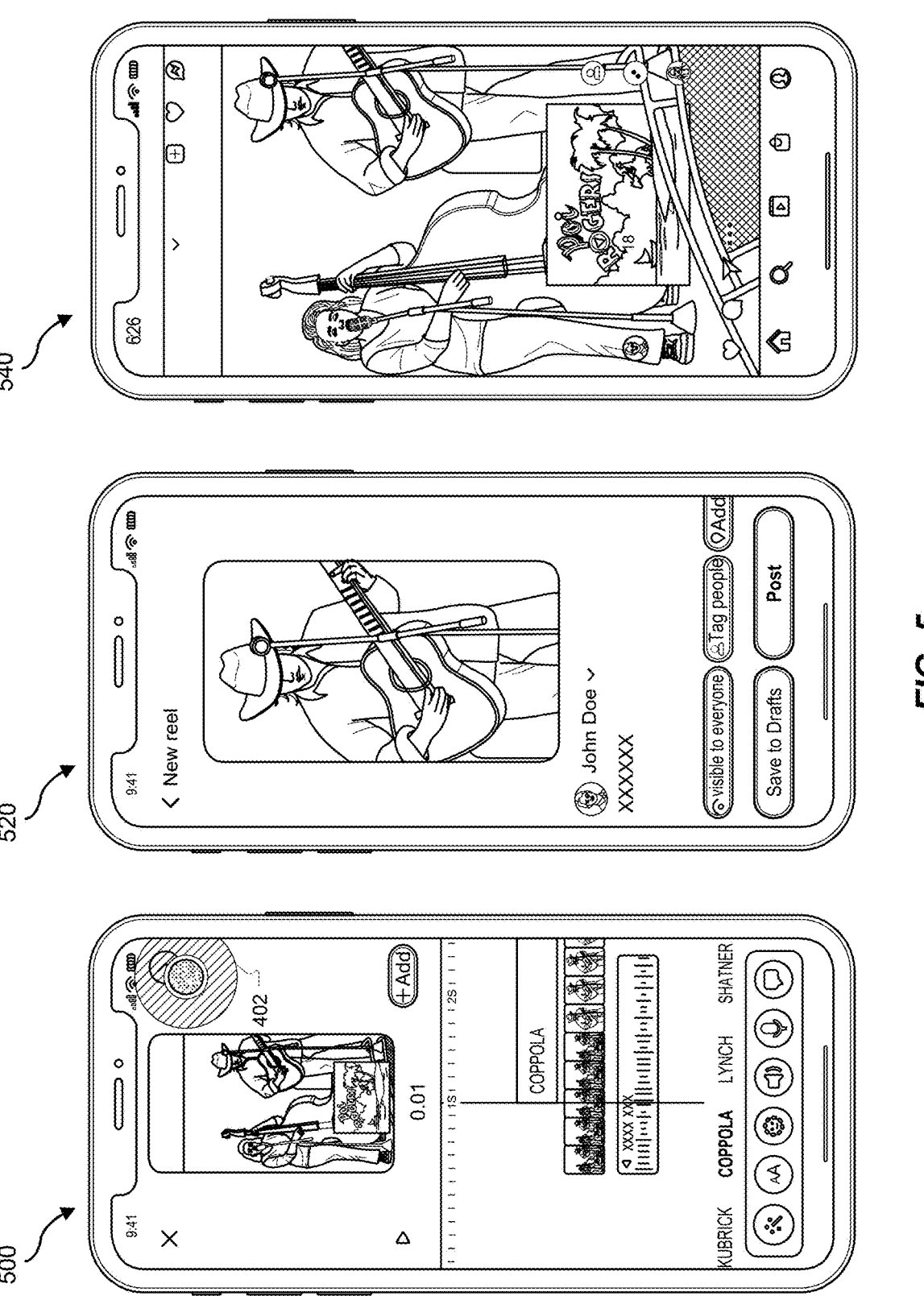

FIG. 4 and FIG. 5 include views of user interfaces that may illustrate, implement, and/or execute some example embodiments of the present disclosure. FIG. 4 illustrates an example of a user interface view 400 displayed on a touch-sensitive device, where the interface facilitates user interaction during the video creation process. View 400 represents one of several states of the user interface as the user interacts with it to edit or enhance video content. In the illustrated view, the user interface view 400 is displayed on a smartphone device, but the interface may be presented on other devices, such as tablets, laptops, or desktop computers, without departing from the scope of the disclosure.

The user interface view 400 includes a preview region positioned in the upper portion of the screen, where a preview of video content is displayed. In this example, the preview region depicts a video frame containing performers on stage. The preview region enables the user to visualize how video editing techniques (e.g., transitions, filters, or effects) are applied to the content in real-time.

Beneath the preview region, the user interface view 400 includes a timeline display. The timeline is segmented into discrete frames or intervals of time (e.g., 0.01-second increments), providing the user with a granular view of the video content. In the illustrated view, a series of video frames is shown within the timeline, each representing a specific moment of the video. The timeline may include interactive elements, such as scroll bars or draggable markers, allowing the user to navigate to different parts of the video and apply edits at precise intervals.

Positioned along the bottom portion of the user interface view 400 are several interactive controls and elements, including an interaction element 402. Interaction element 402 represents a user's interaction with the touch-sensitive user interface, such as a tap, swipe, or press gesture. For example, the user may tap on an icon, as illustrated in the view, to activate a feature or tool within the interface. In this case, interaction element 402 is displayed as a highlighted area surrounding the "New Smart Director" control, indicating that the user has touched or is interacting with this feature.

The "New Smart Director" control associated with interaction element 402 may enable specific functionalities, such as accessing video editing styles, applying predefined templates, or initiating collaboration features for new users. For example, upon interacting with this control, the system may display a menu of available video styles tailored to the user's content, as described in connection with previous figures. Alternatively, the control may trigger an instructional overlay or walkthrough designed to assist new users in navigating the video editing interface.

Additional interactive elements are displayed along the bottom of the user interface view 400, including icons for adjusting audio settings, adding text overlays, and applying special effects. These icons provide the user with quick access to frequently used tools, streamlining the editing process. For instance, the "AA" icon may allow the user to add text annotations or captions to the video, while the speaker icon may enable audio adjustments, such as modifying volume or adding background music.

The design of user interface view 400 emphasizes usability and accessibility, providing an intuitive layout that allows users to perform complex video editing tasks with minimal effort. The placement of the preview region, timeline, and interactive controls ensures that the user can seamlessly transition between reviewing video content and applying edits.

Interaction element 402 may further include visual feedback mechanisms to confirm user input. For instance, the interface may animate the highlighted area, play a brief sound, or display a confirmation message upon detecting user interaction. These feedback mechanisms enhance the user experience by ensuring that inputs are accurately recognized and processed by the system.

User interface view 420 illustrates an updated state of the user interface shown in user interface view 400 after a user has interacted with the "New Smart Director" control and selected a specific video style, labeled "LYNCH," for application to the video content. This view highlights the system's functionality for selecting and previewing video styles, as well as how the selected style is visually represented within the interface.

In this updated view, the preview region in the upper portion of the screen continues to display a live preview of the video content. The timeline beneath the preview region remains visible, providing the user with a detailed frame-by-frame representation of the video. The timeline also includes markers or labels that indicate where specific edits or effects, such as those associated with the selected video style, will be applied.

The bottom portion of the user interface view 420 has dynamically updated to display the available video styles for selection, presented as a scrollable list. In this example, the list includes "KUBRICK," "COPPOLA," "LYNCH," and "SHATNER," each corresponding to a distinct set of aesthetic and technical attributes. The user has selected "LYNCH," as indicated by a highlighted or enlarged representation of this style in the interface.

Interaction element 402 is displayed around the "LYNCH" option, representing the user's interaction with this video style. For example, the user may have tapped, swiped, or otherwise interacted with this element to select "LYNCH" as the desired style. In response to this selection, the system prepares to apply video editing techniques associated with the "LYNCH" style to the video content.

The "LYNCH" video style is associated with specific editing techniques and aesthetic attributes, such as high contrast, muted colors, and unconventional transitions, which mimic the stylistic approach of its namesake. Upon selection, the applying module 108 retrieves the corresponding trained model and metadata associated with the "LYNCH" style from the data store 140 and begins the process of transforming the video content to reflect these attributes.

In addition to the selected video style, the user interface view 420 includes an "+Add" control displayed adjacent to the preview region. This control enables the user to apply additional effects or elements (e.g., text overlays, filters, or transitions) to the video content, either in combination with the selected style or independently. The system provides flexibility for users to layer multiple effects to achieve the desired creative outcome.

The icons along the bottom of the user interface view 420 remain accessible, allowing the user to interact with other tools and settings during the editing process. For example, the "AA" icon may allow the user to add text annotations or captions, the speaker icon may provide access to audio adjustments, such as background music or sound effects, and the text bubble icon may allow the user to enter dialog boxes and/or captions to the video content.

The system may provide real-time feedback as the "LYNCH" style is applied to the video content. For instance, the preview region may update dynamically to reflect the application of the selected style, allowing the user to see the impact of their selection on the video content immediately. This real-time preview may help users make informed decisions about their editing choices and facilitate iterative refinement of the video content.

In collaborative scenarios, the system may synchronize the selected style across all devices participating in the editing session. For example, if the user selects "LYNCH" in a group video creation session, the system may notify other participants of the selection and ensure that all collaborators are working within the same stylistic framework. This synchronization ensures consistency in the final output while accommodating collaborative workflows.

The user interface view 420 is designed to be intuitive and adaptable, allowing users to experiment with different styles and effects without requiring technical expertise. The combination of scrollable style options, real-time previews, and accessible controls enhances the user experience, enabling both novice and experienced creators to produce high-quality, stylistically coherent video content.

The updated state shown in user interface view 420 demonstrates how the system transitions seamlessly from style selection to application, providing users with a powerful and user-friendly tool for video editing. Additional views of the user interface may illustrate subsequent states, such as the application of other effects or the finalization of the video content.

User interface view 440 illustrates a subsequent state of the user interface view 420, depicting the interaction process after the user switches their selected video style to "COPPOLA." In this view, the interface reflects the updated selection and provides corresponding visual feedback and controls to the user.

Similar to the prior view, the preview region remains positioned at the top of the interface, displaying a live representation of the video content. The content within the preview region reflects any edits, adjustments, or transformations applied as a result of the previously selected styles or the newly selected "COPPOLA" style. This ensures that the user can evaluate the impact of their style selection in real-time.

The timeline beneath the preview region continues to display the video content segmented into frames, with labeled intervals (e.g., 0.01-second increments) to provide precise navigation. A marker within the timeline highlights the position of the currently displayed frame, and additional metadata or effects associated with the selected style may also be visible.

The bottom portion of the user interface view 440 includes the scrollable style selection area included in the previous user interface views, where the user can browse and choose from various predefined video styles. In this view, the user has interacted with and selected the "COPPOLA" style, as indicated by the highlighted state of the "COPPOLA" option within the list. Interaction element 402 surrounds the "COPPOLA" option, visually indicating that this style has been activated through a touch, tap, or other input gesture on the touch-sensitive interface.

The "COPPOLA" style may represent a set of unique video editing attributes inspired by its namesake, emphasizing, for example, dramatic lighting, smooth transitions, and deep color grading to create a cinematic and visually rich aesthetic. Upon selecting this style, the applying module 108 retrieves the corresponding trained model and associated metadata from the data store 140. The applying module 108 then applies these attributes to the video content displayed within the preview region and reflected in the timeline.

Similar to previous views, the "+Add" control remains accessible adjacent to the preview region, enabling the user to add supplemental effects or elements to the video content.

This feature allows for additional customization, such as overlaying text, adding filters, or including transitions that complement the selected "COPPOLA" style.

The real-time feedback mechanism ensures that the selected "COPPOLA" style is applied immediately, allowing the user to visualize the results without delay. For example, as the system applies the "COPPOLA" style, the preview region may dynamically update to reflect the addition of rich color grading or smooth cross-fade transitions between frames. This live feedback empowers the user to make iterative refinements and adjustments to the video content.

In collaborative scenarios, where multiple participants are editing the same video project, the system may broadcast the updated style selection ("COPPOLA") to all collaborators. This ensures that the stylistic changes are synchronized across devices and participants, maintaining consistency in the video content's overall aesthetic.

The timeline may also adapt dynamically to reflect any effects or transitions introduced by the selected style. For example, under the "COPPOLA" style, the timeline may display markers for cross-fades or indicate portions of the video where dramatic lighting adjustments are applied.

The transition to the "COPPOLA" style highlights the system's flexibility in enabling users to experiment with different styles and aesthetics seamlessly. The scrollable style selector allows users to preview and switch between styles with ease, while the real-time preview ensures that users can make informed decisions about their selections.

Turning to FIG. 5, user interface view 500 illustrates an example user interface in a state where the user is completing the editing process for the video content. This view reflects how the system transitions from the editing phase to finalizing the video content, ensuring the user can review and confirm their edits before proceeding to export, save, or share the content.

In this view, the preview region at the top of the user interface view 400 continues to display a live representation of the video content with all applied edits and effects. This enables the user to review the video content in its final edited state. The timeline beneath the preview region remains visible, providing a comprehensive overview of the content, including any markers or labels indicating where specific edits, transitions, or effects (such as those associated with the "COPPOLA" style) have been applied.

Interaction element 402 in this view is located in the upper-right portion of the interface, visually representing the user's interaction with a control to complete the editing process. For instance, the user may have tapped a "finish" or "finalize" icon to indicate that they are satisfied with the edits and wish to proceed. The interaction element highlights the activated control to provide visual feedback that the input has been registered.

The timeline in this view prominently displays the "COPPOLA" style applied to the video content, as seen in the label above the timeline. This provides the user with a clear indication of the stylistic choices made during editing, ensuring transparency and consistency in the final output. Additional style-related metadata, such as transitions, color grading, or frame adjustments, may be summarized within the timeline or associated labels.

The scrollable list of styles at the bottom of the interface remains visible, with "COPPOLA" highlighted as the currently selected style. This allows the user to confirm their choice before finalizing the video. Other icons at the bottom of the interface, such as the "AA" text tool, and microphone options, remain accessible in case the user decides to make last-minute modifications to specific aspects of the video content.

Upon confirming the completion of the editing process, the system may provide additional options for the user. For example, the user interface may display a dialog box or menu (not shown in this view) allowing the user to save the edited video content locally or to a cloud storage service, export the video in a preferred format or resolution, share the video directly to a social media platform or via a link, and/or preview the entire video before finalizing the export or sharing process.

In collaborative editing scenarios, the completion action represented by interaction element 402 may notify all participants in the session that the editing process has been finalized. The system may synchronize the final version of the video content across all devices or provide participants with an option to review the completed work before publishing or exporting.

Real-time feedback during this stage ensures that any final adjustments, such as rendering applied effects or transitions, are completed efficiently, and displayed accurately in the preview region. For instance, if the "COPPOLA" style involves rendering smooth transitions or dynamic color adjustments, the system ensures these are fully applied before allowing the user to proceed.

User interface view 520 illustrates a user interface in a state where the user is preparing to share the altered video content, now represented as a "New reel," to a social media feed or other platform. This view demonstrates how the system transitions from the editing and finalization phases to enabling social sharing and visibility options.

At the top of the user interface view 520, the label "New reel" is displayed, indicating that the user is in the process of preparing a short-form video reel for publishing. The preview region in the center of the interface continues to display the altered video content, allowing the user to review the final output before proceeding. This preview ensures that any visual or stylistic edits, such as those applied in previous steps (e.g., the "COPPOLA" style), are reflected and can be evaluated prior to sharing.

Below the preview region, the interface includes a user attribution section. In this example, the name "John Doe" is displayed alongside a profile icon, signifying that the video content will be shared under this user's account. The system may also allow the user to toggle or switch between multiple accounts if the user manages content for different profiles. Additionally, a text entry field labeled with placeholder text (e.g., "XXXXXX") allows the user to add a caption, description, posting text, or other textual content to accompany the shared video.

Interactive controls positioned beneath the user attribution section provide the user with sharing options. For instance, a visibility toggle labeled "visible to everyone" allows the user to select the privacy level for the video. The user may adjust this option to restrict visibility to specific groups or individuals, such as "friends only" or "private."

The user interface also includes a "Tag people" option that may enable the user to tag other accounts or individuals associated with the video content. This feature may include auto-suggestions based on facial recognition or prior interactions to streamline the tagging process.

The user interface also includes an "Add" option that may enable the inclusion of additional metadata, such as hashtags, location tags, or supplementary descriptions, to enhance the discoverability of the video.

At the bottom of the interface, action buttons provide the user with options for managing or publishing the video. These include a "Save to Drafts" button and a "Post" button. The "Save to Drafts" button may allow the user to save the video content as a draft for future editing or sharing. The system may store the draft locally on the device or within a cloud-based storage service, ensuring that the content can be accessed and resumed at a later time. The "Post" button may enable the user to publish the video content to their social media feed or a designated platform. Upon selecting this option, the system may confirm the visibility settings, caption, and tags before proceeding with the upload. The system may also display a progress indicator to inform the user of the upload status.

The user interface view 520 may also support real-time content analysis and optimization during this phase. For example, the system may suggest enhancements to the caption or hashtags based on the content of the video or trends within the platform. Additionally, the system may provide notifications or recommendations, such as "Your video matches trending topics" or "Consider adding [suggested tag]."

In collaborative scenarios, the interface may enable shared publishing options, such as crediting multiple collaborators or co-owners of the video content. The system may also prompt collaborators to review or approve the final version before publication, ensuring that all participants are aligned on the final output.

The "New reel" interface is designed for simplicity and ease of use, allowing users to seamlessly transition from editing to sharing. The combination of preview capabilities, personalization options (e.g., captions and tags), and actionable controls ensures that users can effectively distribute their content to reach the desired audience.

User interface view 540 illustrates a user interface displaying the altered video content within a social media platform or other suitable content-sharing platform. This view demonstrates how the system integrates with external platforms to enable users and viewers to interact with the published video content.

In this view, the altered video content is prominently displayed in the main content region of the interface. The video content reflects all edits and stylistic enhancements previously applied by the user, such as those associated with the "COPPOLA" video style. The video playback occurs in real-time, with an optional control bar (not shown) allowing viewers to pause, rewind, or fast-forward through the content.

Above the main content region, the interface includes a header area that provides navigation controls and contextual information. The header includes additional interactive icons for actions such as returning to the home screen, opening a menu, or accessing notifications. These icons allow users to interact with the platform seamlessly while engaging with the video content.

Beneath the video content, the interface provides several interactive controls and social engagement features. For example, a "heart" icon allows viewers to "like" the video content, providing positive feedback to the content creator. A comment icon enables users to view or leave comments on the video, facilitating discussion and interaction among viewers. A share icon provides options for viewers to share the video with others, such as sending it to a contact, posting it to their own feed, or sharing it via external messaging platforms. Additionally, a profile icon displays a small avatar or profile image, which viewers can interact with to access the content creator's profile. This may include additional information about the creator and links to their other content.

Along the bottom of user interface view 540, the platform includes navigation controls for accessing various sections of the application. These controls include a home icon, which returns the user to the main feed or home screen of the platform; a search icon, which opens a search feature for discovering other videos or creators; an upload icon, which allows users to upload new content, initiating the content creation process described in earlier views; and a profile icon, which directs the user to their personal profile, displaying their published videos, drafts, and account settings.

The interface may also include dynamic engagement metrics, such as the number of likes, comments, and shares the video has received. These metrics are displayed near the interactive icons and update in real time as viewers interact with the content. For example, a small number "18" shown near the content or an icon may indicate the current number of likes or comments associated with the video.

For viewers, the interface supports additional interactive elements. Tapping on the video may pause or resume playback, while swiping may navigate to the next or previous video in the feed. These controls provide an intuitive experience for users to engage with multiple pieces of content seamlessly.

In collaborative or multi-user scenarios, the video content may display credits or acknowledgments for all contributors. For example, the profile icon or caption area may indicate multiple users who contributed to the video, allowing viewers to explore related content or profiles.

Hence, user interface view 540 illustrates the system's capability to integrate seamlessly with social media and/or content sharing platforms, enabling users to publish and share their video content widely. By preserving the applied edits and stylistic choices in the final displayed video, the system ensures that the creator's intent and creative vision are effectively communicated to the audience. Additionally, the inclusion of social engagement features enhances interactivity, allowing creators to connect with viewers and build a community around their content.

Some embodiments of the systems and methods described herein may include presenting a video creation interface to a user logged into a group video creation session. This interface may serve as a collaborative platform for multiple participants, enabling each user to contribute video content in real-time or near-real-time. When a user joins the session, an additional instance of the video creation interface is presented to any other users also logged into the group session. These instances are interconnected, facilitating the seamless exchange of video streams between participants. Each user can contribute their own video content, which is received via their respective instance of the video creation interface and processed for integration into the group video production.

The video editing techniques applied in this context are designed to handle multiple video streams intelligently. A key aspect of these techniques is the implementation of a pattern of switching between video content received from different cameras or devices. This pattern of switching may be determined based on predefined rules, learned behaviors from training models, or dynamic analysis of session activity. For instance, one or more components of one or more of the systems described herein (e.g., example system 100, example system 200, etc.) may monitor user actions, such as speaking, gesturing, or changes in camera framing, to decide when and how to transition between video streams. By applying these switching techniques, the system ensures that the most contextually relevant or visually engaging content is highlighted at any given moment.

The pattern of switching may also include a specific frequency of transitions between video streams. This frequency can be adapted based on session dynamics, such as the number of active participants, the level of motion or activity in each stream, or user preferences. For example, in a high-energy group session where multiple participants are speaking or gesturing simultaneously, the switching frequency may increase to capture all interactions effectively. Conversely, in a more structured setting, such as a formal presentation, the switching frequency may be reduced to provide a stable and focused viewing experience.

Additionally, in some examples, embodiments of the systems and methods disclosed herein may include and/or provide an entry point for initiating or joining the group video creation session within a group chat interface. This entry point may integrate with one or more communication tools used by participants, such as a messaging application or a virtual meeting platform. The group chat interface lists all members of the group and allows any member to initiate or join the video creation session directly from the chat. This integration streamlines the process of entering the session, reducing friction, and enabling participants to transition from text-based communication to collaborative video creation effortlessly.

Embodiments of the present disclosure may further enhance the group video creation process by automating the management of multiple streams and maintaining a cohesive narrative flow. By presenting an intuitive video creation interface, dynamically switching between streams according to defined patterns, and incorporating seamless entry points within a chat interface, embodiments may create an efficient and engaging environment for collaborative video production. This approach ensures that all contributions are captured and integrated into the final video output in a manner that is contextually relevant and visually compelling.

In some embodiments, the methods and systems disclosed herein may include a framework for automated video editing that dynamically applies video editing techniques to video content based on the detection of specific objects within the video frames. Embodiments may leverage trained models to detect a type of object in the video content, such as faces, hands, or other items of interest, and automatically applies corresponding video editing techniques tailored to enhance the visibility, prominence, or narrative focus of the detected object. For example, when the type of object is a face captured in the video content, the system may identify and track the face using advanced computer vision techniques, such as facial recognition or pose estimation, and apply a video editing technique designed to emphasize the detected face. This may include zooming in on the face, adjusting brightness or contrast to highlight facial features, or applying a soft focus effect to draw attention to the subject while de-emphasizing the background.

In some examples, one or more of the systems disclosed herein (e.g., one or more of modules 102) may analyze the input video frames through object detection algorithms, such as CNNs or other machine learning models, to classify objects and identify their spatial locations within the video content. Once an object corresponding to the specified type is detected, the system determines a video editing technique appropriate for that type of object. For instance, if the object is a speaker's face, the system might apply a gradual zoom-in effect to maintain audience engagement with the speaker or apply a framing adjustment to center the face within the shot. These techniques not only ensure visual clarity but also enhance the storytelling aspect of the video by directing viewer focus toward critical elements.

The editing techniques may be contextually adaptive, leveraging predefined or dynamically generated rules that dictate how edits are applied based on the detected object's characteristics or its role in the video. For instance, if the video captures a tutorial or a presentation, the system may detect the hands of the speaker interacting with objects and automatically apply editing techniques, such as close-up framing or slow-motion effects, to emphasize the interaction. Similarly, for detected faces, the system may analyze expressions or gaze direction to determine whether further adjustments, such as lighting modifications or background blurring, are necessary to maintain aesthetic consistency or emphasize the subject's emotional expressions.

Furthermore, the editing framework is designed to automatically apply video edits that draw attention to objects based on contextual cues. For example, when a face is detected, the system may adjust the depth of field to keep the face in sharp focus while subtly blurring the background, creating a visually appealing separation between the subject and its surroundings. The system may also employ transition effects, such as smooth pans or fades, to seamlessly shift viewer attention from one detected object to another, ensuring a cohesive visual narrative.

By incorporating object detection and tailored video editing techniques, the system simplifies the video editing process while enabling the creation of professional-grade videos. This functionality is particularly useful in applications such as live streaming, where real-time object detection and editing can significantly enhance the production value by dynamically adapting the focus and visual presentation to the evolving scene. In summary, the system's ability to detect and emphasize objects, such as faces, through targeted video editing techniques provides an intuitive and powerful tool for automating video production and enhancing viewer engagement.

Figure 6:
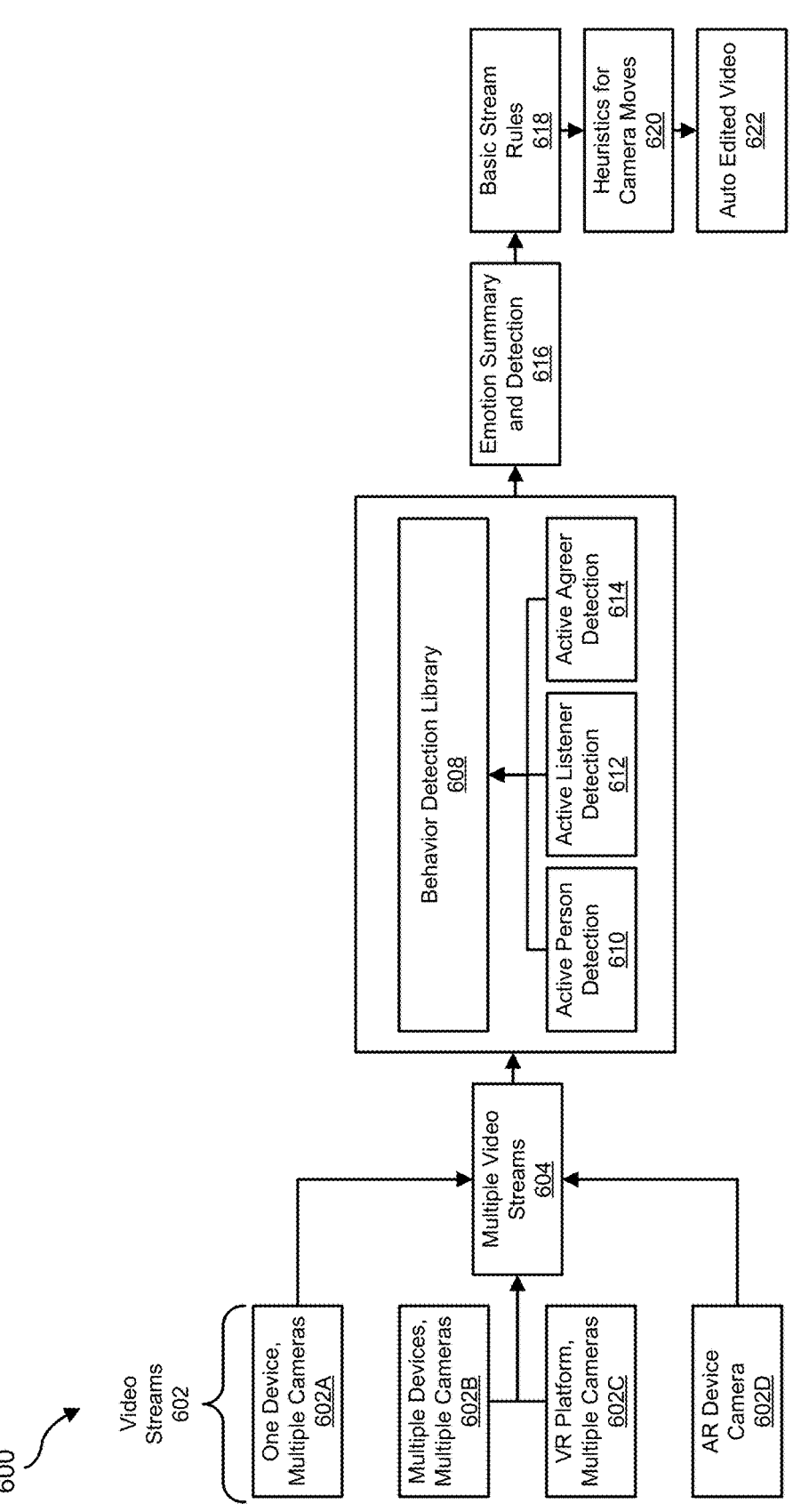
FIG. 6 includes a block diagram that illustrates a detailed overview of an architecture for managing multiple video streams and incorporating behavior detection into automated video editing.

Referring now to FIG. 6, an embodiment of the disclosed systems and methods is illustrated as a block diagram 600, which provides a detailed overview of an architecture enabled by the systems and methods of this disclosure for managing multiple video streams and incorporating behavior detection into automated video editing. This figure highlights a comprehensive framework for real-time video stream processing, behavior analysis, and dynamic application of editing rules to produce polished video content. The following features and/or modules may be embodied by and/or implemented using one or more of the systems disclosed herein (e.g., one or more of modules 102).

As shown in FIG. 6, the system receives video input from multiple sources categorized as Video Streams 602, including inputs from One Device, Multiple Cameras 602A, which may consist of devices with multiple lenses or sensors capturing video from different perspectives (e.g., front and rear cameras on a smartphone). The system also supports Multiple Devices, Multiple Cameras 602B, where video streams are contributed by multiple devices in collaborative or multi-user settings. Additionally, the architecture accommodates VR Platform, Multiple Cameras 602C, where video streams are captured in immersive virtual reality environments, and AR Device Camera 602D, where augmented reality-enabled devices, such as AR glasses, provide video input.

These video streams are processed collectively by the Multiple Video Streams Module 604, which coordinates and organizes the inputs for further behavioral analysis and editing. These organized inputs are then provided to Behavior Detection Library 608, which performs advanced behavioral analysis to detect and prioritize key events within the video content. The library incorporates specialized submodules, including Active Person Detection 610, which identifies individuals actively engaged in the video, such as speakers or participants performing significant actions. The library also includes Active Listener Detection 612, which recognizes individuals providing non-verbal feedback, such as nodding or maintaining eye contact, to emphasize audience engagement. Additionally, Active Agreer Detection 614 focuses on identifying gestures or expressions indicative of agreement, such as head nods or smiles, for narrative enhancement.

The Emotion Summary and Detection Module 616 further enriches behavioral analysis by identifying and summarizing emotional states based on facial expressions, gestures, or vocal cues. By employing advanced computer vision and machine learning techniques, this module detects emotions like enthusiasm, surprise, or agreement, enabling the system to apply contextually aware video edits.

The system applies Basic Stream Rules 618 to prioritize and select the most contextually appropriate video streams based on the behavioral and emotional analysis. These rules are critical for ensuring that transitions between streams and focus points align with detected activity, such as emphasizing the video stream of an active speaker or switching to a wide-angle view during collaborative discussions.

To ensure professional-quality video output, the system incorporates Heuristics for Camera Moves 620, which govern the dynamic application of techniques such as zooming, panning, and reframing. These heuristics are essential for maintaining visual continuity and enhancing narrative flow. For instance, the system may perform a gradual zoom on a speaker during key moments or pan to capture audience reactions in a group setting.

The processed and edited video content is then output as Auto Edited Video 622, representing a cohesive integration of behavioral analysis, dynamic camera control, and real-time stream management. This automated editing framework is particularly well-suited for live-streaming applications, collaborative video sessions, and immersive AR/VR environments.

FIG. 6 and block diagram 600 collectively illustrate some technical advancements enabled by the disclosed system, showcasing its ability to intelligently manage multiple video streams and deliver contextually relevant and visually engaging outputs. By leveraging real-time behavior detection and adaptive editing rules, the system significantly reduces the complexity of manual video editing while enhancing content quality and viewer engagement.

Figure 7:
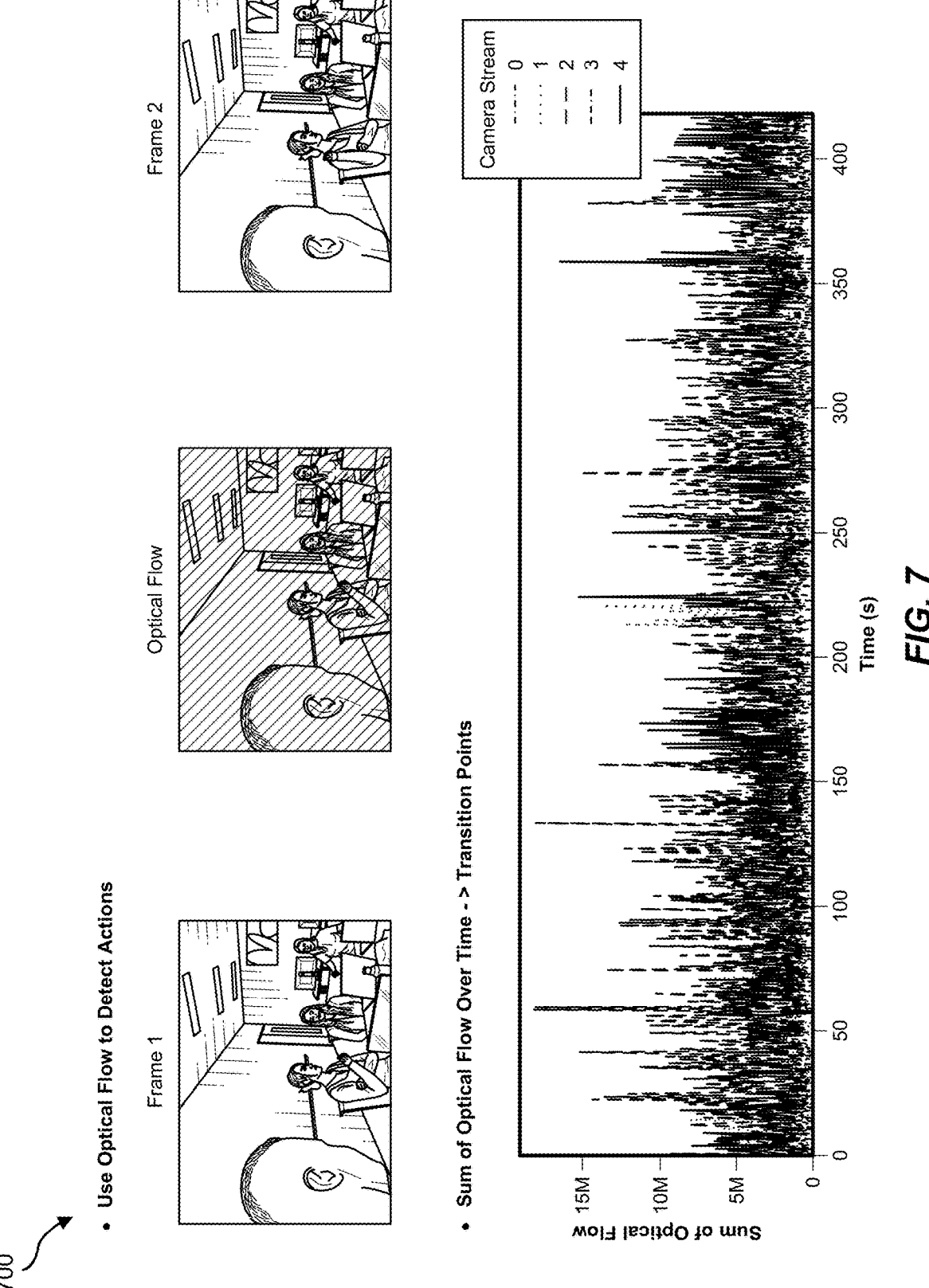
FIG. 7 illustrates an example process of using optical flow analysis to detect actions within video content and identify transition points for applying video editing techniques.

By way of illustration, FIG. 7 includes a view 700 that illustrates an example process of using optical flow analysis that one or more of the systems described herein (e.g., example system 100, example system 200, etc.) may use to detect actions within video content and identify transition points for applying video editing techniques. Optical flow refers to the pattern of apparent motion of objects, surfaces, and edges within a visual scene, as detected in sequential frames of video. The figure is divided into two main parts: a sequence of video frames with associated optical flow detection, and a graph representing the aggregated optical flow over time across multiple camera streams.

The top section of FIG. 7 shows a simplified representation of video frames captured during a scene, denoted as "Frame 1" and "Frame 2." Between these frames, the system computes optical flow to identify motion vectors that indicate the direction and magnitude of movement within the scene. For instance, the optical flow visualization highlights areas of activity, such as a person speaking, gesturing, or moving. These motion patterns are overlaid on the frame to indicate detected changes that may represent significant actions or transitions of interest.

The bottom section of FIG. 7 presents a graph plotting the sum of optical flow over time for multiple camera streams, labeled as Camera Stream 0 through Camera Stream 4. The x-axis represents time in seconds, while the y-axis shows the aggregated magnitude of optical flow. Peaks in the graph correspond to periods of heightened motion or activity within the captured scenes, indicating potential transition points for camera switching or video editing. For example, a peak might indicate an action such as a person standing up, making a significant gesture, or an object entering the frame, which warrants an editing decision.

The system leverages these optical flow measurements to dynamically determine editing decisions. For instance, when a significant peak in optical flow is detected, the system may automatically transition between camera streams to focus on the area of activity or adjust the framing within a single camera stream. The detected transition points are derived based on thresholds or patterns in the optical flow data, ensuring smooth and contextually relevant video edits.

This process enhances video production by automating the identification of key moments in real-time, enabling dynamic and responsive transitions that align with the narrative flow. The use of multiple camera streams further allows the system to choose optimal perspectives for capturing action, ensuring a seamless and professional viewing experience. By visualizing optical flow and aggregating motion data across time and streams, the system provides a robust framework for intelligent and adaptive video editing.

Figure 8:
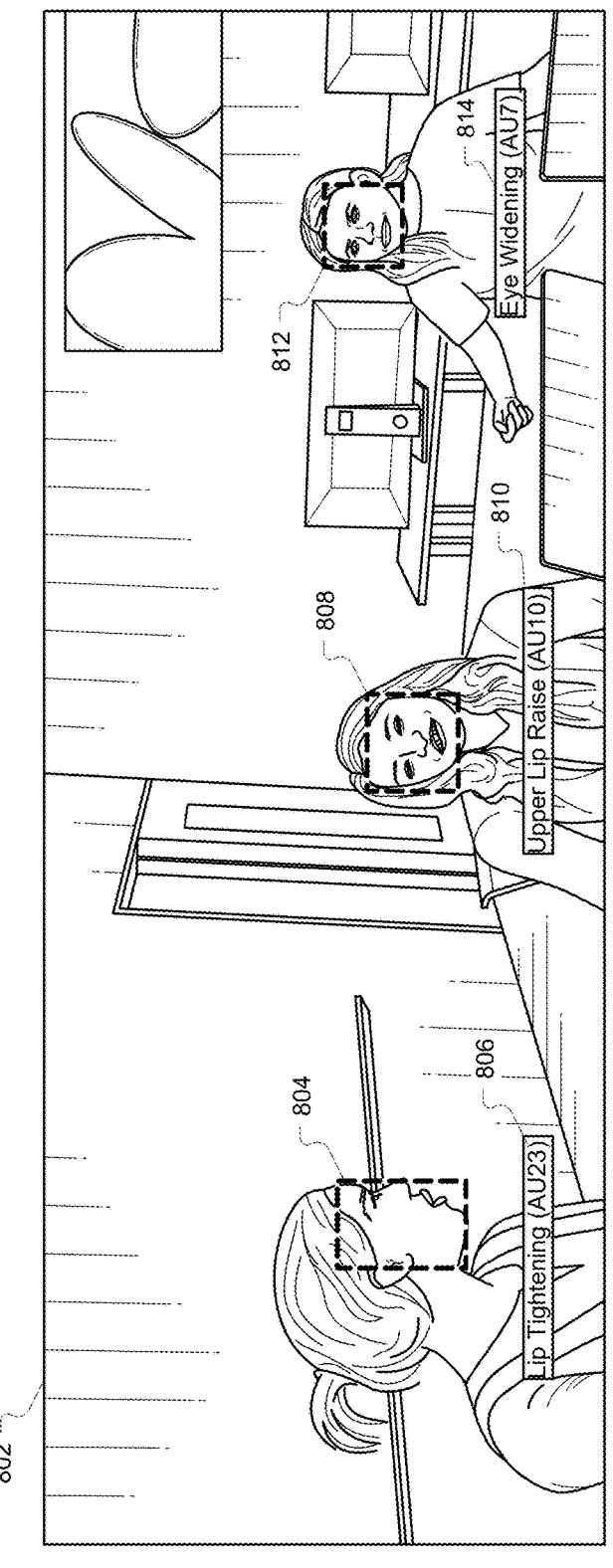
FIG. 8 includes a view that illustrates embodiments of identifying and analyzing user emotional states based on facial expression recognition using advanced computer vision techniques.

FIG. 8 includes a view 800 that illustrates embodiments of identifying and analyzing user emotional states based on facial expression recognition using advanced computer vision techniques as may be implemented as one or more components of Behavior Detection Library 608. A video content view 802 shows an environment such as a collaborative video meeting or a group interaction setting. It includes the detection and classification of facial expressions displayed by users 804, 808, and 812. These expressions are analyzed using action units (AUs), which are standardized indicators of facial muscle movements as defined by the Facial Action Coding System (FACS).

In the depicted scene, the user 804 exhibits an expression labeled as "Lip Tightening" associated with AU23. This action unit indicates the activation of muscles responsible for pressing the lips together, which may signify tension, determination, or displeasure. The system detects and tracks the facial features of user 804 in real time, applying trained models to classify and interpret the observed expression.

User 808, in contrast, is shown with an expression labeled as "Upper Lip Raise," associated with AU10. This action unit reflects an elevation of the upper lip, often indicative of emotions such as disgust or surprise, depending on the context. The system identifies the specific muscle activation and links it to a potential emotional state, which can be used to adapt video editing or interaction flows dynamically.

Similarly, user 812 is depicted with an expression labeled as "Eye Widening," corresponding to AU7. This action unit involves the widening of the eyes, a movement often associated with surprise, shock, or alertness. One or more of modules 102 detects this subtle muscle movement and analyzes its potential emotional implications in the context of the ongoing interaction.

Some embodiments may leverage real-time facial analysis capabilities to assess these action units and infer emotional states. By mapping the identified AUs to a database of predefined emotional states, the system can dynamically adjust the presentation or focus of video content. For instance, if an elevated level of surprise (e.g., AU7) is detected across multiple users, the system may emphasize or replay a specific segment of the video to ensure that the surprising event is captured effectively.

Video content view 802 provides contextual data for interpreting the facial expressions, such as the presence of multiple users, their positions within the room, and background elements. Embodiments can also integrate this information with additional behavioral cues, such as voice modulation or body gestures, to refine its emotional analysis. The integration of such multimodal data enhances accuracy in identifying and responding to user emotional states.

Hence, FIG. 8 demonstrates how embodiments of the present disclosure may combine real-time face tracking, action unit analysis, and contextual interpretation to deliver an adaptive and engaging video editing experience. By automating the recognition of user emotions, embodiments may facilitate seamless interaction in group settings, enriching the overall user experience and ensuring that the video content aligns with the participants' emotional dynamics.

FIG. 9 includes a table 900 that outlines example rules that embodiments of the systems and methods described herein may employ to facilitate automated digital video editing. These rules are designed to ensure smooth, context-aware transitions and effective framing in various multi-user video environments, such as virtual meetings or collaborative sessions. The table is organized into conditions ("When") and corresponding actions that guide the editing process.

The first row specifies actions for situations where there are more than 32 people in the reels. Under these circumstances, the embodiments prioritize the use of a room-wide camera stream as the primary visual source to ensure that all participants are captured cohesively. The rules include a "smart frame" capability, which adjusts the camera focus dynamically to encompass the group within the room. If no single camera stream can cover the entire room, the embodiments may stitch multiple streams together to provide a comprehensive view. Additionally, when an active speaker is detected, the editing transitions to focus on that speaker's stream to highlight their contribution.

The second row describes the handling of scenarios where there are 32 or fewer people in the reels. In these cases, the embodiments offer two options. Option 1 involves arranging the video streams in a "Brady Bunch" layout, where individual streams for each participant are displayed simultaneously in an organized grid format. This layout ensures that every participant is visible without overlap. Option 2 involves showing multiple camera streams without duplications, which may dynamically switch between different participants or views based on activity detection or predefined criteria.

The third row presents a general rule applicable at all times. It states that a delay of two seconds should be applied before switching to a new video stream, such as when a person begins speaking. This delay prevents excessive or premature switching, which could result from brief or accidental signals, and ensures a smoother and more deliberate transition. By waiting for this brief period, the editing process avoids creating a disjointed or erratic viewing experience.

The fourth row introduces another rule that is always applied. It specifies the use of dissolve animations to smooth transitions between video streams. Dissolve effects create gradual visual changes rather than abrupt cuts, maintaining a polished and professional aesthetic. These animations enhance the overall coherence of the edited video, especially in collaborative or dynamic environments where frequent transitions may occur.

Together, these rules provide a robust framework for embodiments of the systems and methods described herein to dynamically manage video editing in real-time or post-processing scenarios. The rules ensure that the resulting video is visually cohesive, contextually relevant, and engaging for viewers. By adapting to the number of participants, activity levels, and environmental conditions, these embodiments achieve an efficient and user-friendly editing process.

FIG. 10 includes a table 1000 that illustrates a set of heuristics that may be employed by embodiments of the systems and methods described herein to manage dynamic camera movements in a video editing or streaming context. These heuristics may enable an intelligent response to user behaviors and interactions, enhancing the overall coherence and engagement of the video output.

The table consists of two primary columns: the left column describes specific user behaviors or scenarios, while the right column outlines the corresponding camera actions to be performed. These heuristics allow for adaptive video editing that maintains focus on relevant activities and ensures smooth transitions.

In the first row, the heuristic describes a scenario where one user is speaking and others are nodding in agreement. In such cases, embodiments may identify the nodding participants and adjusts the camera framing to include their reactions. This approach ensures that the video captures the broader engagement within the conversation, emphasizing both the speaker and the audience's acknowledgment.

The second row addresses a scenario where two participants are engaged in a conversation. If the participants are seated next to each other, embodiments may employ a "smart framing" technique to capture both participants within a single camera stream, optimizing visual coherence. If the participants are seated separately, the embodiments may apply a "Brady Bunch" layout to display individual video streams for each participant, ensuring their interactions are clearly visible.

In the fourth row, the heuristic outlines a response to a user raising their hand, which may indicate a desire to contribute to the discussion. Embodiments may respond by zooming in on the user, drawing attention to their gesture and signaling their intent to the audience.

The fifth row specifies a rule for instances where a participant looks directly into the camera. In such cases, embodiments may switch to that camera view as the main focus, emphasizing the direct connection between the participant and the audience, often interpreted as an intentional engagement or statement.

The sixth row describes how the system handles scenarios where a user stands up and their head leaves the camera frame. Embodiments may dynamically identify the camera that captures the user's re-entry into the frame and transitions to it, ensuring continuity in visual coverage.

The seventh row provides a heuristic for managing overlapping movements, such as when a user's head moves across another person's field of view. Here, embodiments may switch the video content to a camera view where the first user's face is unobstructed. This transition is further refined by prioritizing users who are actively speaking during such movements, ensuring focus is maintained on the most contextually relevant participant.

Finally, the eighth row describes how embodiments may handle gestures where one participant extends their hand toward another. Embodiments may switch to a cut that includes both participants within the frame, capturing the interaction between them and highlighting the gesture's context.

These heuristics showcase how embodiments of the systems and methods described herein use real-time analysis of user behaviors to guide camera movements, ensuring that the resulting video dynamically adapts to the actions and interactions of participants. This approach enhances viewer engagement by creating a polished and contextually aware video experience.

In summary, the present disclosure relates to an automated digital video editing framework that simplifies and enhances the process of creating cinematic video content. This framework is designed to overcome the traditional challenges of manual video editing, which often require significant time, skill, and effort, and which have historically been barriers for creators and businesses to produce professional-grade videos.

Embodiments of the disclosed systems and methods may provide a user-friendly video creation interface that includes a list of selectable video styles. These styles represent a variety of options, such as those mimicking the techniques of specific directors, film genres (e.g., comedy, thriller, or western), video types (e.g., music video or documentary), and even specific editing techniques like rapid cuts, dramatic zooming, or object-focused editing. Users can select a video style, and the system automatically applies the corresponding video editing techniques to their content. These techniques are generated by leveraging trained models that have been optimized to recognize and replicate aesthetic attributes from training data, such as color schemes, pacing, and visual transitions.

Embodiments may dynamically apply video editing effects to enhance the video's visual presentation and narrative flow. These include zooming into specific objects (e.g., faces, hands, or other points of interest), applying stylistic cuts or transitions (e.g., fades or dissolves), and dynamically adjusting visual attributes such as brightness, contrast, and vibrancy. The edits can be applied post-processing, in real time during video capture, or even in live-streaming contexts, ensuring adaptability across different use cases. For example, in a live-streaming scenario, the system can detect and emphasize a speaker's face or adjust focus to highlight a key object, all in real time.

One aspect of embodiments of the present disclosure is an ability to integrate seamlessly into collaborative or group video creation sessions. The framework supports input from multiple devices and cameras, enabling video streams to be combined into a single coherent video. For instance, it can dynamically switch between streams based on detected activity, such as a speaker's gestures or voice, or apply preconfigured switching patterns. This feature is particularly beneficial for enterprise applications, such as video conferencing or virtual events, where the system can highlight active participants or adapt layouts to fit the number of attendees.

The disclosed framework may also support advanced scenarios, such as mixed-dimensionality video editing for 2D and 3D environments. For example, it can facilitate collaboration between users participating via traditional 2D devices and those using 3D artificial reality devices. In such cases, the system tailors representations for each medium, ensuring a seamless experience across formats.

Embodiments of the present disclosure may operate efficiently across a range of devices and network environments, leveraging cloud-based processing for resource-intensive tasks or edge computing for real-time responsiveness. Features like adaptive streaming and prefetching optimize performance in scenarios with limited bandwidth or device capabilities, ensuring high-quality output regardless of hardware constraints.

Hence, embodiments of the present disclosure may democratize video editing by making sophisticated tools accessible to individual creators, enterprises, and social media users. Embodiments may significantly reduce the time and effort required to create professional-grade video content, providing a seamless, automated editing experience powered by advanced AI and machine learning models. By integrating dynamic real-time editing, multi-camera collaboration, and adaptive 2D/3D functionality, embodiments of the present disclosure may offer a scalable and versatile solution for modern video production challenges.

EXAMPLE EMBODIMENTS

Example 1: A computer-implemented method comprising (1) presenting, within a video creation interface, a list of video styles, each video style within the list of video styles representative of a trained model, the trained model trained to apply different aesthetic attributes to video content in accordance with a different video style, (2) receiving, via user input to the video creation interface, a selection of a particular video style from the list of video styles, and (3) in response to receiving the selection, applying, to video content received via the video creation interface, a video editing technique corresponding to the particular video style.

Example 2: The computer-implemented method of example 1, further comprising (1) applying, as input to a trained model, training video content corresponding to the particular video style, and (2) receiving the video editing technique as an output from the trained model.

Example 3: The computer-implemented method of any of examples 1-2, wherein (1) the list of video styles comprises a list of different directors, and (2) the particular video style comprises a particular director.

Example 4: The computer-implemented method of any of examples 1-3, wherein the video creation interface is presented as part of a social media content creation process.

Example 5: The computer-implemented method of any of examples 1-4, wherein (1) the video editing technique comprises a type of video edit corresponding to a type of object, and (2) applying the video editing technique to the video content comprises (A) detecting an object, corresponding to the type of object, in the video content, and (B) applying the type of video edit to the detected object.

Example 6: The computer-implemented method of example 5, wherein the type of object comprises a face captured in the video content.

Example 7: The computer-implemented method of any of examples 5-6, wherein the type of video edit comprises a video edit determined to draw attention to the object.

Example 8: The computer-implemented method of any of examples 1-7, wherein (1) the video creation interface is presented to a user logged into a group video creation session, (2) the computer-implemented method further comprises (A) presenting an additional instance of the video creation interface to an additional user logged into the group video creation session, and (B) receiving additional video content via the additional instance of the video creation interface, (C) the video editing technique comprises a pattern of switching between video content received from different cameras, and (D) applying the video editing technique to the video content comprises switching between the video content and the additional video content in accordance with the pattern of switching.

Example 9: The computer-implemented method of example 8, wherein the pattern of switching comprises a frequency of switching between video content received from different cameras.

Example 10: The computer-implemented method of any of examples 7-8, further comprising providing an entry point, for at least one of initiating or joining the group video creation session, within a group chat interface for a group chat comprising, as members, both the user and the additional user.

Example 11: A system comprising (1) at least one physical processor, and (2) physical memory comprising computer-executable instructions that, when executed by the at least one physical processor, cause the at least one physical processor to: (A) present, within a video creation interface, a list of video styles, each video style within the list of video styles representative of a trained model, the trained model trained to apply different aesthetic attributes to video content in accordance with a different video style, (B) receive, via user input to the video creation interface, a selection of a particular video style from the list of video styles, and (C) in response to receiving the selection, apply, to video content received via the video creation interface, a video editing technique corresponding to the particular video style.

Example 12: The system of example 11, wherein the computer-executable instructions further cause the at least one physical processor to (1) apply, as input to a trained model, training video content corresponding to the particular video style, and (2) receive the video editing technique as an output from the trained model.

Example 13: The system of any of examples 11-12, wherein (1) the list of video styles comprises a list of different directors, and (2) the particular video style comprises a particular director.

Example 14: The system of any of examples 11-13, wherein the video creation interface is presented as part of a social media content creation process.

Example 15: The system of any of examples 11-14, wherein (1) the video editing technique comprises a type of video edit corresponding to a type of object, and (2) applying the video editing technique to the video content comprises: (3) detecting an object, corresponding to the type of object, in the video content, and (4) applying the type of video edit to the detected object.

Example 16: The system of example 15, wherein the type of object comprises a face captured in the video content.

Example 17: The system of any of examples 15-16, wherein the type of video edit comprises a video edit determined to draw attention to the object.

Example 18: A non-transitory computer-readable medium comprising one or more computer-readable instructions that, when executed by at least one processor of a computing device, cause the computing device to (1) present, within a video creation interface, a list of video styles, each video style within the list of video styles representative of a trained model, the trained model trained to apply different aesthetic attributes to video content in accordance with a different video style, (2) receive, via user input to the video creation interface, a selection of a particular video style from the list of video styles, and (3) in response to receiving the selection, apply, to video content received via the video creation interface, a video editing technique corresponding to the particular video style.

Example 19: The non-transitory computer-readable medium of example 18, wherein (1) the list of video styles comprises a list of different directors, and (2) the particular video style comprises a particular director.

Example 20: The non-transitory computer-readable medium of any of examples 18-19, wherein the video creation interface is presented as part of a social media content creation process.

Embodiments of the present disclosure may include or be implemented in conjunction with various types of Artificial Reality-(AR) systems. AR may be any superimposed functionality and/or sensory-detectable content presented by an artificial-reality system within a user's physical surroundings. In other words, AR is a form of reality that has been adjusted in some manner before presentation to a user. AR can include and/or represent virtual reality (VR), augmented reality, mixed AR (MAR), or some combination and/or variation of these types of realities. Similarly, AR environments may include VR environments (including non-immersive, semi-immersive, and fully immersive VR environments), augmented-reality environments (including marker-based augmented-reality environments, markerless augmented-reality environments, location-based augmented-reality environments, and projection-based augmented-reality environments), hybrid-reality environments, and/or any other type or form of mixed- or alternative-reality environments.

AR content may include completely computer-generated content or computer-generated content combined with captured (e.g., real-world) content. Such AR content may include video, audio, haptic feedback, or some combination thereof, any of which may be presented in a single channel or in multiple channels (such as stereo video that produces a three-dimensional (3D) effect to the viewer). Additionally, in some embodiments, AR may also be associated with applications, products, accessories, services, or some combination thereof, that are used to, for example, create content in an artificial reality and/or are otherwise used in (e.g., to perform activities in) an artificial reality.

AR systems may be implemented in a variety of different form factors and configurations. Some AR systems may be designed to work without near-eye displays (NEDs). Other AR systems may include a NED that also provides visibility into the real world (such as, e.g., augmented-reality system 1700 in FIG. 17) or that visually immerses a user in an artificial reality (such as, e.g., virtual-reality system 1800 in FIGS. 18A and 18B). While some AR devices may be self-contained systems, other AR devices may communicate and/or coordinate with external devices to provide an AR experience to a user. Examples of such external devices include handheld controllers, mobile devices, desktop computers, devices worn by a user, devices worn by one or more other users, and/or any other suitable external system.

Figure 11:
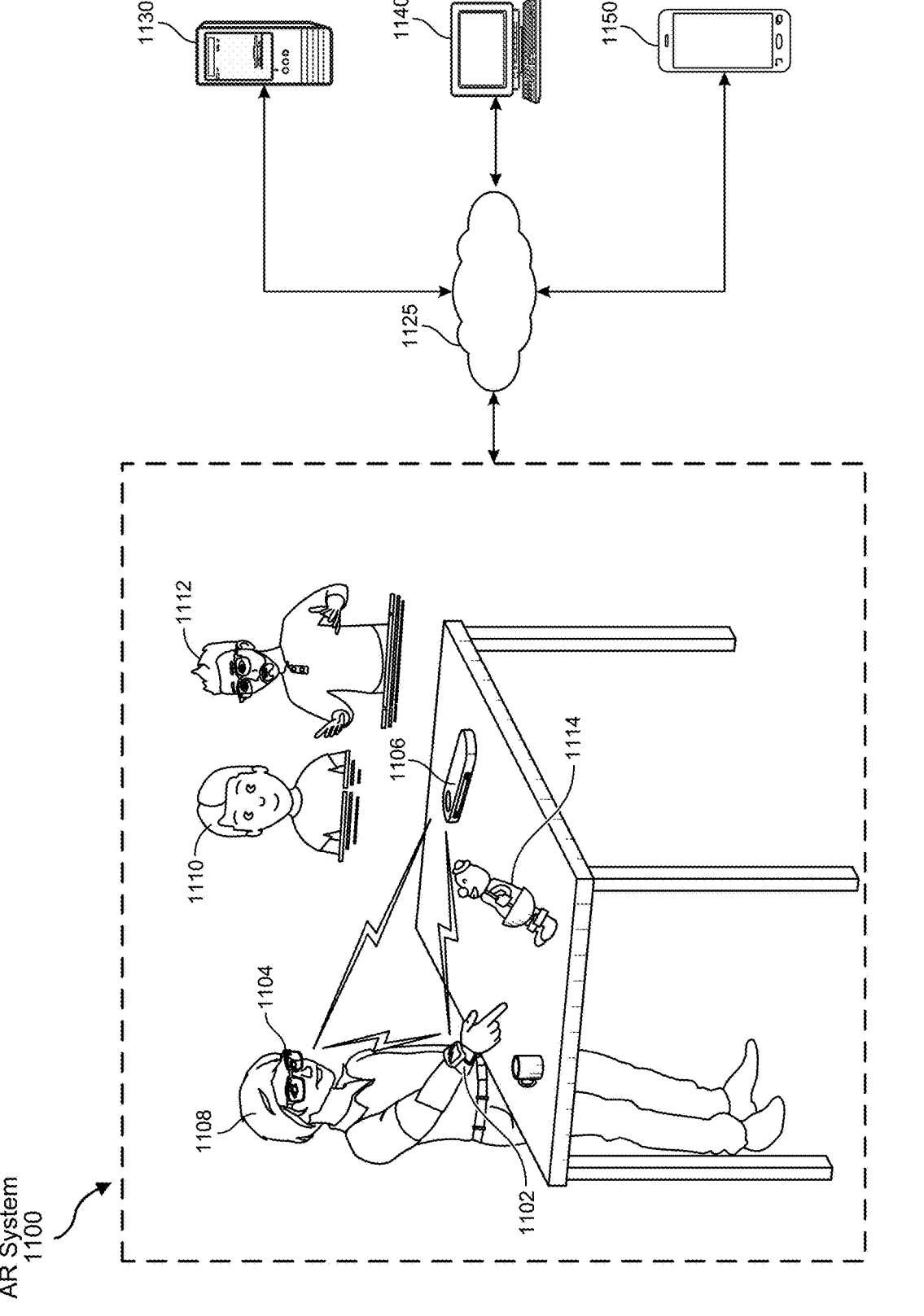
FIG. 11 is an illustration of an example artificial-reality system according to some embodiments of this disclosure.
Figure 12:
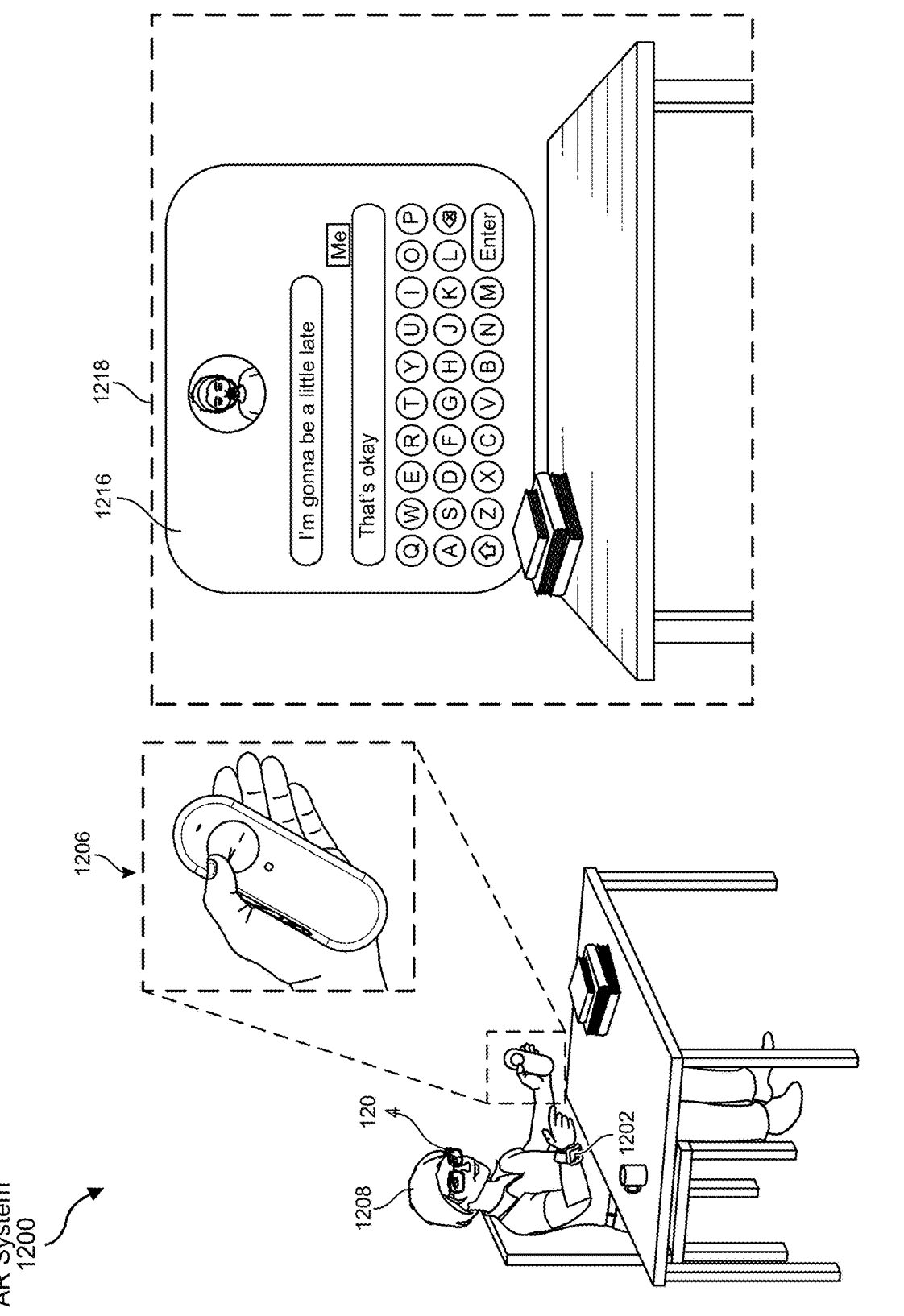
FIG. 12 is an illustration of an example artificial-reality system with a handheld device according to some embodiments of this disclosure.
Figure 13A:
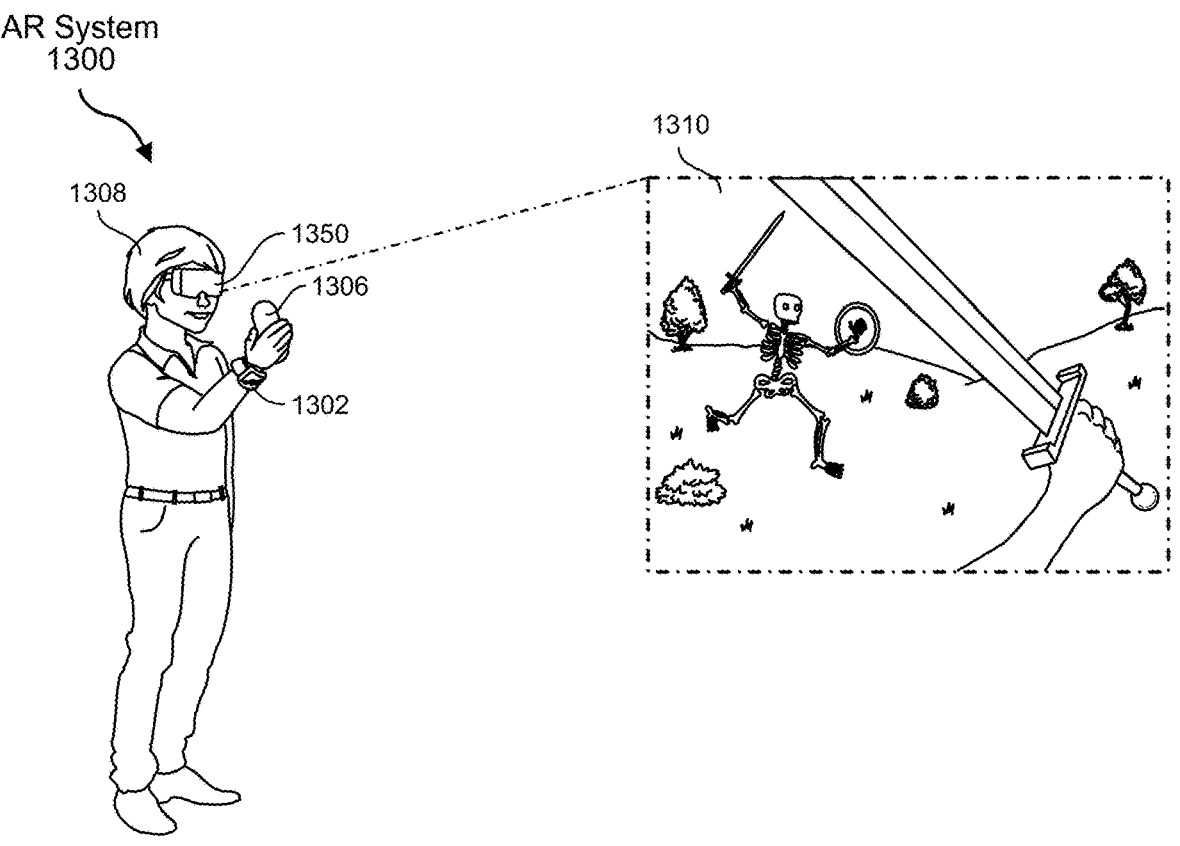
FIG. 13A is an illustration of example user interactions within an artificial-reality system according to some embodiments of this disclosure.
Figure 13B:
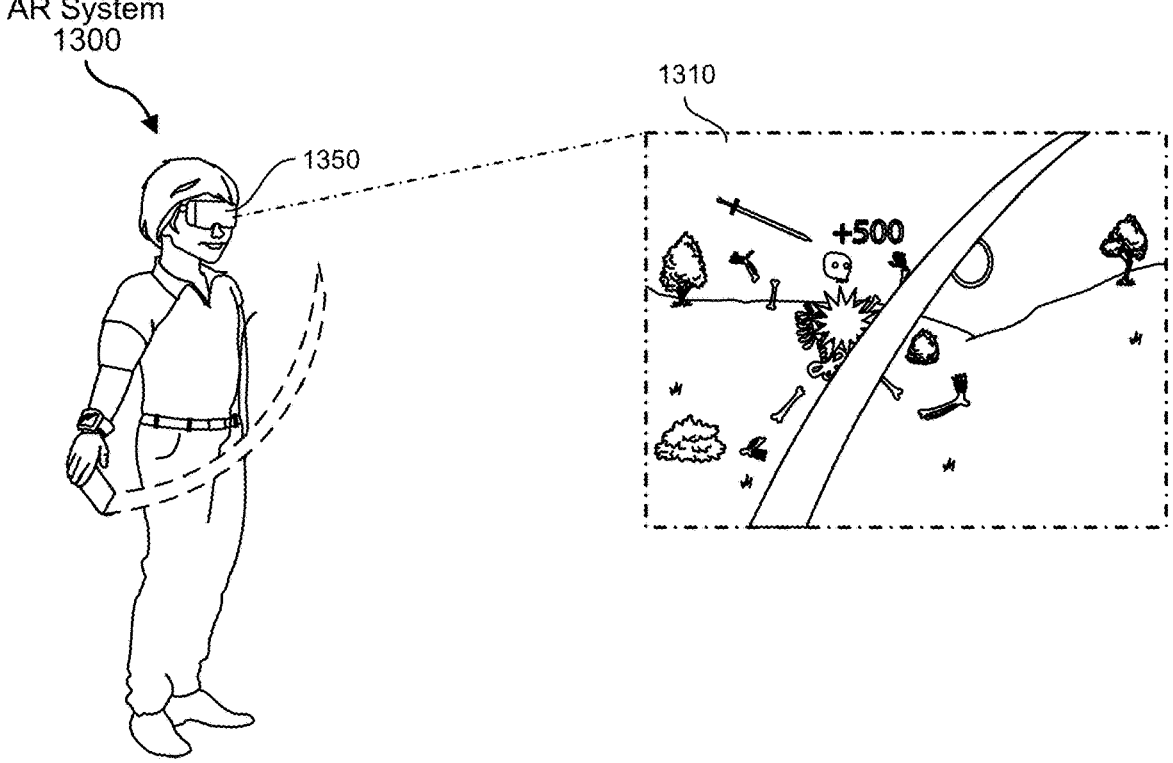
FIG. 13B is an illustration of example user interactions within an artificial-reality system according to some embodiments of this disclosure.
Figure 14A:
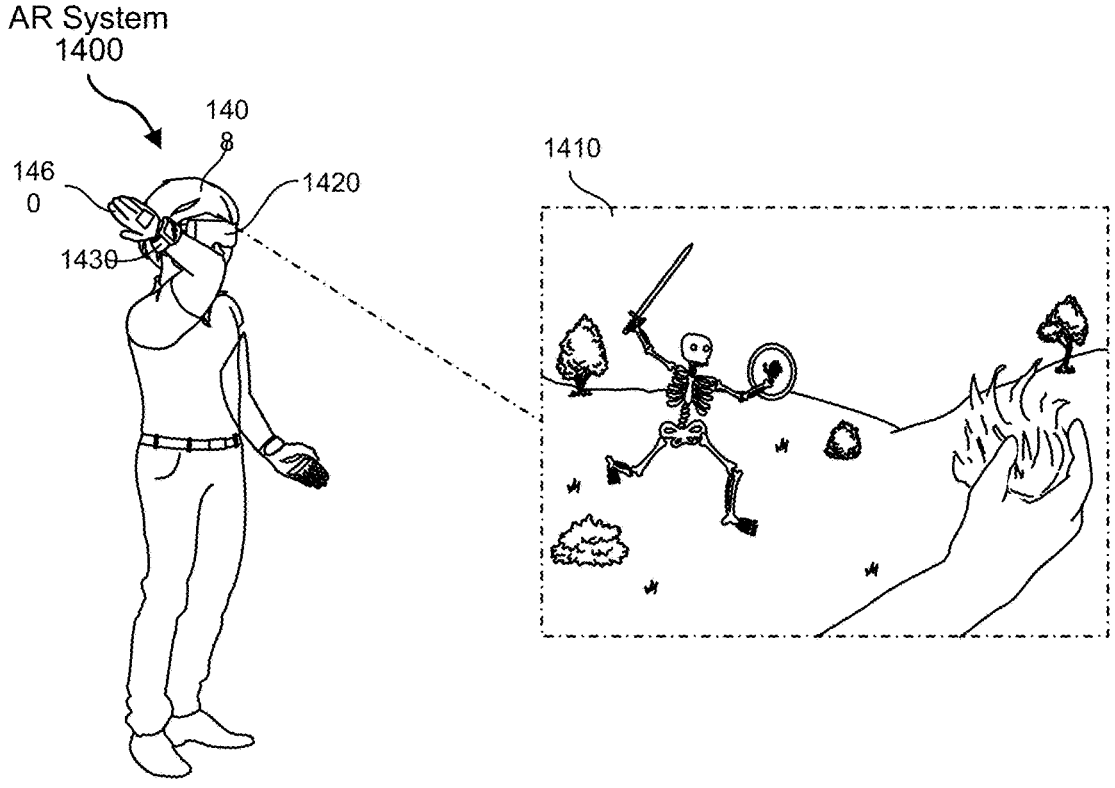
FIG. 14A is an illustration of example user interactions within an artificial-reality system according to some embodiments of this disclosure.
Figure 14B:
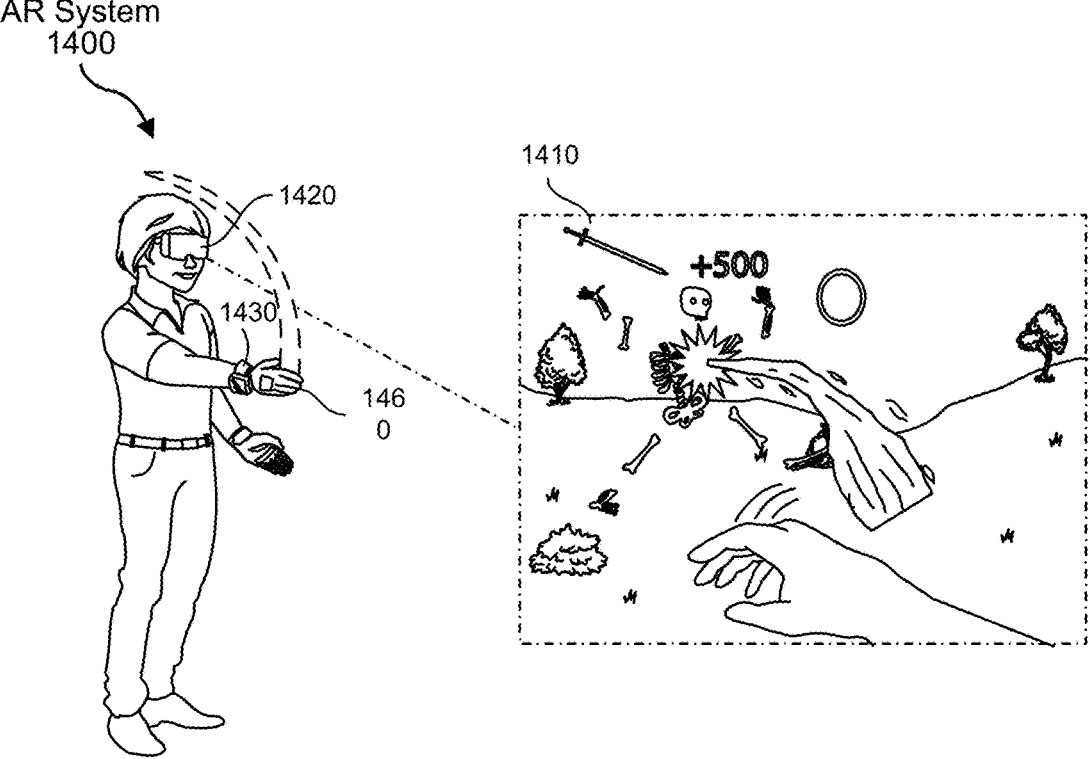
FIG. 14B is an illustration of example user interactions within an artificial-reality system according to some embodiments of this disclosure.

FIGS. 11-14B illustrate example artificial-reality (AR) systems in accordance with some embodiments. FIG. 11 shows a first AR system 1100 and first example user interactions using a wrist-wearable device 1102, a head-wearable device (e.g., AR glasses 1700), and/or a handheld intermediary processing device (HIPD) 1106. FIG. 12 shows a second AR system 1200 and second example user interactions using a wrist-wearable device 1202, AR glasses 1204, and/or an HIPD 1206. FIGS. 13A and 13B show a third AR system 1300 and third example user 1308 interactions using a wrist-wearable device 1302, a head-wearable device (e.g., VR headset 1350), and/or an HIPD 1306. FIGS. 14A and 14B show a fourth AR system 1400 and fourth example user 1408 interactions using a wrist-wearable device 1430, VR headset 1420, and/or a haptic device 1460 (e.g., wearable gloves).

A wrist-wearable device 1500, which can be used for wrist-wearable device 1102, 1202, 1302, 1430, and one or more of its components, are described below in reference to FIGS. 15 and 16; head-wearable devices 1700 and 1800, which can respectively be used for AR glasses 1104, 1204 or VR headset 1350, 1420, and their one or more components are described below in reference to FIGS. 17-19.

Referring to FIG. 11, wrist-wearable device 1102, AR glasses 1104, and/or HIPD 1106 can communicatively couple via a network 1125 (e.g., cellular, near field, Wi-Fi, personal area network, wireless LAN, etc.). Additionally, wrist-wearable device 1102, AR glasses 1104, and/or HIPD 1106 can also communicatively couple with one or more servers 1130, computers 1140 (e.g., laptops, computers, etc.), mobile devices 1150 (e.g., smartphones, tablets, etc.), and/or other electronic devices via network 1125 (e.g., cellular, near field, Wi-Fi, personal area network, wireless LAN, etc.).

In FIG. 11, a user 1108 is shown wearing wrist-wearable device 1102 and AR glasses 1104 and having HIPD 1106 on their desk. The wrist-wearable device 1102, AR glasses 1104, and HIPD 1106 facilitate user interaction with an AR environment. In particular, as shown by first AR system 1100, wrist-wearable device 1102, AR glasses 1104, and/or HIPD 1106 cause presentation of one or more avatars 1110, digital representations of contacts 1112, and virtual objects 1114. As discussed below, user 1108 can interact with one or more avatars 1110, digital representations of contacts 1112, and virtual objects 1114 via wrist-wearable device 1102, AR glasses 1104, and/or HIPD 1106.

User 1108 can use any of wrist-wearable device 1102, AR glasses 1104, and/or HIPD 1106 to provide user inputs. For example, user 1108 can perform one or more hand gestures that are detected by wrist-wearable device 1102 (e.g., using one or more EMG sensors and/or IMUs, described below in reference to FIGS. 15 and 16) and/or AR glasses 1104 (e.g., using one or more image sensor or camera, described below in reference to FIGS. 17-10) to provide a user input. Alternatively, or additionally, user 1108 can provide a user input via one or more touch surfaces of wrist-wearable device 1102, AR glasses 1104, HIPD 1106, and/or voice commands captured by a microphone of wrist-wearable device 1102, AR glasses 1104, and/or HIPD 1106. In some embodiments, wrist-wearable device 1102, AR glasses 1104, and/or HIPD 1106 include a digital assistant to help user 1108 in providing a user input (e.g., completing a sequence of operations, suggesting different operations or commands, providing reminders, confirming a command, etc.). In some embodiments, user 1108 can provide a user input via one or more facial gestures and/or facial expressions. For example, cameras of wrist-wearable device 1102, AR glasses 1104, and/or HIPD 1106 can track eyes of user 1108 for navigating a user interface.

Wrist-wearable device 1102, AR glasses 1104, and/or HIPD 1106 can operate alone or in conjunction to allow user 1108 to interact with the AR environment. In some embodiments, HIPD 1106 is configured to operate as a central hub or control center for the wrist-wearable device 1102, AR glasses 1104, and/or another communicatively coupled device. For example, user 1108 can provide an input to interact with the AR environment at any of wrist-wearable device 1102, AR glasses 1104, and/or HIPD 1106, and HIPD 1106 can identify one or more back-end and front-end tasks to cause the performance of the requested interaction and distribute instructions to cause the performance of the one or more back-end and front-end tasks at wrist-wearable device 1102, AR glasses 1104, and/or HIPD 1106. In some embodiments, a back-end task is a background processing task that is not perceptible by the user (e.g., rendering content, decompression, compression, etc.), and a front-end task is a user-facing task that is perceptible to the user (e.g., presenting information to the user, providing feedback to the user, etc.). HIPD 1106 can perform the back-end tasks and provide wrist-wearable device 1102 and/or AR glasses 1104 operational data corresponding to the performed back-end tasks such that wrist-wearable device 1102 and/or AR glasses 1104 can perform the front-end tasks. In this way, HIPD 1106, which has more computational resources and greater thermal headroom than wrist-wearable device 1102 and/or AR glasses 1104, performs computationally intensive tasks and reduces the computer resource utilization and/or power usage of wrist-wearable device 1102 and/or AR glasses 1104.

In the example shown by first AR system 1100, HIPD 1106 identifies one or more back-end tasks and front-end tasks associated with a user request to initiate an AR video call with one or more other users (represented by avatar 1110 and the digital representation of contact 1112) and distributes instructions to cause the performance of the one or more back-end tasks and front-end tasks. In particular, HIPD 1106 performs back-end tasks for processing and/or rendering image data (and other data) associated with the AR video call and provides operational data associated with the performed back-end tasks to AR glasses 1104 such that the AR glasses 1104 perform front-end tasks for presenting the AR video call (e.g., presenting avatar 1110 and digital representation of contact 1112).

In some embodiments, HIPD 1106 can operate as a focal or anchor point for causing the presentation of information. This allows user 1108 to be generally aware of where information is presented. For example, as shown in first AR system 1100, avatar 1110 and the digital representation of contact 1112 are presented above HIPD 1106. In particular, HIPD 1106 and AR glasses 1104 operate in conjunction to determine a location for presenting avatar 1110 and the digital representation of contact 1112. In some embodiments, information can be presented a predetermined distance from HIPD 1106 (e.g., within 5 meters). For example, as shown in first AR system 1100, virtual object 1114 is presented on the desk some distance from HIPD 1106. Similar to the above example, HIPD 1106 and AR glasses 1104 can operate in conjunction to determine a location for presenting virtual object 1114. Alternatively, in some embodiments, presentation of information is not bound by HIPD 1106. More specifically, avatar 1110, digital representation of contact 1112, and virtual object 1114 do not have to be presented within a predetermined distance of HIPD 1106.

User inputs provided at wrist-wearable device 1102, AR glasses 1104, and/or HIPD 1106 are coordinated such that the user can use any device to initiate, continue, and/or complete an operation. For example, user 1108 can provide a user input to AR glasses 1104 to cause AR glasses 1104 to present virtual object 1114 and, while virtual object 1114 is presented by AR glasses 1104, user 1108 can provide one or more hand gestures via wrist-wearable device 1102 to interact and/or manipulate virtual object 1114.

FIG. 12 shows a user 1208 wearing a wrist-wearable device 1202 and AR glasses 1204, and holding an HIPD 1206. In second AR system 1200, the wrist-wearable device 1202, AR glasses 1204, and/or HIPD 1206 are used to receive and/or provide one or more messages to a contact of user 1208. In particular, wrist-wearable device 1202, AR glasses 1204, and/or HIPD 1206 detect and coordinate one or more user inputs to initiate a messaging application and prepare a response to a received message via the messaging application.

In some embodiments, user 1208 initiates, via a user input, an application on wrist-wearable device 1202, AR glasses 1204, and/or HIPD 1206 that causes the application to initiate on at least one device. For example, in second AR system 1200, user 1208 performs a hand gesture associated with a command for initiating a messaging application (represented by messaging user interface 1216), wrist-wearable device 1202 detects the hand gesture and, based on a determination that user 1208 is wearing AR glasses 1204, causes AR glasses 1204 to present a messaging user interface 1216 of the messaging application. AR glasses 1204 can present messaging user interface 1216 to user 1208 via its display (e.g., as shown by a field of view 1218 of user 1208). In some embodiments, the application is initiated and executed on the device (e.g., wrist-wearable device 1202, AR glasses 1204, and/or HIPD 1206) that detects the user input to initiate the application, and the device provides another device operational data to cause the presentation of the messaging application. For example, wrist-wearable device 1202 can detect the user input to initiate a messaging application, initiate and run the messaging application, and provide operational data to AR glasses 1204 and/or HIPD 1206 to cause presentation of the messaging application. Alternatively, the application can be initiated and executed at a device other than the device that detected the user input. For example, wrist-wearable device 1202 can detect the hand gesture associated with initiating the messaging application and cause HIPD 1206 to run the messaging application and coordinate the presentation of the messaging application.

Further, user 1208 can provide a user input provided at wrist-wearable device 1202, AR glasses 1204, and/or HIPD 1206 to continue and/or complete an operation initiated at another device. For example, after initiating the messaging application via wrist-wearable device 1202 and while AR glasses 1204 present messaging user interface 1216, user 1208 can provide an input at HIPD 1206 to prepare a response (e.g., shown by the swipe gesture performed on HIPD 1206). Gestures performed by user 1208 on HIPD 1206 can be provided and/or displayed on another device. For example, a swipe gestured performed on HIPD 1206 is displayed on a virtual keyboard of messaging user interface 1216 displayed by AR glasses 1204.

In some embodiments, wrist-wearable device 1202, AR glasses 1204, HIPD 1206, and/or any other communicatively coupled device can present one or more notifications to user 1208. The notification can be an indication of a new message, an incoming call, an application update, a status update, etc. User 1208 can select the notification via wrist-wearable device 1202, AR glasses 1204, and/or HIPD 1206 and can cause presentation of an application or operation associated with the notification on at least one device. For example, user 1208 can receive a notification that a message was received at wrist-wearable device 1202, AR glasses 1204, HIPD 1206, and/or any other communicatively coupled device and can then provide a user input at wrist-wearable device 1202, AR glasses 1204, and/or HIPD 1206 to review the notification, and the device detecting the user input can cause an application associated with the notification to be initiated and/or presented at wrist-wearable device 1202, AR glasses 1204, and/or HIPD 1206.

While the above example describes coordinated inputs used to interact with a messaging application, user inputs can be coordinated to interact with any number of applications including, but not limited to, gaming applications, social media applications, camera applications, web-based applications, financial applications, etc. For example, AR glasses 1204 can present to user 1208 game application data, and HIPD 1206 can be used as a controller to provide inputs to the game. Similarly, user 1208 can use wrist-wearable device 1202 to initiate a camera of AR glasses 1204, and user 308 can use wrist-wearable device 1202, AR glasses 1204, and/or HIPD 1206 to manipulate the image capture (e.g., zoom in or out, apply filters, etc.) and capture image data.

Users may interact with the devices disclosed herein in a variety of ways. For example, as shown in FIGS. 13A and 13B, a user 1308 may interact with an AR system 1300 by donning a VR headset 1350 while holding HIPD 1306 and wearing wrist-wearable device 1302. In this example, AR system 1300 may enable a user to interact with a game 1310 by swiping their arm. One or more of VR headset 1350, HIPD 1306, and wrist-wearable device 1302 may detect this gesture and, in response, may display a sword strike in game 1310. Similarly, in FIGS. 14A and 14B, a user 1408 may interact with an AR system 1400 by donning a VR headset 1420 while wearing haptic device 1460 and wrist-wearable device 1430. In this example, AR system 1400 may enable a user to interact with a game 1410 by swiping their arm. One or more of VR headset 1420, haptic device 1460, and wrist-wearable device 1430 may detect this gesture and, in response, may display a spell being cast in game 1310.

Having discussed example AR systems, devices for interacting with such AR systems and other computing systems more generally will now be discussed in greater detail. Some explanations of devices and components that can be included in some or all of the example devices discussed below are explained herein for ease of reference. Certain types of the components described below may be more suitable for a particular set of devices, and less suitable for a different set of devices. But subsequent reference to the components explained here should be considered to be encompassed by the descriptions provided.

In some embodiments discussed below, example devices and systems, including electronic devices and systems, will be addressed. Such example devices and systems are not intended to be limiting, and one of skill in the art will understand that alternative devices and systems to the example devices and systems described herein may be used to perform the operations and construct the systems and devices that are described herein.

An electronic device may be a device that uses electrical energy to perform a specific function. An electronic device can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device may be a device that sits between two other electronic devices and/or a subset of components of one or more electronic devices and facilitates communication, data processing, and/or data transfer between the respective electronic devices and/or electronic components.

An integrated circuit may be an electronic device made up of multiple interconnected electronic components such as transistors, resistors, and capacitors. These components may be etched onto a small piece of semiconductor material, such as silicon. Integrated circuits may include analog integrated circuits, digital integrated circuits, mixed signal integrated circuits, and/or any other suitable type or form of integrated circuit. Examples of integrated circuits include application-specific integrated circuits (ASICs), processing units, central processing units (CPUs), co-processors, and accelerators.

Analog integrated circuits, such as sensors, power management circuits, and operational amplifiers, may process continuous signals and perform analog functions such as amplification, active filtering, demodulation, and mixing. Examples of analog integrated circuits include linear integrated circuits and radio frequency circuits.

Digital integrated circuits, which may be referred to as logic integrated circuits, may include microprocessors, microcontrollers, memory chips, interfaces, power management circuits, programmable devices, and/or any other suitable type or form of integrated circuit. In some embodiments, examples of integrated circuits include central processing units (CPUs), Processing units, such as CPUs, may be electronic components that are responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) an accelerator, such as a graphics processing unit (GPU), designed to accelerate the creation and rendering of images, videos, and animations (e.g., virtual-reality animations, such as three-dimensional modeling); (iv) a field-programmable gate array (FPGA) that can be programmed and reconfigured after manufacturing and/or can be customized to perform specific tasks, such as signal processing, cryptography, and machine learning; and/or (v) a digital signal processor (DSP) designed to perform mathematical operations on signals such as audio, video, and radio waves. One or more processors of one or more electronic devices may be used in various embodiments described herein.

Memory generally refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders) and/or semi-permanently; (iii) flash memory, which can be configured to store data in electronic devices (e.g., USB drives, memory cards, and/or solid-state drives (SSDs)); and/or (iv) cache memory configured to temporarily store frequently accessed data and instructions. Memory, as described herein, can store structured data (e.g., SQL databases, MongoDB databases, GraphQL data, JSON data, etc.). Other examples of data stored in memory can include (i) profile data, including user account data, user settings, and/or other user data stored by the user, (ii) sensor data detected and/or otherwise obtained by one or more sensors, (iii) media content data including stored image data, audio data, documents, and the like, (iv)

application data, which can include data collected and/or otherwise obtained and stored during use of an application, and/or any other types of data described herein.

Controllers may be electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or (iv) DSPs.

A power system of an electronic device may be configured to convert incoming electrical power into a form that can be used to operate the device. A power system can include various components, such as (i) a power source, which can be an alternating current (AC) adapter or a direct current (DC) adapter power supply, (ii) a charger input, which can be configured to use a wired and/or wireless connection (which may be part of a peripheral interface, such as a USB, micro-USB interface, near-field magnetic coupling, magnetic inductive and magnetic resonance charging, and/or radio frequency (RF) charging), (iii) a power-management integrated circuit, configured to distribute power to various components of the device and to ensure that the device operates within safe limits (e.g., regulating voltage, controlling current flow, and/or managing heat dissipation), and/or (iv) a battery configured to store power to provide usable power to components of one or more electronic devices.

Peripheral interfaces may be electronic components (e.g., of electronic devices) that allow electronic devices to communicate with other devices or peripherals and can provide the ability to input and output data and signals. Examples of peripheral interfaces can include (i) universal serial bus (USB) and/or micro-USB interfaces configured for connecting devices to an electronic device, (ii) Bluetooth interfaces configured to allow devices to communicate with each other, including Bluetooth low energy (BLE), (iii) near field communication (NFC) interfaces configured to be short-range wireless interfaces for operations such as access control, (iv) POGO pins, which may be small, spring-loaded pins configured to provide a charging interface, (v) wireless charging interfaces, (vi) GPS interfaces, (vii) Wi-Fi interfaces for providing a connection between a device and a wireless network, and/or (viii) sensor interfaces.

Sensors may be electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device), (ii) biopotential-signal sensors, (iii) inertial measurement units (e.g., IMUs) for detecting, for example, angular rate, force, magnetic field, and/or changes in acceleration, (iv) heart rate sensors for measuring a user's heart rate, (v) SpO2 sensors for measuring blood oxygen saturation and/or other biometric data of a user, (vi) capacitive sensors for detecting changes in potential at a portion of a user's body (e.g., a sensor-skin interface), and/or (vii) light sensors (e.g., time-of-flight sensors, infrared light sensors, visible light sensors, etc.).

Biopotential-signal-sensing components may be devices used to measure electrical activity within the body (e.g., biopotential-signal sensors). Some types of biopotential-signal sensors include (i) electroencephalography (EEG) sensors configured to measure electrical activity in the brain to diagnose neurological disorders, (ii) electrocardiography (ECG or EKG) sensors configured to measure electrical activity of the heart to diagnose heart problems, (iii) electromyography (EMG) sensors configured to measure the electrical activity of muscles and to diagnose neuromuscular disorders, and (iv) electrooculography (EOG) sensors configure to measure the electrical activity of eye muscles to detect eye movement and diagnose eye disorders.

An application stored in memory of an electronic device (e.g., software) may include instructions stored in the memory. Examples of such applications include (i) games, (ii) word processors, (iii) messaging applications, (iv) media-streaming applications, (v) financial applications, (vi) calendars. (vii) clocks, and (viii) communication interface modules for enabling wired and/or wireless connections between different respective electronic devices (e.g., IEEE 1702.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or Home-Plug), and/or any other suitable communication protocols).

A communication interface may be a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

A graphics module may be a component or software module that is designed to handle graphical operations and/or processes and can include a hardware module and/or a software module.

Non-transitory computer-readable storage media may be physical devices or storage media that can be used to store electronic data in a non-transitory form (e.g., such that the data is stored permanently until it is intentionally deleted or modified).

Figure 15:
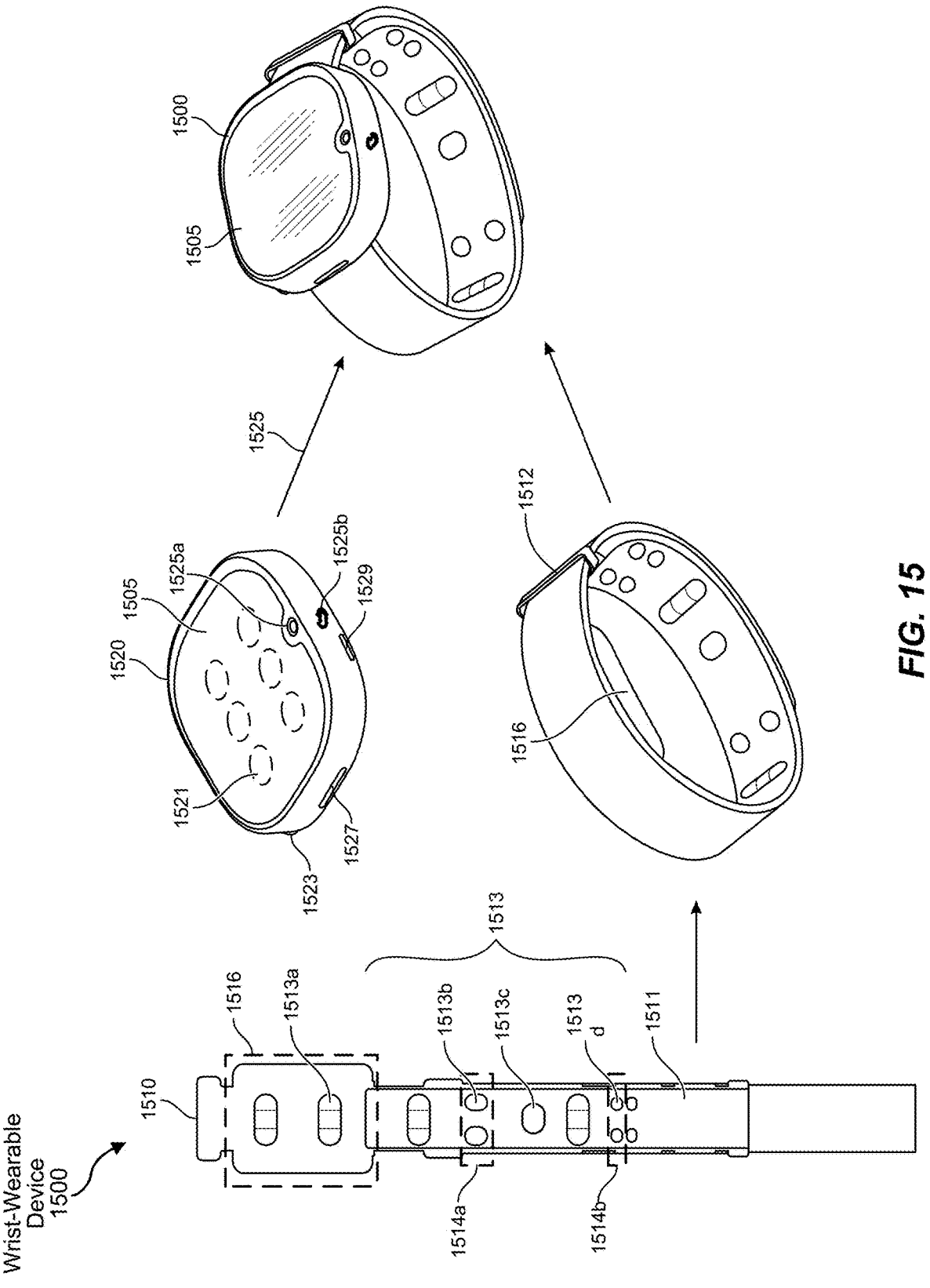
FIG. 15 is an illustration of an example wrist-wearable device of an artificial-reality system according to some embodiments of this disclosure.
Figure 16:
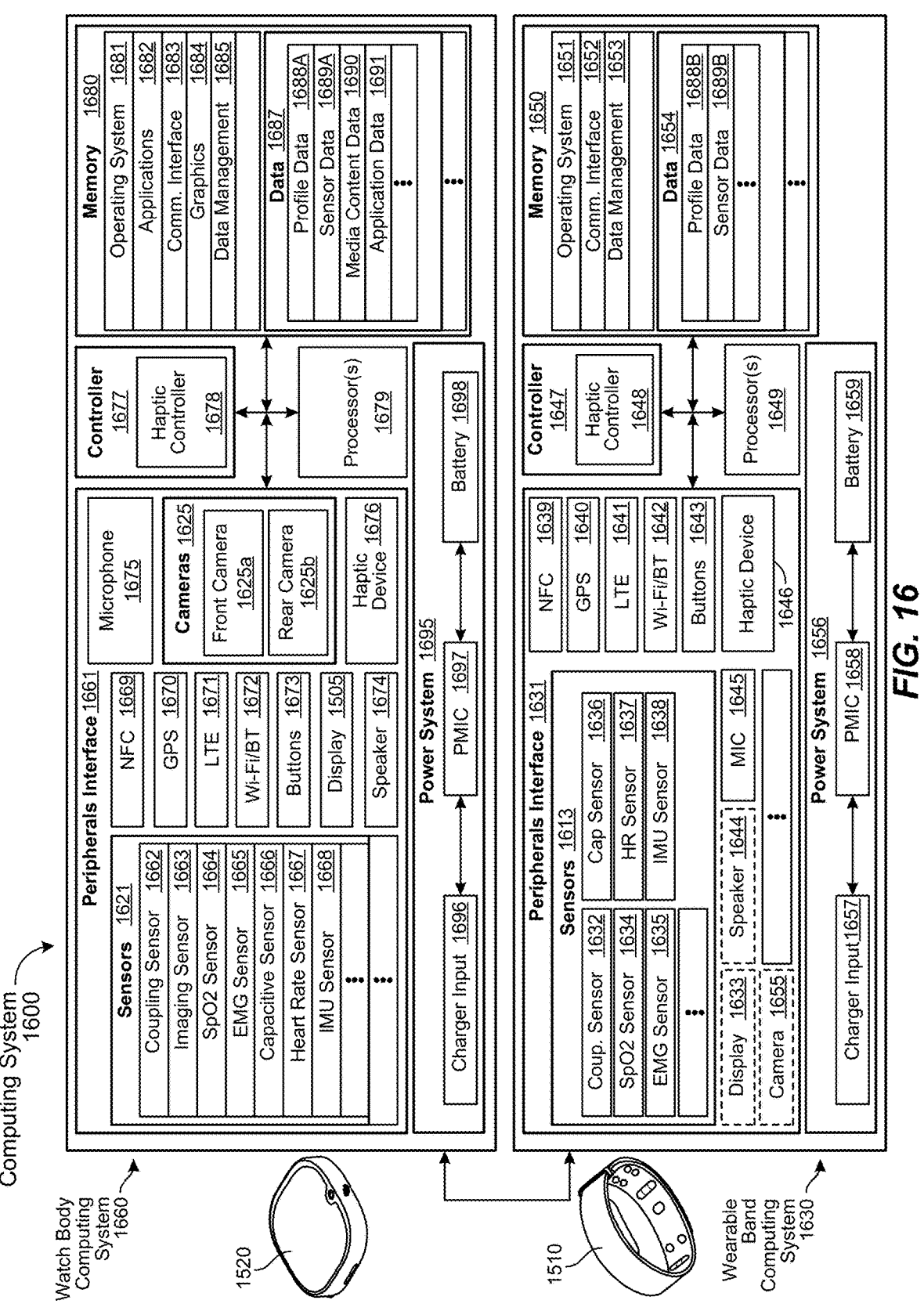
FIG. 16 is an illustration of an example wearable artificial-reality system according to some embodiments of this disclosure.

FIGS. 15 and 16 illustrate an example wrist-wearable device 1500 and an example computer system 1600, in accordance with some embodiments. Wrist-wearable device 1500 is an instance of wearable device 1102 described in FIG. 11 herein, such that the wearable device 1102 should be understood to have the features of the wrist-wearable device 1500 and vice versa. FIG. 16 illustrates components of the wrist-wearable device 1500, which can be used individually or in combination, including combinations that include other electronic devices and/or electronic components.

FIG. 15 shows a wearable band 1510 and a watch body 1520 (or capsule) being coupled, as discussed below, to form wrist-wearable device 1500. Wrist-wearable device 1500 can perform various functions and/or operations associated with navigating through user interfaces and selectively opening applications as well as the functions and/or operations described above with reference to FIGS. 11-14B.

As will be described in more detail below, operations executed by wrist-wearable device 1500 can include (i) presenting content to a user (e.g., displaying visual content via a display 1505), (ii) detecting (e.g., sensing) user input (e.g., sensing a touch on peripheral button 1523 and/or at a touch screen of the display 1505, a hand gesture detected by sensors (e.g., biopotential sensors)), (iii) sensing biometric data (e.g., neuromuscular signals, heart rate, temperature, sleep, etc.) via one or more sensors 1513, messaging (e.g., text, speech, video, etc.); image capture via one or more imaging devices or cameras 1525, wireless communications (e.g., cellular, near field, Wi-Fi, personal area network, etc.), location determination, financial transactions, providing haptic feedback, providing alarms, providing notifications, providing biometric authentication, providing health monitoring, providing sleep monitoring, etc.

The above-example functions can be executed independently in watch body 1520, independently in wearable band 1510, and/or via an electronic communication between watch body 1520 and wearable band 1510. In some embodiments, functions can be executed on wrist-wearable device 1500 while an AR environment is being presented (e.g., via one of AR systems 1100 to 1400). The wearable devices described herein can also be used with other types of AR environments.

Wearable band 1510 can be configured to be worn by a user such that an inner surface of a wearable structure 1511 of wearable band 1510 is in contact with the user's skin. In this example, when worn by a user, sensors 1513 may contact the user's skin. In some examples, one or more of sensors 1513 can sense biometric data such as a user's heart rate, a saturated oxygen level, temperature, sweat level, neuromuscular signals, or a combination thereof. One or more of sensors 1513 can also sense data about a user's environment including a user's motion, altitude, location, orientation, gait, acceleration, position, or a combination thereof. In some embodiment, one or more of sensors 1513 can be configured to track a position and/or motion of wearable band 1510. One or more of sensors 1513 can include any of the sensors defined above and/or discussed below with respect to FIG. 15.

One or more of sensors 1513 can be distributed on an inside and/or an outside surface of wearable band 1510. In some embodiments, one or more of sensors 1513 are uniformly spaced along wearable band 1510. Alternatively, in some embodiments, one or more of sensors 1513 are positioned at distinct points along wearable band 1510. As shown in FIG. 15, one or more of sensors 1513 can be the same or distinct. For example, in some embodiments, one or more of sensors 1513 can be shaped as a pill (e.g., sensor 1513a), an oval, a circle a square, an oblong (e.g., sensor 1513c) and/or any other shape that maintains contact with the user's skin (e.g., such that neuromuscular signal and/or other biometric data can be accurately measured at the user's skin). In some embodiments, one or more sensors of 1513 are aligned to form pairs of sensors (e.g., for sensing neuromuscular signals based on differential sensing within each respective sensor). For example, sensor 1513b may be aligned with an adjacent sensor to form sensor pair 1514a and sensor 1513d may be aligned with an adjacent sensor to form sensor pair 1514b. In some embodiments, wearable band 1510 does not have a sensor pair. Alternatively, in some embodiments, wearable band 1510 has a predetermined number of sensor pairs (one pair of sensors, three pairs of sensors, four pairs of sensors, six pairs of sensors, sixteen pairs of sensors, etc.).

Wearable band 1510 can include any suitable number of sensors 1513. In some embodiments, the number and arrangement of sensors 1513 depends on the particular application for which wearable band 1510 is used. For instance, wearable band 1510 can be configured as an armband, wristband, or chest-band that include a plurality of sensors 1513 with different number of sensors 1513, a variety of types of individual sensors with the plurality of sensors 1513, and different arrangements for each use case, such as medical use cases as compared to gaming or general day-to-day use cases.

In accordance with some embodiments, wearable band 1510 further includes an electrical ground electrode and a shielding electrode. The electrical ground and shielding electrodes, like the sensors 1513, can be distributed on the inside surface of the wearable band 1510 such that they contact a portion of the user's skin. For example, the electrical ground and shielding electrodes can be at an inside surface of a coupling mechanism 1516 or an inside surface of a wearable structure 1511. The electrical ground and shielding electrodes can be formed and/or use the same components as sensors 1513. In some embodiments, wearable band 1510 includes more than one electrical ground electrode and more than one shielding electrode.

Sensors 1513 can be formed as part of wearable structure 1511 of wearable band 1510. In some embodiments, sensors 1513 are flush or substantially flush with wearable structure 1511 such that they do not extend beyond the surface of wearable structure 1511. While flush with wearable structure 1511, sensors 1513 are still configured to contact the user's skin (e.g., via a skin-contacting surface). Alternatively, in some embodiments, sensors 1513 extend beyond wearable structure 1511 a predetermined distance (e.g., 0.1-2 mm) to make contact and depress into the user's skin. In some embodiment, sensors 1513 are coupled to an actuator (not shown) configured to adjust an extension height (e.g., a distance from the surface of wearable structure 1511) of sensors 1513 such that sensors 1513 make contact and depress into the user's skin. In some embodiments, the actuators adjust the extension height between 0.01 mm-1.2 mm. This may allow a the user to customize the positioning of sensors 1513 to improve the overall comfort of the wearable band 1510 when worn while still allowing sensors 1513 to contact the user's skin. In some embodiments, sensors 1513 are indistinguishable from wearable structure 1511 when worn by the user.

Wearable structure 1511 can be formed of an elastic material, elastomers, etc., configured to be stretched and fitted to be worn by the user. In some embodiments, wearable structure 1511 is a textile or woven fabric. As described above, sensors 1513 can be formed as part of a wearable structure 1511. For example, sensors 1513 can be molded into the wearable structure 1511, be integrated into a woven fabric (e.g., sensors 1513 can be sewn into the fabric and mimic the pliability of fabric and can and/or be constructed from a series woven strands of fabric).

Wearable structure 1511 can include flexible electronic connectors that interconnect sensors 1513, the electronic circuitry, and/or other electronic components (described below in reference to FIG. 16) that are enclosed in wearable band 1510. In some embodiments, the flexible electronic connectors are configured to interconnect sensors 1513, the electronic circuitry, and/or other electronic components of wearable band 1510 with respective sensors and/or other electronic components of another electronic device (e.g., watch body 1520). The flexible electronic connectors are configured to move with wearable structure 1511 such that the user adjustment to wearable structure 1511 (e.g., resizing, pulling, folding, etc.) does not stress or strain the electrical coupling of components of wearable band 1510.

As described above, wearable band 1510 is configured to be worn by a user. In particular, wearable band 1510 can be shaped or otherwise manipulated to be worn by a user. For example, wearable band 1510 can be shaped to have a substantially circular shape such that it can be configured to be worn on the user's lower arm or wrist. Alternatively, wearable band 1510 can be shaped to be worn on another body part of the user, such as the user's upper arm (e.g., around a bicep), forearm, chest, legs, etc. Wearable band 1510 can include a retaining mechanism 1512 (e.g., a buckle, a hook and loop fastener, etc.) for securing wearable band 1510 to the user's wrist or other body part. While wearable band 1510 is worn by the user, sensors 1513 sense data (referred to as sensor data) from the user's skin. In some examples, sensors 1513 of wearable band 1510 obtain (e.g., sense and record) neuromuscular signals.

The sensed data (e.g., sensed neuromuscular signals) can be used to detect and/or determine the user's intention to perform certain motor actions. In some examples, sensors 1513 may sense and record neuromuscular signals from the user as the user performs muscular activations (e.g., movements, gestures, etc.). The detected and/or determined motor actions (e.g., phalange (or digit) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on display 1505 of wrist-wearable device 1500 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table, dynamic gestures, such as grasping a physical or virtual object, and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by sensors 1513 can be used to provide a user with an enhanced interaction with a physical object (e.g., devices communicatively coupled with wearable band 1510) and/or a virtual object in an artificial-reality application generated by an artificial-reality system (e.g., user interface objects presented on the display 1505, or another computing device (e.g., a smartphone)).

In some embodiments, wearable band 1510 includes one or more haptic devices 1646 (e.g., a vibratory haptic actuator) that are configured to provide haptic feedback (e.g., a cutaneous and/or kinesthetic sensation, etc.) to the user's skin. Sensors 1513 and/or haptic devices 1646 (shown in FIG. 16) can be configured to operate in conjunction with multiple applications including, without limitation, health monitoring, social media, games, and artificial reality (e.g., the applications associated with artificial reality).

Wearable band 1510 can also include coupling mechanism 1516 for detachably coupling a capsule (e.g., a computing unit) or watch body 1520 (via a coupling surface of the watch body 1520) to wearable band 1510. For example, a cradle or a shape of coupling mechanism 1516 can correspond to shape of watch body 1520 of wrist-wearable device 1500. In particular, coupling mechanism 1516 can be configured to receive a coupling surface proximate to the bottom side of watch body 1520 (e.g., a side opposite to a front side of watch body 1520 where display 1505 is located), such that a user can push watch body 1520 downward into coupling mechanism 1516 to attach watch body 1520 to coupling mechanism 1516. In some embodiments, coupling mechanism 1516 can be configured to receive a top side of the watch body 1520 (e.g., a side proximate to the front side of watch body 1520 where display 1505 is located) that is pushed upward into the cradle, as opposed to being pushed downward into coupling mechanism 1516. In some embodiments, coupling mechanism 1516 is an integrated component of wearable band 1510 such that wearable band 1510 and coupling mechanism 1516 are a single unitary structure. In some embodiments, coupling mechanism 1516 is a type of frame or shell that allows watch body 1520 coupling surface to be retained within or on wearable band 1510 coupling mechanism 1516 (e.g., a cradle, a tracker band, a support base, a clasp, etc.).

Coupling mechanism 1516 can allow for watch body 1520 to be detachably coupled to the wearable band 1510 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 1520 to wearable band 1510 and to decouple the watch body 1520 from the wearable band 1510. For example, a user can twist, slide, turn, push, pull, or rotate watch body 1520 relative to wearable band 1510, or a combination thereof, to attach watch body 1520 to wearable band 1510 and to detach watch body 1520 from wearable band 1510. Alternatively, as discussed below, in some embodiments, the watch body 1520 can be decoupled from the wearable band 1510 by actuation of a release mechanism 1529.

Wearable band 1510 can be coupled with watch body 1520 to increase the functionality of wearable band 1510 (e.g., converting wearable band 1510 into wrist-wearable device 1500, adding an additional computing unit and/or battery to increase computational resources and/or a battery life of wearable band 1510, adding additional sensors to improve sensed data, etc.). As described above, wearable band 1510 and coupling mechanism 1516 are configured to operate independently (e.g., execute functions independently) from watch body 1520. For example, coupling mechanism 1516 can include one or more sensors 1513 that contact a user's skin when wearable band 1510 is worn by the user, with or without watch body 1520 and can provide sensor data for determining control commands.

A user can detach watch body 1520 from wearable band 1510 to reduce the encumbrance of wrist-wearable device 1500 to the user. For embodiments in which watch body 1520 is removable, watch body 1520 can be referred to as a removable structure, such that in these embodiments wrist-wearable device 1500 includes a wearable portion (e.g., wearable band 1510) and a removable structure (e.g., watch body 1520).

Turning to watch body 1520, in some examples watch body 1520 can have a substantially rectangular or circular shape. Watch body 1520 is configured to be worn by the user on their wrist or on another body part. More specifically, watch body 1520 is sized to be easily carried by the user, attached on a portion of the user's clothing, and/or coupled to wearable band 1510 (forming the wrist-wearable device 1500). As described above, watch body 1520 can have a shape corresponding to coupling mechanism 1516 of wearable band 1510. In some embodiments, watch body 1520 includes a single release mechanism 1529 or multiple release mechanisms (e.g., two release mechanisms 1529 positioned on opposing sides of watch body 1520, such as spring-loaded buttons) for decoupling watch body 1520 from wearable band 1510. Release mechanism 1529 can include, without limitation, a button, a knob, a plunger, a handle, a lever, a fastener, a clasp, a dial, a latch, or a combination thereof.

A user can actuate release mechanism 1529 by pushing, turning, lifting, depressing, shifting, or performing other actions on release mechanism 1529. Actuation of release mechanism 1529 can release (e.g., decouple) watch body 1520 from coupling mechanism 1516 of wearable band 1510, allowing the user to use watch body 1520 independently from wearable band 1510 and vice versa. For example, decoupling watch body 1520 from wearable band 1510 can allow a user to capture images using rear-facing camera 1525*b*. Although release mechanism 1529 is shown positioned at a corner of watch body 1520, release mechanism 1529 can be positioned anywhere on watch body 1520 that is convenient for the user to actuate. In addition, in some embodiments, wearable band 1510 can also include a respective release mechanism for decoupling watch body 1520 from coupling mechanism 1516. In some embodiments, release mechanism 1529 is optional and watch body 1520 can be decoupled from coupling mechanism 1516 as described above (e.g., via twisting, rotating, etc.).

Watch body 1520 can include one or more peripheral buttons 1523 and 1527 for performing various operations at watch body 1520. For example, peripheral buttons 1523 and 1527 can be used to turn on or wake (e.g., transition from a sleep state to an active state) display 1505, unlock watch body 1520, increase or decrease a volume, increase or decrease a brightness, interact with one or more applications, interact with one or more user interfaces, etc. Additionally or alternatively, in some embodiments, display 1505 operates as a touch screen and allows the user to provide one or more inputs for interacting with watch body 1520.

In some embodiments, watch body 1520 includes one or more sensors 1521. Sensors 1521 of watch body 1520 can be the same or distinct from sensors 1513 of wearable band 1510. Sensors 1521 of watch body 1520 can be distributed on an inside and/or an outside surface of watch body 1520. In some embodiments, sensors 1521 are configured to contact a user's skin when watch body 1520 is worn by the user. For example, sensors 1521 can be placed on the bottom side of watch body 1520 and coupling mechanism 1516 can be a cradle with an opening that allows the bottom side of watch body 1520 to directly contact the user's skin. Alternatively, in some embodiments, watch body 1520 does not include sensors that are configured to contact the user's skin (e.g., including sensors internal and/or external to the watch body 1520 that are configured to sense data of watch body 1520 and the surrounding environment). In some embodiments, sensors 1521 are configured to track a position and/or motion of watch body 1520.

Watch body 1520 and wearable band 1510 can share data using a wired communication method (e.g., a Universal Asynchronous Receiver/Transmitter (UART), a USB transceiver, etc.) and/or a wireless communication method (e.g., near field communication, Bluetooth, etc.). For example, watch body 1520 and wearable band 1510 can share data sensed by sensors 1513 and 1521, as well as application and device specific information (e.g., active and/or available applications, output devices (e.g., displays, speakers, etc.), input devices (e.g., touch screens, microphones, imaging sensors, etc.).

In some embodiments, watch body 1520 can include, without limitation, a front-facing camera 1525a and/or a rear-facing camera 1525b, sensors 1521 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 1663), a touch sensor, a sweat sensor, etc.). In some embodiments, watch body 1520 can include one or more haptic devices 1676 (e.g., a vibratory haptic actuator) that is configured to provide haptic feedback (e.g., a cutaneous and/or kinesthetic sensation, etc.) to the user. Sensors 1621 and/or haptic device 1676 can also be configured to operate in conjunction with multiple applications including, without limitation, health monitoring applications, social media applications, game applications, and artificial reality applications (e.g., the applications associated with artificial reality).

As described above, watch body 1520 and wearable band 1510, when coupled, can form wrist-wearable device 1500. When coupled, watch body 1520 and wearable band 1510 may operate as a single device to execute functions (operations, detections, communications, etc.) described herein. In some embodiments, each device may be provided with particular instructions for performing the one or more operations of wrist-wearable device 1500. For example, in accordance with a determination that watch body 1520 does not include neuromuscular signal sensors, wearable band 1510 can include alternative instructions for performing associated instructions (e.g., providing sensed neuromuscular signal data to watch body 1520 via a different electronic device). Operations of wrist-wearable device 1500 can be performed by watch body 1520 alone or in conjunction with wearable band 1510 (e.g., via respective processors and/or hardware components) and vice versa. In some embodiments, operations of wrist-wearable device 1500, watch body 1520, and/or wearable band 1510 can be performed in conjunction with one or more processors and/or hardware components.

As described below with reference to the block diagram of FIG. 16, wearable band 1510 and/or watch body 1520 can each include independent resources required to independently execute functions. For example, wearable band 1510 and/or watch body 1520 can each include a power source (e.g., a battery), a memory, data storage, a processor (e.g., a central processing unit (CPU)), communications, a light source, and/or input/output devices.

FIG. 16 shows block diagrams of a computing system 1630 corresponding to wearable band 1510 and a computing system 1660 corresponding to watch body 1520 according to some embodiments. Computing system 1600 of wrist-wearable device 1500 may include a combination of components of wearable band computing system 1630 and watch body computing system 1660, in accordance with some embodiments.

Watch body 1520 and/or wearable band 1510 can include one or more components shown in watch body computing system 1660. In some embodiments, a single integrated circuit may include all or a substantial portion of the components of watch body computing system 1660 included in a single integrated circuit. Alternatively, in some embodiments, components of the watch body computing system 1660 may be included in a plurality of integrated circuits that are communicatively coupled. In some embodiments, watch body computing system 1660 may be configured to couple (e.g., via a wired or wireless connection) with wearable band computing system 1630, which may allow the computing systems to share components, distribute tasks, and/or perform other operations described herein (individually or as a single device).

Watch body computing system 1660 can include one or more processors 1679, a controller 1677, a peripherals interface 1661, a power system 1695, and memory (e.g., a memory 1680).

Power system 1695 can include a charger input 1696, a power-management integrated circuit (PMIC) 1697, and a battery 1698. In some embodiments, a watch body 1520 and a wearable band 1510 can have respective batteries (e.g., battery 1698 and 1659) and can share power with each other. Watch body 1520 and wearable band 1510 can receive a charge using a variety of techniques. In some embodiments, watch body 1520 and wearable band 1510 can use a wired charging assembly (e.g., power cords) to receive the charge. Alternatively, or in addition, watch body 1520 and/or wearable band 1510 can be configured for wireless charging. For example, a portable charging device can be designed to mate with a portion of watch body 1520 and/or wearable band 1510 and wirelessly deliver usable power to battery 1698 of watch body 1520 and/or battery 1659 of wearable band 1510. Watch body 1520 and wearable band 1510 can have independent power systems (e.g., power system 1695 and 1656, respectively) to enable each to operate independently. Watch body 1520 and wearable band 1510 can also share power (e.g., one can charge the other) via respective PMICs (e.g., PMICs 1697 and 1658) and charger inputs (e.g., 1657 and 1696) that can share power over power and ground conductors and/or over wireless charging antennas.

In some embodiments, peripherals interface 1661 can include one or more sensors 1621. Sensors 1621 can include one or more coupling sensors 1662 for detecting when watch body 1520 is coupled with another electronic device (e.g., a wearable band 1510). Sensors 1621 can include one or more imaging sensors 1663 (e.g., one or more of cameras 1625, and/or separate imaging sensors 1663 (e.g., thermal-imaging sensors)). In some embodiments, sensors 1621 can include one or more SpO2 sensors 1664. In some embodiments, sensors 1621 can include one or more biopotential-signal sensors (e.g., EMG sensors 1665, which may be disposed on an interior, user-facing portion of watch body 1520 and/or wearable band 1510). In some embodiments, sensors 1621 may include one or more capacitive sensors 1666. In some embodiments, sensors 1621 may include one or more heart rate sensors 1667. In some embodiments, sensors 1621 may include one or more IMU sensors 1668. In some embodiments, one or more IMU sensors 1668 can be configured to detect movement of a user's hand or other location where watch body 1520 is placed or held.

In some embodiments, one or more of sensors 1621 may provide an example human-machine interface. For example, a set of neuromuscular sensors, such as EMG sensors 1665, may be arranged circumferentially around wearable band 1510 with an interior surface of EMG sensors 1665 being configured to contact a user's skin. Any suitable number of neuromuscular sensors may be used (e.g., between 2 and 20 sensors). The number and arrangement of neuromuscular sensors may depend on the particular application for which the wearable device is used. For example, wearable band 1510 can be used to generate control information for controlling an augmented reality system, a robot, controlling a vehicle, scrolling through text, controlling a virtual avatar, or any other suitable control task.

In some embodiments, neuromuscular sensors may be coupled together using flexible electronics incorporated into the wireless device, and the output of one or more of the sensing components can be optionally processed using hardware signal processing circuitry (e.g., to perform amplification, filtering, and/or rectification). In other embodiments, at least some signal processing of the output of the sensing components can be performed in software such as processors 1679. Thus, signal processing of signals sampled by the sensors can be performed in hardware, software, or by any suitable combination of hardware and software, as aspects of the technology described herein are not limited in this respect.

Neuromuscular signals may be processed in a variety of ways. For example, the output of EMG sensors 1665 may be provided to an analog front end, which may be configured to perform analog processing (e.g., amplification, noise reduction, filtering, etc.) on the recorded signals. The processed analog signals may then be provided to an analog-to-digital converter, which may convert the analog signals to digital signals that can be processed by one or more computer processors. Furthermore, although this example is as discussed in the context of interfaces with EMG sensors, the embodiments described herein can also be implemented in wearable interfaces with other types of sensors including, but not limited to, mechanomyography (MMG) sensors, sonomyography (SMG) sensors, and electrical impedance tomography (EIT) sensors.

In some embodiments, peripherals interface 1661 includes a near-field communication (NFC) component 1669, a global-position system (GPS) component 1670, a long-term evolution (LTE) component 1671, and/or a Wi-Fi and/or Bluetooth communication component 1672. In some embodiments, peripherals interface 1661 includes one or more buttons 1673 (e.g., peripheral buttons 1523 and 1527 in FIG. 15), which, when selected by a user, cause operation to be performed at watch body 1520. In some embodiments, the peripherals interface 1661 includes one or more indicators, such as a light emitting diode (LED), to provide a user with visual indicators (e.g., message received, low battery, active microphone and/or camera, etc.).

Watch body 1520 can include at least one display 1505 for displaying visual representations of information or data to a user, including user-interface elements and/or three-dimensional virtual objects. The display can also include a touch screen for inputting user inputs, such as touch gestures, swipe gestures, and the like. Watch body 1520 can include at least one speaker 1674 and at least one microphone 1675 for providing audio signals to the user and receiving audio input from the user. The user can provide user inputs through microphone 1675 and can also receive audio output from speaker 1674 as part of a haptic event provided by haptic controller 1678. Watch body 1520 can include at least one camera 1625, including a front camera 1625a and a rear camera 1625b. Cameras 1625 can include ultra-wide-angle cameras, wide angle cameras, fish-eye cameras, spherical cameras, telephoto cameras, depth-sensing cameras, or other types of cameras.

Watch body computing system 1660 can include one or more haptic controllers 1678 and associated componentry (e.g., haptic devices 1676) for providing haptic events at watch body 1520 (e.g., a vibrating sensation or audio output in response to an event at the watch body 1520). Haptic controllers 1678 can communicate with one or more haptic devices 1676, such as electroacoustic devices, including a speaker of the one or more speakers 1674 and/or other audio components and/or electromechanical devices that convert energy into linear motion such as a motor, solenoid, electroactive polymer, piezoelectric actuator, electrostatic actuator, or other tactile output generating components (e.g., a component that converts electrical signals into tactile outputs on the device). Haptic controller 1678 can provide haptic events to that are capable of being sensed by a user of watch body 1520. In some embodiments, one or more haptic controllers 1678 can receive input signals from an application of applications 1682.

In some embodiments, wearable band computing system 1630 and/or watch body computing system 1660 can include memory 1680, which can be controlled by one or more memory controllers of controllers 1677. In some embodiments, software components stored in memory 1680 include one or more applications 1682 configured to perform operations at the watch body 1520. In some embodiments, one or more applications 1682 may include games, word processors, messaging applications, calling applications, web browsers, social media applications, media streaming applications, financial applications, calendars, clocks, etc. In some embodiments, software components stored in memory 1680 include one or more communication interface modules 1683 as defined above. In some embodiments, software components stored in memory 1680 include one or more graphics modules 1684 for rendering, encoding, and/or decoding audio and/or visual data and one or more data management modules 1685 for collecting, organizing, and/or or providing access to data 1687 stored in memory 1680. In some embodiments, one or more of applications 1682 and/or one or more modules can work in conjunction with one another to perform various tasks at the watch body 1520.

In some embodiments, software components stored in memory 1680 can include one or more operating systems 1681 (e.g., a Linux-based operating system, an Android operating system, etc.). Memory 1680 can also include data 1687. Data 1687 can include profile data 1688A, sensor data 1689A, media content data 1690, and application data 1691.

It should be appreciated that watch body computing system 1660 is an example of a computing system within watch body 1520, and that watch body 1520 can have more or fewer components than shown in watch body computing system 1660, can combine two or more components, and/or can have a different configuration and/or arrangement of the components. The various components shown in watch body computing system 1660 are implemented in hardware, software, firmware, or a combination thereof, including one or more signal processing and/or application-specific integrated circuits.

Turning to the wearable band computing system 1630, one or more components that can be included in wearable band 1510 are shown. Wearable band computing system 1630 can include more or fewer components than shown in watch body computing system 1660, can combine two or more components, and/or can have a different configuration and/or arrangement of some or all of the components. In some embodiments, all, or a substantial portion of the components of wearable band computing system 1630 are included in a single integrated circuit. Alternatively, in some embodiments, components of wearable band computing system 1630 are included in a plurality of integrated circuits that are communicatively coupled. As described above, in some embodiments, wearable band computing system 1630 is configured to couple (e.g., via a wired or wireless connection) with watch body computing system 1660, which allows the computing systems to share components, distribute tasks, and/or perform other operations described herein (individually or as a single device).

Wearable band computing system 1630, similar to watch body computing system 1660, can include one or more processors 1649, one or more controllers 1647 (including one or more haptics controllers 1648), a peripherals interface 1631 that can includes one or more sensors 1613 and other peripheral devices, a power source (e.g., a power system 1656), and memory (e.g., a memory 1650) that includes an operating system (e.g., an operating system 1651), data (e.g., data 1654 including profile data 1688B, sensor data 1689B, etc.), and one or more modules (e.g., a communications interface module 1652, a data management module 1653, etc.).

One or more of sensors 1613 can be analogous to sensors 1621 of watch body computing system 1660. For example, sensors 1613 can include one or more coupling sensors 1632, one or more SpO2 sensors 1634, one or more EMG sensors 1635, one or more capacitive sensors 1636, one or more heart rate sensors 1637, and one or more IMU sensors 1638.

Peripherals interface 1631 can also include other components analogous to those included in peripherals interface 1661 of watch body computing system 1660, including an NFC component 1639, a GPS component 1640, an LTE component 1641, a Wi-Fi and/or Bluetooth communication component 1642, and/or one or more haptic devices 1646 as described above in reference to peripherals interface 1661. In some embodiments, peripherals interface 1631 includes one or more buttons 1643, a display 1633, a speaker 1644, a microphone 1645, and a camera 1655. In some embodiments, peripherals interface 1631 includes one or more indicators, such as an LED.

It should be appreciated that wearable band computing system 1630 is an example of a computing system within wearable band 1510, and that wearable band 1510 can have more or fewer components than shown in wearable band computing system 1630, combine two or more components, and/or have a different configuration and/or arrangement of the components. The various components shown in wearable band computing system 1630 can be implemented in one or more of a combination of hardware, software, or firmware, including one or more signal processing and/or application-specific integrated circuits.

Wrist-wearable device 1500 with respect to FIG. 15 is an example of wearable band 1510 and watch body 1520 coupled together, so wrist-wearable device 1500 will be understood to include the components shown and described for wearable band computing system 1630 and watch body computing system 1660. In some embodiments, wrist-wearable device 1500 has a split architecture (e.g., a split mechanical architecture, a split electrical architecture, etc.) between watch body 1520 and wearable band 1510. In other words, all of the components shown in wearable band computing system 1630 and watch body computing system 1660 can be housed or otherwise disposed in a combined wrist-wearable device 1500 or within individual components of watch body 1520, wearable band 1510, and/or portions thereof (e.g., a coupling mechanism 1516 of wearable band 1510).

The techniques described above can be used with any device for sensing neuromuscular signals but could also be used with other types of wearable devices for sensing neuromuscular signals (such as body-wearable or head-wearable devices that might have neuromuscular sensors closer to the brain or spinal column).

In some embodiments, wrist-wearable device 1500 can be used in conjunction with a head-wearable device (e.g., AR glasses 1700 and VR system 1810) and/or an HIPD, and wrist-wearable device 1500 can also be configured to be used to allow a user to control any aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable devices, attention will now be turned to example head-wearable devices, such AR glasses 1700 and VR headset 1810.

Figure 17:
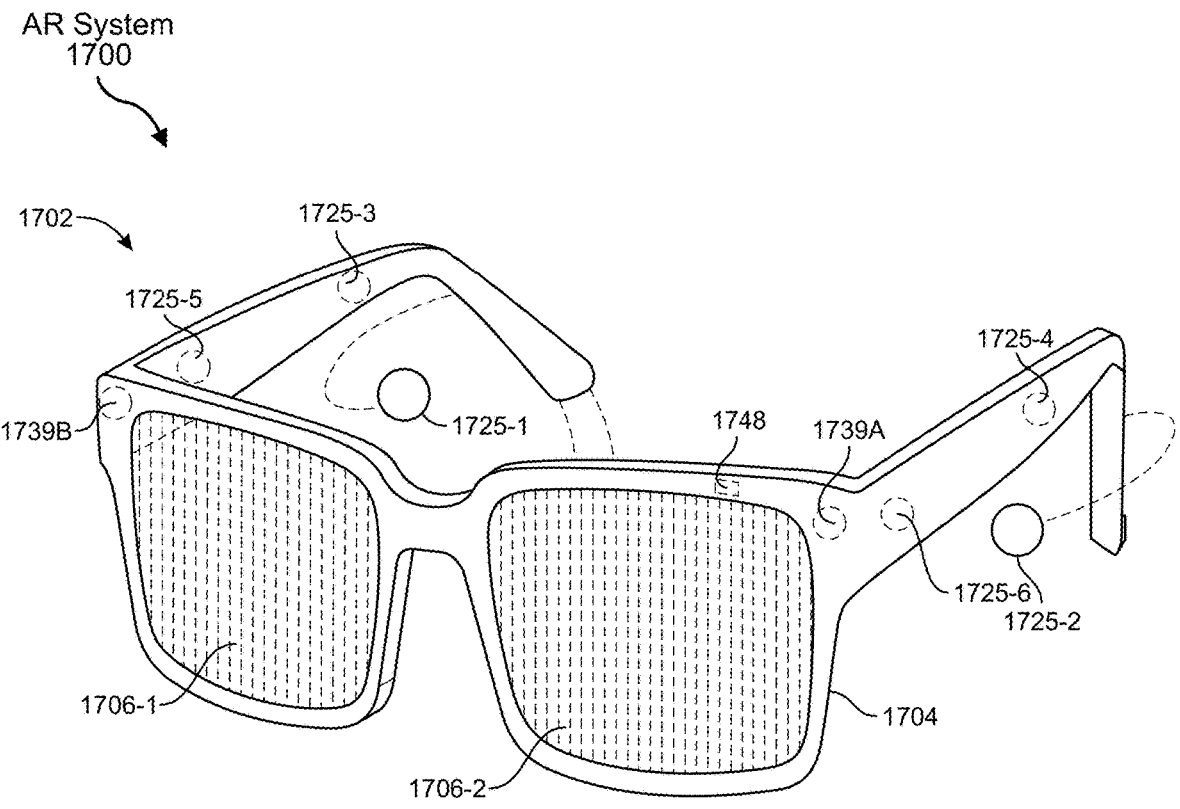
FIG. 17 is an illustration of an example augmented-reality system according to some embodiments of this disclosure.
Figure 18A:
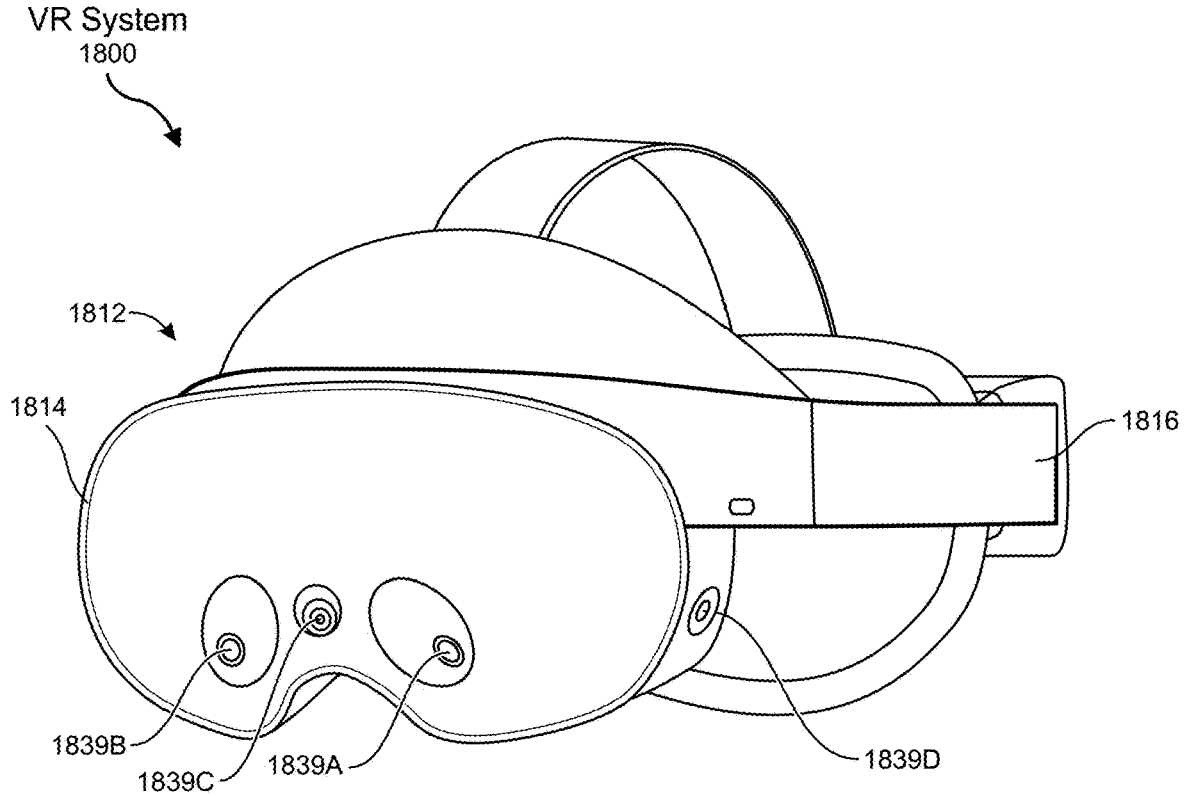
FIG. 18A is an illustration of an example virtual-reality system according to some embodiments of this disclosure.
Figure 18B:
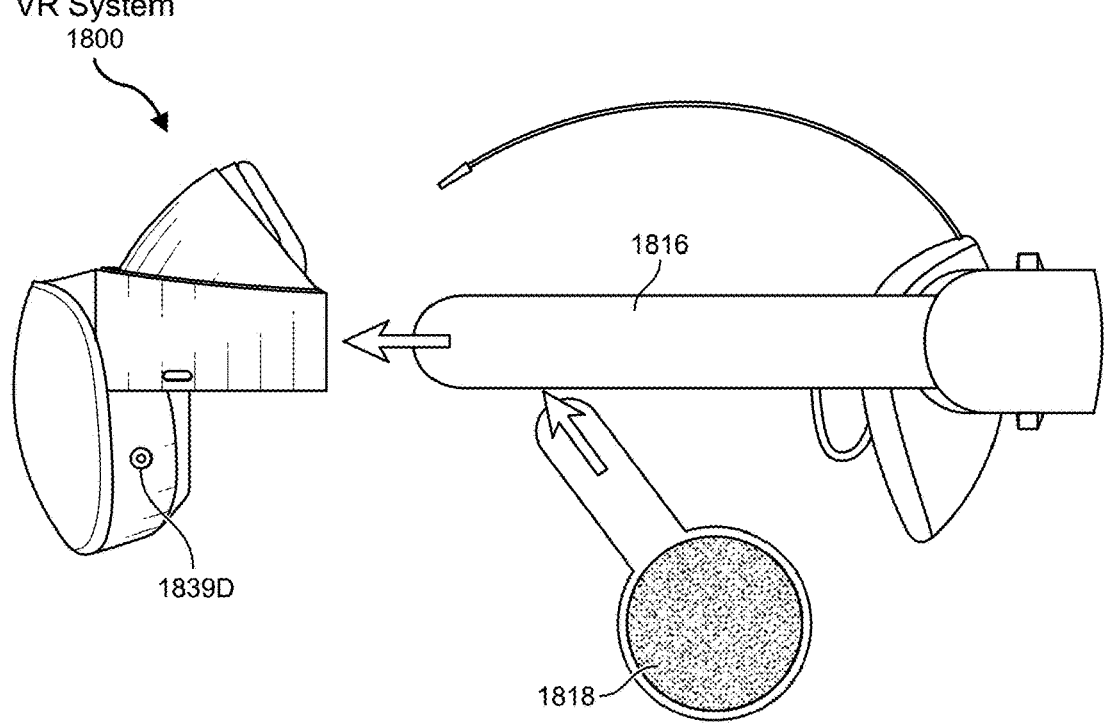
FIG. 18B is an illustration of another perspective of the virtual-reality systems shown in FIG. 18A.
Figure 19:
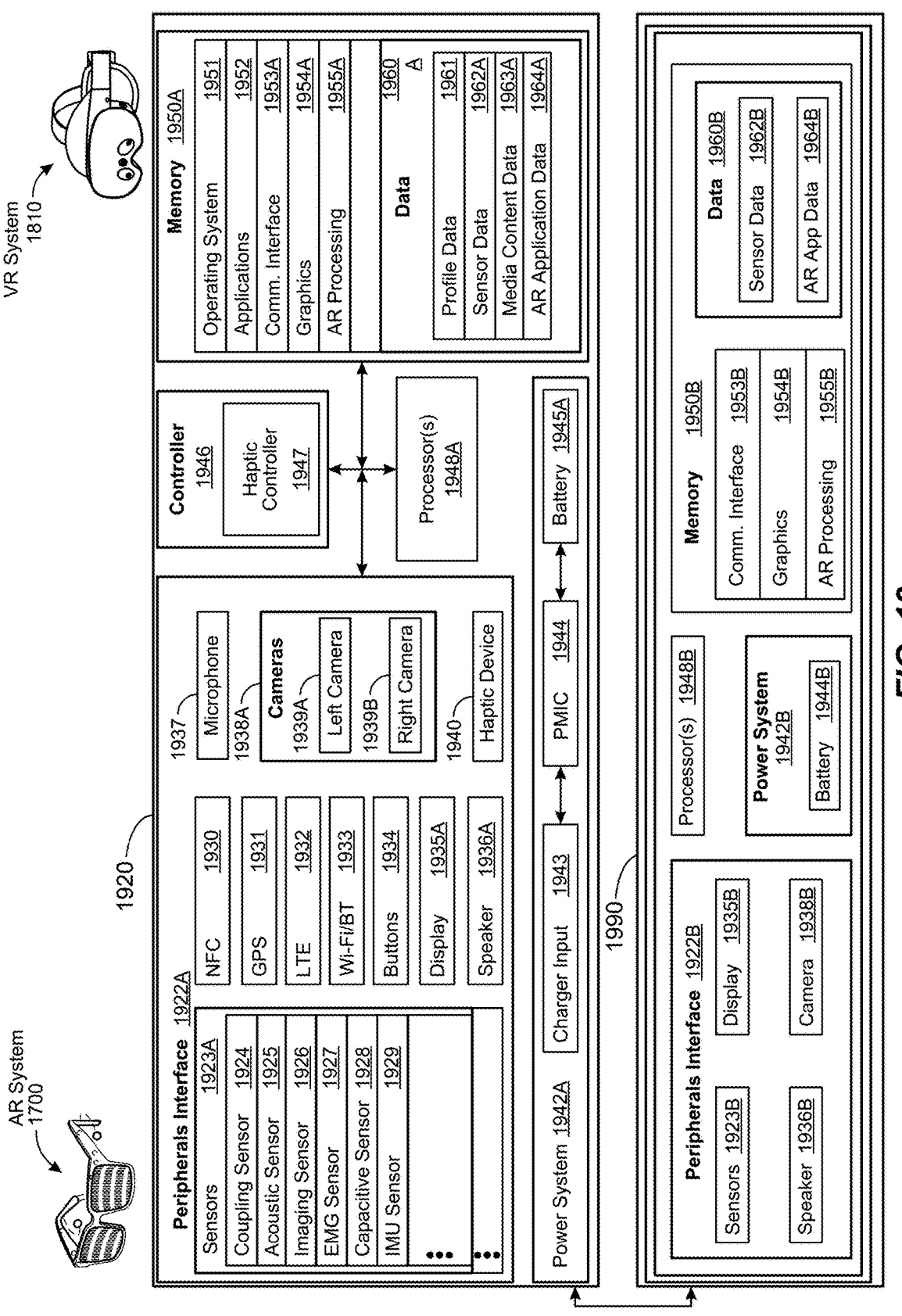
FIG. 19 is a block diagram showing system components of example artificial- and virtual-reality systems.

FIGS. 17 to 19 show example artificial-reality systems, which can be used as or in connection with wrist-wearable device 1500. In some embodiments, AR system 1700 includes an eyewear device 1702, as shown in FIG. 17. In some embodiments, VR system 1810 includes a head-mounted display (HMD) 1812, as shown in FIGS. 18A and 18B. In some embodiments, AR system 1700 and VR system 1810 can include one or more analogous components (e.g., components for presenting interactive artificial-reality environments, such as processors, memory, and/or presentation devices, including one or more displays and/or one or more waveguides), some of which are described in more detail with respect to FIG. 19. As described herein, a head-wearable device can include components of eyewear device 1702 and/or head-mounted display 1812. Some embodiments of head-wearable devices do not include any displays, including any of the displays described with respect to AR system 1700 and/or VR system 1810. While the example artificial-reality systems are respectively described herein as AR system 1700 and VR system 1810, either or both of the example AR systems described herein can be configured to present fully-immersive virtual-reality scenes presented in substantially all of a user's field of view or subtler augmented-reality scenes that are presented within a portion, less than all, of the user's field of view.

FIG. 17 show an example visual depiction of AR system 1700, including an eyewear device 1702 (which may also be described herein as augmented-reality glasses, and/or smart glasses). AR system 1700 can include additional electronic components that are not shown in FIG. 17, such as a wearable accessory device and/or an intermediary processing device, in electronic communication or otherwise configured to be used in conjunction with the eyewear device 1702. In some embodiments, the wearable accessory device and/or the intermediary processing device may be configured to couple with eyewear device 1702 via a coupling mechanism in electronic communication with a coupling sensor 1924 (FIG. 19), where coupling sensor 1924 can detect when an electronic device becomes physically or electronically coupled with eyewear device 1702. In some embodiments, eyewear device 1702 can be configured to couple to a housing 1990 (FIG. 19), which may include one or more additional coupling mechanisms configured to couple with additional accessory devices. The components shown in FIG. 17 can be implemented in hardware, software, firmware, or a combination thereof, including one or more signal-processing components and/or application-specific integrated circuits (ASICs).

Eyewear device 1702 includes mechanical glasses components, including a frame 1704 configured to hold one or more lenses (e.g., one or both lenses 1706-1 and 1706-2). One of ordinary skill in the art will appreciate that eyewear device 1702 can include additional mechanical components, such as hinges configured to allow portions of frame 1704 of eyewear device 1702 to be folded and unfolded, a bridge configured to span the gap between lenses 1706-1 and 1706-2 and rest on the user's nose, nose pads configured to rest on the bridge of the nose and provide support for eyewear device 1702, earpieces configured to rest on the user's ears and provide additional support for eyewear device 1702, temple arms configured to extend from the hinges to the earpieces of eyewear device 1702, and the like. One of ordinary skill in the art will further appreciate that some examples of AR system 1700 can include none of the mechanical components described herein. For example, smart contact lenses configured to present artificial reality to users may not include any components of eyewear device 1702.

Eyewear device 1702 includes electronic components, many of which will be described in more detail below with respect to FIG. 19. Some example electronic components are illustrated in FIG. 17, including acoustic sensors 1725-1, 1725-2, 1725-3, 1725-4, 1725-5, and 1725-6, which can be distributed along a substantial portion of the frame 1704 of eyewear device 1702. Eyewear device 1702 also includes a left camera 1739A and a right camera 1739B, which are located on different sides of the frame 1704. Eyewear device 1702 also includes a processor 1748 (or any other suitable type or form of integrated circuit) that is embedded into a portion of the frame 1704.

FIGS. 18A and 18B show a VR system 1810 that includes a head-mounted display (HMD) 1812 (e.g., also referred to herein as an artificial-reality headset, a head-wearable device, a VR headset, etc.), in accordance with some embodiments. As noted, some artificial-reality systems (e.g., AR system 1700) may, instead of blending an artificial reality with actual reality, substantially replace one or more of a user's visual and/or other sensory perceptions of the real world with a virtual experience (e.g., AR systems 1300 and 1400).

HMD 1812 includes a front body 1814 and a frame 1816 (e.g., a strap or band) shaped to fit around a user's head. In some embodiments, front body 1814 and/or frame 1816 include one or more electronic elements for facilitating presentation of and/or interactions with an AR and/or VR system (e.g., displays, IMUs, tracking emitter or detectors). In some embodiments, HMD 1812 includes output audio transducers (e.g., an audio transducer 1818), as shown in FIG. 18B. In some embodiments, one or more components, such as the output audio transducer(s) 1818 and frame 1816, can be configured to attach and detach (e.g., are detachably attachable) to HMD 1812 (e.g., a portion or all of frame 1816, and/or audio transducer 1818), as shown in FIG. 18B. In some embodiments, coupling a detachable component to HMD 1812 causes the detachable component to come into electronic communication with HMD 1812.

FIGS. 18A and 18B also show that VR system 1810 includes one or more cameras, such as left camera 1839A and right camera 1839B, which can be analogous to left and right cameras 1739A and 1739B on frame 1704 of eyewear device 1702. In some embodiments, VR system 1810 includes one or more additional cameras (e.g., cameras 1839C and 1839D), which can be configured to augment image data obtained by left and right cameras 1839A and 1839B by providing more information. For example, camera 1839C can be used to supply color information that is not discerned by cameras 1839A and 1839B. In some embodiments, one or more of cameras 1839A to 1839D can include an optional IR cut filter configured to remove IR light from being received at the respective camera sensors.

FIG. 19 illustrates a computing system 1920 and an optional housing 1990, each of which show components that can be included in AR system 1700 and/or VR system 1810. In some embodiments, more or fewer components can be included in optional housing 1990 depending on practical restraints of the respective AR system being described.

In some embodiments, computing system 1920 can include one or more peripherals interfaces 1922A and/or optional housing 1990 can include one or more peripherals interfaces 1922B. Each of computing system 1920 and optional housing 1990 can also include one or more power systems 1942A and 1942B, one or more controllers 1946 (including one or more haptic controllers 1947), one or more processors 1948A and 1948B (as defined above, including any of the examples provided), and memory 1950A and 1950B, which can all be in electronic communication with each other. For example, the one or more processors 1948A and 1948B can be configured to execute instructions stored in memory 1950A and 1950B, which can cause a controller of one or more of controllers 1946 to cause operations to be performed at one or more peripheral devices connected to peripherals interface 1922A and/or 1922B. In some embodiments, each operation described can be powered by electrical power provided by power system 1942A and/or 1942B.

In some embodiments, peripherals interface 1922A can include one or more devices configured to be part of computing system 1920, some of which have been defined above and/or described with respect to the wrist-wearable devices shown in FIGS. 15 and 16. For example, peripherals interface 1922A can include one or more sensors 1923A. Some example sensors 1923A include one or more coupling sensors 1924, one or more acoustic sensors 1925, one or more imaging sensors 1926, one or more EMG sensors 1927, one or more capacitive sensors 1928, one or more IMU sensors 1929, and/or any other types of sensors explained above or described with respect to any other embodiments discussed herein.

In some embodiments, peripherals interfaces 1922A and 1922B can include one or more additional peripheral devices, including one or more NFC devices 1930, one or more GPS devices 1931, one or more LTE devices 1932, one or more Wi-Fi and/or Bluetooth devices 1933, one or more buttons 1934 (e.g., including buttons that are slidable or otherwise adjustable), one or more displays 1935A and 1935B, one or more speakers 1936A and 1936B, one or more microphones 1937, one or more cameras 1938A and 1938B (e.g., including the left camera 1939A and/or a right camera 1939B), one or more haptic devices 1940, and/or any other types of peripheral devices defined above or described with respect to any other embodiments discussed herein.

AR systems can include a variety of types of visual feedback mechanisms (e.g., presentation devices). For example, display devices in AR system 1700 and/or VR system 1810 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with a user's vision. Some embodiments of AR systems also include optical subsystems having one or more lenses (e.g., conventional concave or convex lenses, Fresnel lenses, or adjustable liquid lenses) through which a user can view a display screen.

For example, respective displays 1935A and 1935B can be coupled to each of the lenses 1706-1 and 1706-2 of AR system 1700. Displays 1935A and 1935B may be coupled to each of lenses 1706-1 and 1706-2, which can act together or independently to present an image or series of images to a user. In some embodiments, AR system 1700 includes a single display 1935A or 1935B (e.g., a near-eye display) or more than two displays 1935A and 1935B. In some embodiments, a first set of one or more displays 1935A and 1935B can be used to present an augmented-reality environment, and a second set of one or more display devices 1935A and 1935B can be used to present a virtual-reality environment. In some embodiments, one or more waveguides are used in conjunction with presenting artificial-reality content to the user of AR system 1700 (e.g., as a means of delivering light from one or more displays 1935A and 1935B to the user's eyes). In some embodiments, one or more waveguides are fully or partially integrated into the eyewear device 1702. Additionally, or alternatively to display screens, some artificial-reality systems include one or more projection systems. For example, display devices in AR system 1700 and/or VR system 1810 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s) 1935A and 1935B.

Computing system 1920 and/or optional housing 1990 of AR system 1700 or VR system 1810 can include some or all of the components of a power system 1942A and 1942B. Power systems 1942A and 1942B can include one or more charger inputs 1943, one or more PMICs 1944, and/or one or more batteries 1945A and 1944B.

Memory 1950A and 1950B may include instructions and data, some or all of which may be stored as non-transitory computer-readable storage media within the memories 1950A and 1950B. For example, memory 1950A and 1950B can include one or more operating systems 1951, one or more applications 1952, one or more communication interface applications 1953A and 1953B, one or more graphics applications 1954A and 1954B, one or more AR processing applications 1955A and 1955B, and/or any other types of data defined above or described with respect to any other embodiments discussed herein.

Memory 1950A and 1950B also include data 1960A and 1960B, which can be used in conjunction with one or more of the applications discussed above. Data 1960A and 1960B can include profile data 1961, sensor data 1962A and 1962B, media content data 1963A, AR application data 1964A and 1964B, and/or any other types of data defined above or described with respect to any other embodiments discussed herein.

In some embodiments, controller 1946 of eyewear device 1702 may process information generated by sensors 1923A and/or 1923B on eyewear device 1702 and/or another electronic device within AR system 1700. For example, controller 1946 can process information from acoustic sensors 1725-1 and 1725-2. For each detected sound, controller 1946 can perform a direction of arrival (DOA) estimation to estimate a direction from which the detected sound arrived at eyewear device 1702 of R system 1700. As one or more of acoustic sensors 1925 (e.g., the acoustic sensors 1725-1, 1725-2) detects sounds, controller 1946 can populate an audio data set with the information (e.g., represented in FIG. 19 as sensor data 1962A and 1962B).

In some embodiments, a physical electronic connector can convey information between eyewear device 1702 and another electronic device and/or between one or more processors 1748, 1948A, 1948B of AR system 1700 or VR system 1810 and controller 1946. The information can be in the form of optical data, electrical data, wireless data, or any other transmittable data form. Moving the processing of information generated by eyewear device 1702 to an intermediary processing device can reduce weight and heat in the eyewear device, making it more comfortable and safer for a user. In some embodiments, an optional wearable accessory device (e.g., an electronic neckband) is coupled to eyewear device 1702 via one or more connectors. The connectors can be wired or wireless connectors and can include electrical and/or non-electrical (e.g., structural) components. In some embodiments, eyewear device 1702 and the wearable accessory device can operate independently without any wired or wireless connection between them.

In some situations, pairing external devices, such as an intermediary processing device (e.g., HIPD 1106, 1206, 1306) with eyewear device 1702 (e.g., as part of AR system 1700) enables eyewear device 1702 to achieve a similar form factor of a pair of glasses while still providing sufficient battery and computation power for expanded capabilities. Some, or all, of the battery power, computational resources, and/or additional features of AR system 1700 can be provided by a paired device or shared between a paired device and eyewear device 1702, thus reducing the weight, heat profile, and form factor of eyewear device 1702 overall while allowing eyewear device 1702 to retain its desired functionality. For example, the wearable accessory device can allow components that would otherwise be included on eyewear device 1702 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on eyewear device 1702 standing alone. Because weight carried in the wearable accessory device can be less invasive to a user than weight carried in the eyewear device 1702, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, AR system 1700 and/or VR system 1810 can include one or more optical sensors such as two-dimensional (2D) or three-dimensional (3D) cameras, time-of-flight depth sensors, structured light transmitters and detectors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 18A and 18B show VR system 1810 having cameras 1839A to 1839D, which can be used to provide depth information for creating a voxel field and a two-dimensional mesh to provide object information to the user to avoid collisions.

In some embodiments, AR system 1700 and/or VR system 1810 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

In some embodiments of an artificial reality system, such as AR system 1700 and/or VR system 1810, ambient light (e.g., a live feed of the surrounding environment that a user would normally see) can be passed through a display element of a respective head-wearable device presenting aspects of the AR system. In some embodiments, ambient light can be passed through a portion less that is less than all of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable device, and an amount of ambient light (e.g., 15-50% of the ambient light) can be passed through the user interface element such that the user can distinguish at least a portion of the physical environment over which the user interface element is being displayed.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user selection to be transformed, transform the user selection data, output a result of the transformation to perform automated digital editing, use the result of the transformation to perform automated digital editing, and store the result of the transformation to perform automated digital editing. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including"

and "having" (and their derivatives), as used in the specification and claims, are interchangeable with and have the same meaning as the word "comprising."

What is claimed is:

1. A computer-implemented method comprising:

presenting, within a video creation interface, a list of video styles, each video style within the list of video styles representative of a trained model, the trained model trained to apply different aesthetic attributes to video content in accordance with a different video style;

receiving, via user input to the video creation interface, a selection of a particular video style from the list of video styles;

in response to receiving the selection, applying, to video content received via the video creation interface, a video editing technique corresponding to the particular video style;

wherein the video editing technique comprises a pattern of switching between video content received from different cameras; and wherein applying the video editing technique to the video content comprises switching between the video content and additional video content in accordance with the pattern of switching.

2. The computer-implemented method of claim 1, further comprising:

applying, as input to a trained model, training video content corresponding to the particular video style; and receiving the video editing technique as an output from the trained model.

3. The computer-implemented method of claim 1, wherein:

the list of video styles comprises a list of different directors; and the particular video style comprises a particular director.

4. The computer-implemented method of claim 1, wherein the video creation interface is presented as part of a social media content creation process.

5. The computer-implemented method of claim 1, wherein:

the video editing technique comprises a type of video edit corresponding to a type of object; and applying the video editing technique to the video content comprises:

detecting an object, corresponding to the type of object, in the video content; and applying the type of video edit to the detected object.

6. The computer-implemented method of claim 5, wherein the type of object comprises a face captured in the video content.

7. The computer-implemented method of claim 5, wherein the type of video edit comprises a video edit determined to draw attention to the object.

8. The computer-implemented method of claim 1, wherein:

the video creation interface is presented to a user logged into a group video creation session;

the computer-implemented method further comprises:

presenting an additional instance of the video creation interface to an additional user logged into the group video creation session; and receiving the additional video content via the additional instance of the video creation interface.

9. The computer-implemented method of claim 8, wherein the pattern of switching comprises a frequency of switching between video content received from different cameras.

10. The computer-implemented method of claim 8, further comprising providing an entry point, for at least one of initiating or joining the group video creation session, within a group chat interface for a group chat comprising, as members, both the user and the additional user.

11. A system comprising:

at least one physical processor; and physical memory comprising computer-executable instructions that, when executed by the at least one physical processor, cause the at least one physical processor to:

present, within a video creation interface, a list of video styles, each video style within the list of video styles representative of a trained model, the trained model trained to apply different aesthetic attributes to video content in accordance with a different video style;

receive, via user input to the video creation interface, a selection of a particular video style from the list of video styles; and in response to receiving the selection, apply, to video content received via the video creation interface, a video editing technique corresponding to the particular video style;

wherein the video editing technique comprises a pattern of switching between video content received from different cameras; and wherein applying the video editing technique to the video content comprises switching between the video content and additional video content in accordance with the pattern of switching.

12. The system of claim 11, wherein the computer-executable instructions further cause the at least one physical processor to:

apply, as input to a trained model, training video content corresponding to the particular video style; and receive the video editing technique as an output from the trained model.

13. The system of claim 11, wherein:

the list of video styles comprises a list of different directors; and the particular video style comprises a particular director.

14. The system of claim 11, wherein the video creation interface is presented as part of a social media content creation process.

15. The system of claim 11, wherein:

the video editing technique comprises a type of video edit corresponding to a type of object; and applying the video editing technique to the video content comprises:

detecting an object, corresponding to the type of object, in the video content; and applying the type of video edit to the detected object.

16. The system of claim 15, wherein the type of object comprises a face captured in the video content.

17. The system of claim 15, wherein the type of video edit comprises a video edit determined to draw attention to the object.

18. A non-transitory computer-readable medium comprising one or more computer-readable instructions that, when executed by at least one processor of a computing device, cause the computing device to: present, within a video creation interface, a list of video styles, each video style within the list of video styles representative of a trained model, the trained model trained to apply different aesthetic attributes to video content in accordance with a different video style; receive, via user input to the video creation interface, a selection of a particular video style from the list of video styles; and in response to receiving the selection, apply, to video content received via the video creation interface, a video editing technique corresponding to the particular video style, wherein the video editing technique comprises a pattern of switching between video content received from different cameras; and wherein applying the video editing technique to the video content comprises switching between the video content and additional video content in accordance with the pattern of switching.

19. The non-transitory computer-readable medium of claim 18, wherein:

the list of video styles comprises a list of different directors; and the particular video style comprises a particular director.

20. The non-transitory computer-readable medium of claim 18, wherein the video creation interface is presented as part of a social media content creation process.

\* \* \* \* \*